United States Patent [19]

Ichinoi et al.

[11] Patent Number: 5,583,648
[45] Date of Patent: Dec. 10, 1996

[54] PICTURE SIGNAL RECORDING/REPRODUCING METHOD AND APPARATUS FOR RECORDING/REPRODUCING A HIGH-DEFINITION PICTURE SIGNAL AND A NORMAL PICTURE SIGNAL

[75] Inventors: Yutaka Ichinoi; Masahiko Turuta; Yutaka Isobe; Mitsuhiro Yoshida, all of Yokohama; Hiroshi Asai, Sagamihara, all of Japan

[73] Assignee: Victor Company of Japan, Ltd., Yokohama, Japan

[21] Appl. No.: 260,429

[22] Filed: Jun. 15, 1994

Related U.S. Application Data

[63] Continuation-in-part of Ser. No. 224,493, Apr. 7, 1994.

[30] Foreign Application Priority Data

Apr. 7, 1993 [JP] Japan ................................. 5-105149
Jun. 17, 1993 [JP] Japan ................................. 5-171257

[51] Int. Cl.$^6$ .................................. H04N 9/79; G11B 5/00
[52] U.S. Cl. ................................................. 386/37; 360/32
[58] Field of Search ........................................ 358/310, 335, 358/342; 360/32, 33.1

[56] References Cited

U.S. PATENT DOCUMENTS

| | | |
|---|---|---|
| 4,245,235 | 1/1981 | Poetsch . |
| 4,467,368 | 8/1984 | Horstmann . |
| 4,626,929 | 12/1986 | Ichinoi et al. ........................ 358/310 |
| 4,630,131 | 12/1986 | Ichinoi et al. . |
| 4,758,898 | 7/1988 | Itou et al. ............................ 358/320 |
| 4,963,991 | 10/1990 | Honjo .................................. 358/310 |
| 5,038,219 | 8/1991 | Yamashita et al. . |
| 5,050,010 | 9/1991 | Park . |
| 5,276,562 | 1/1994 | Sakamoto ............................ 360/33.1 |
| 5,311,324 | 5/1994 | Temma et al. ...................... 358/342 |
| 5,394,275 | 2/1995 | Iketani et al. ...................... 360/35.1 |

FOREIGN PATENT DOCUMENTS

| | | |
|---|---|---|
| 287316A2 | 10/1988 | European Pat. Off. . |
| 0404383 | 12/1990 | European Pat. Off. ......... H04N 9/79 |
| 540348A2 | 5/1993 | European Pat. Off. . |
| 63-203075 | 8/1988 | Japan . |
| 257397 | 12/1990 | Japan . |
| 4068980 | 3/1992 | Japan . |
| 4205856 | 7/1992 | Japan . |

OTHER PUBLICATIONS

"Development of UNIHI–VCR For HI–Vision" by Ryoji Tsunoi et al; ITEJ Technical Report vol. 13, No. 50; Oct., 1989; pp., 1–6.

Primary Examiner—Thai Q. Tran
Assistant Examiner—Robert Chevalier
Attorney, Agent, or Firm—Lowe, Price, LeBlanc & Becker

[57] ABSTRACT

Whether or not a luminance signal or an HD input signal is input to a picture signal recording apparatus is detected, and a recording mode is determined according to the detection of the luminance signal in a recording mode determining unit. In cases where the luminance signal is detected, first and second color difference signals of the HD input signal are alternately deleted on every scanning line. Thereafter, the luminance signal pertaining to odd-numbered scanning lines and the first color difference signal are time-compressed and multiplexed on every scanning line, and the luminance signal pertaining to even-numbered scanning lines and the second color difference signal are time-compressed and multiplexed on every scanning line. In contrast, in cases where the luminance signal is not detected, a luminance signal and first and second color difference signals of a normal picture signal input to the apparatus are time-compressed and multiplexed on every scanning line. Thereafter, the signals multiplexed are recorded on a magnetic tape according to the recording mode. Therefore, even though the number of scanning lines in the HD input signal is higher than that in the normal picture signal, the first and second color signals can be recorded within a limited frequency band.

12 Claims, 36 Drawing Sheets

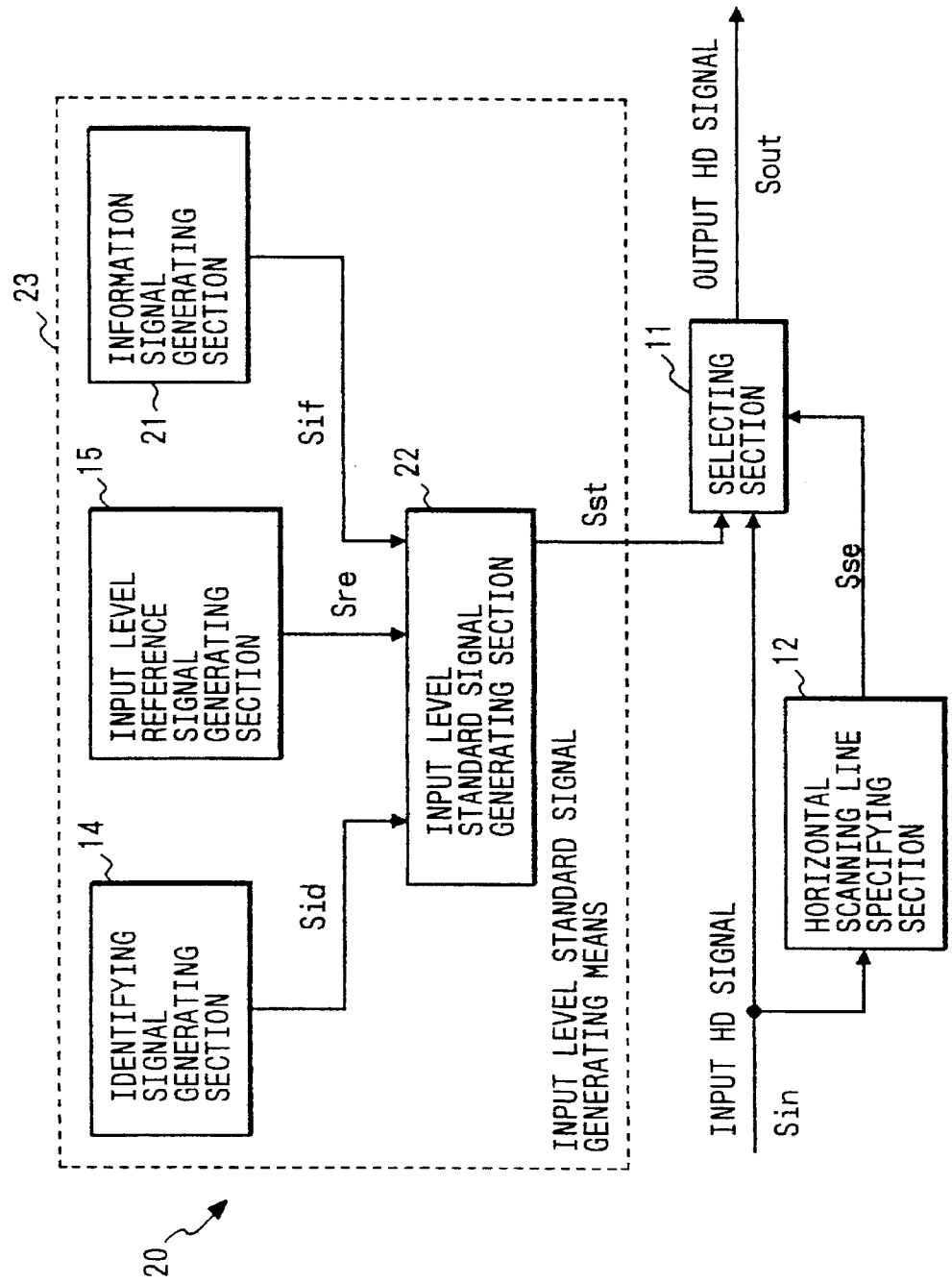

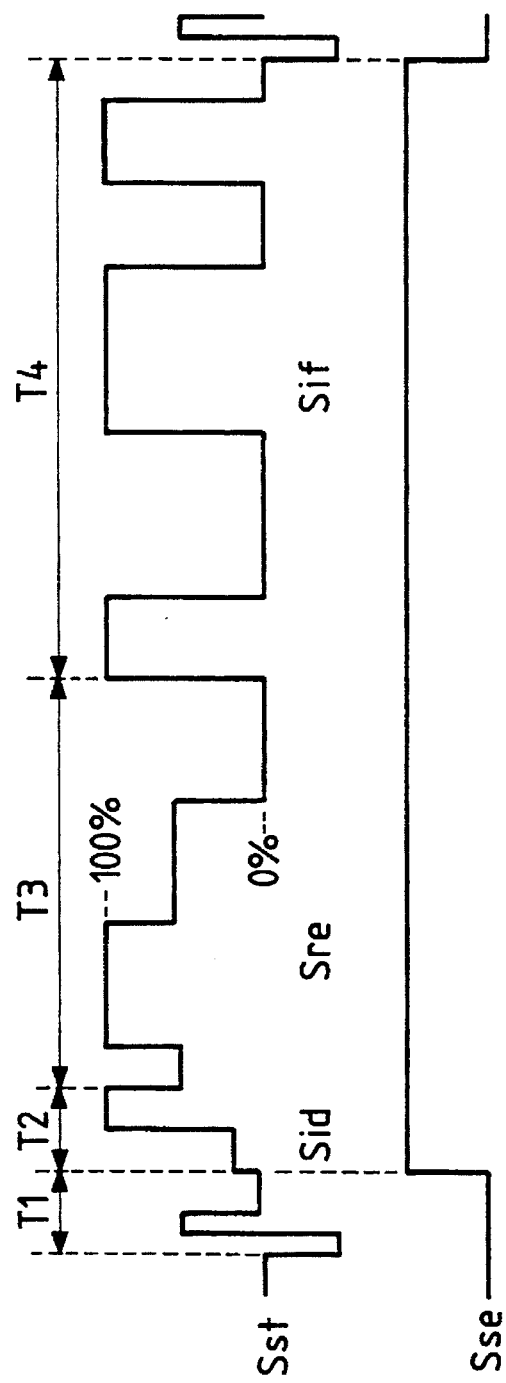

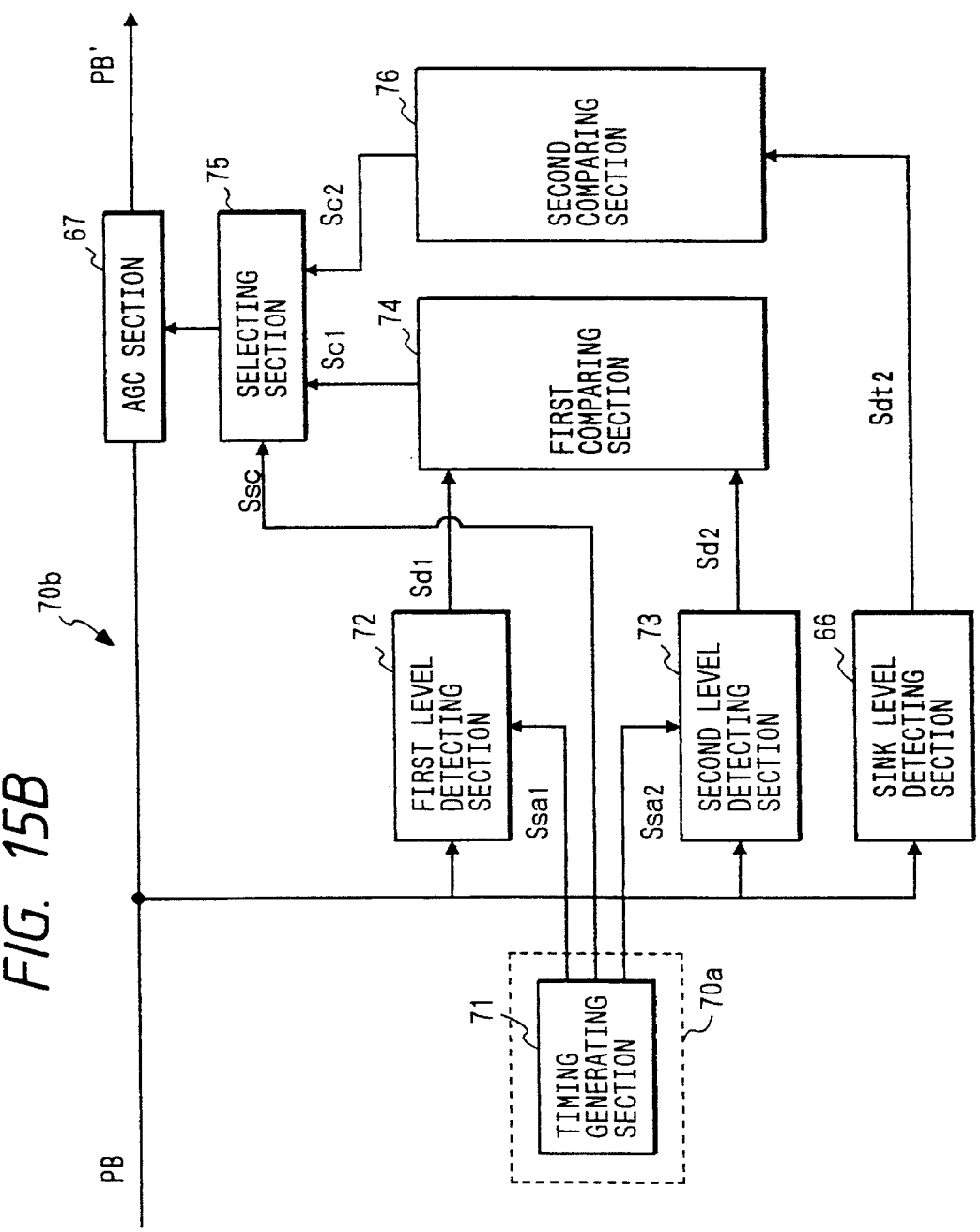

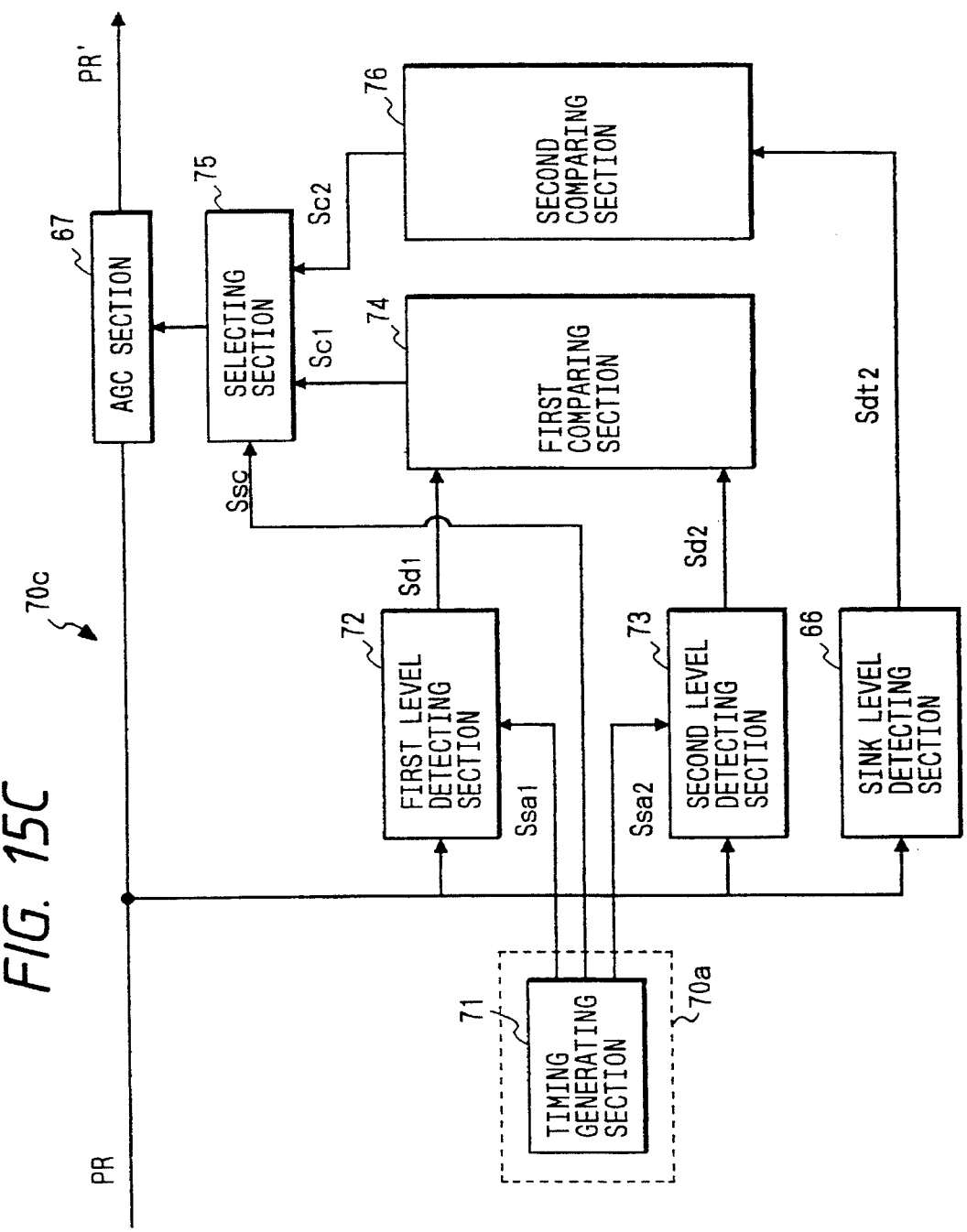

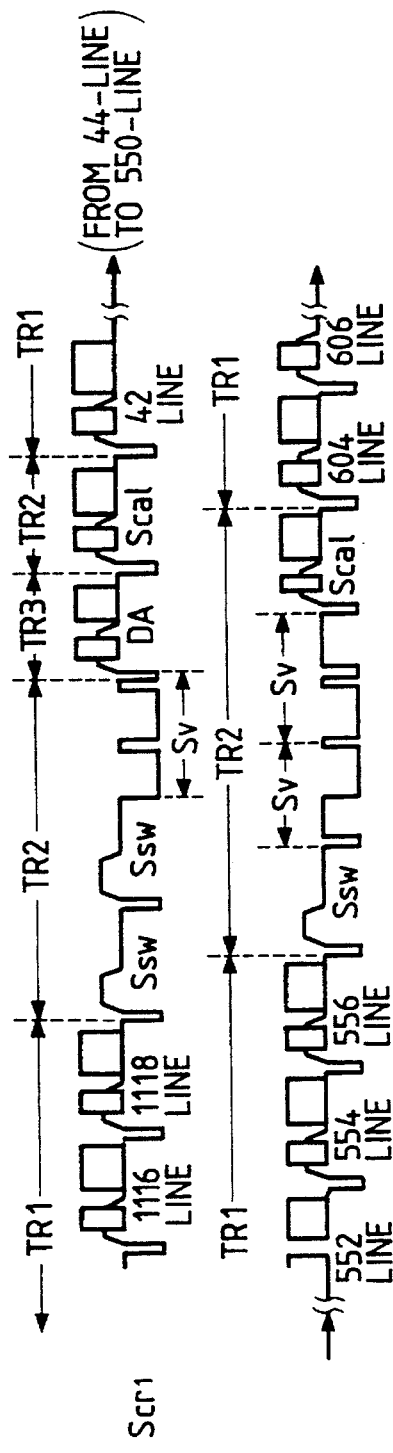
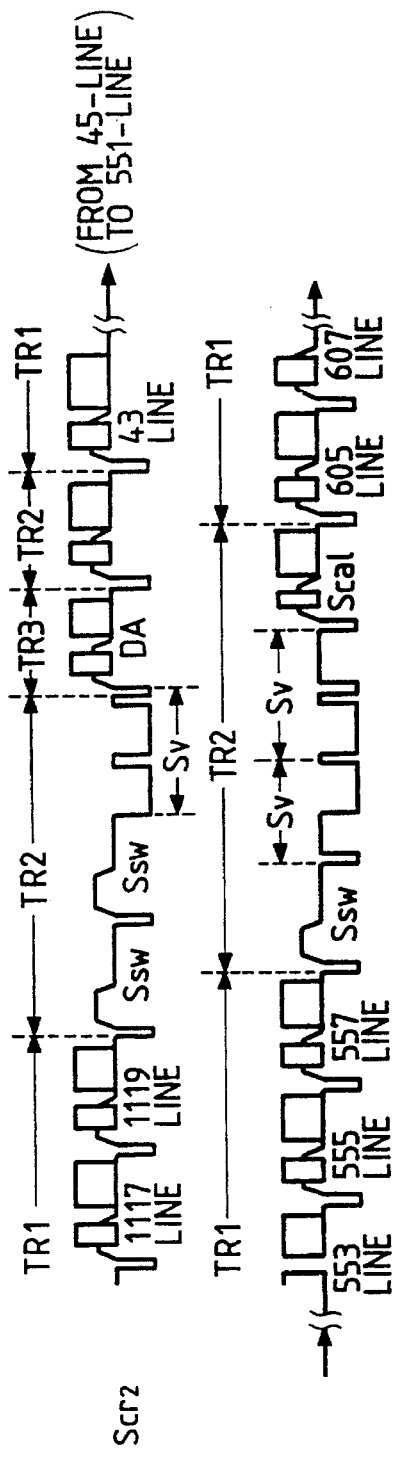

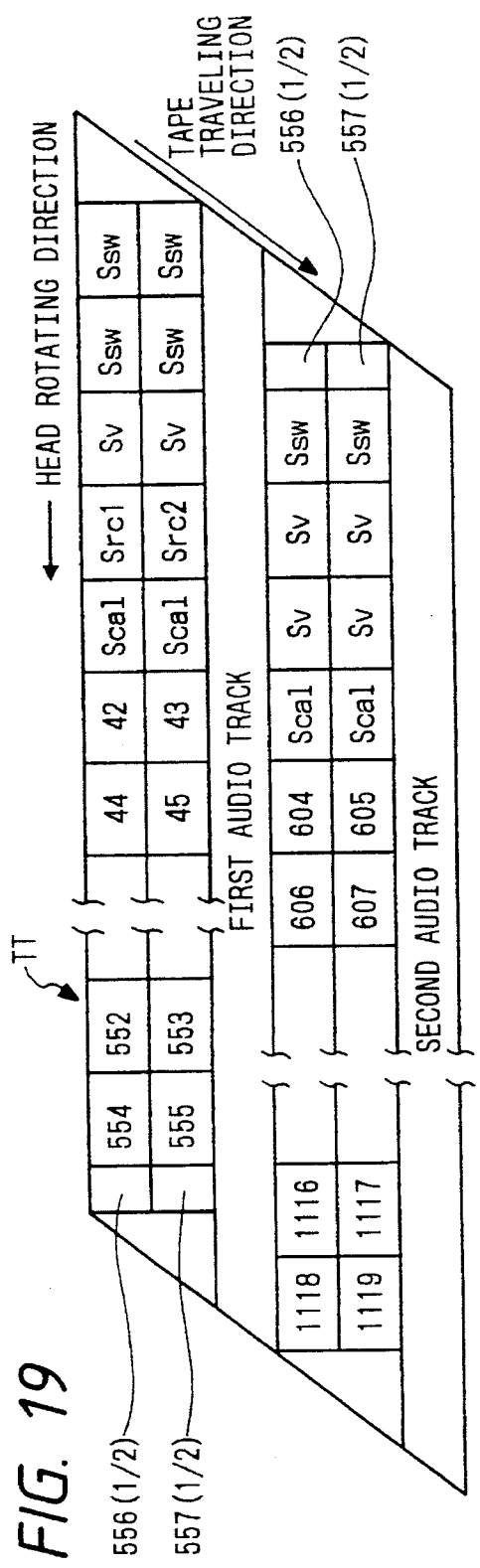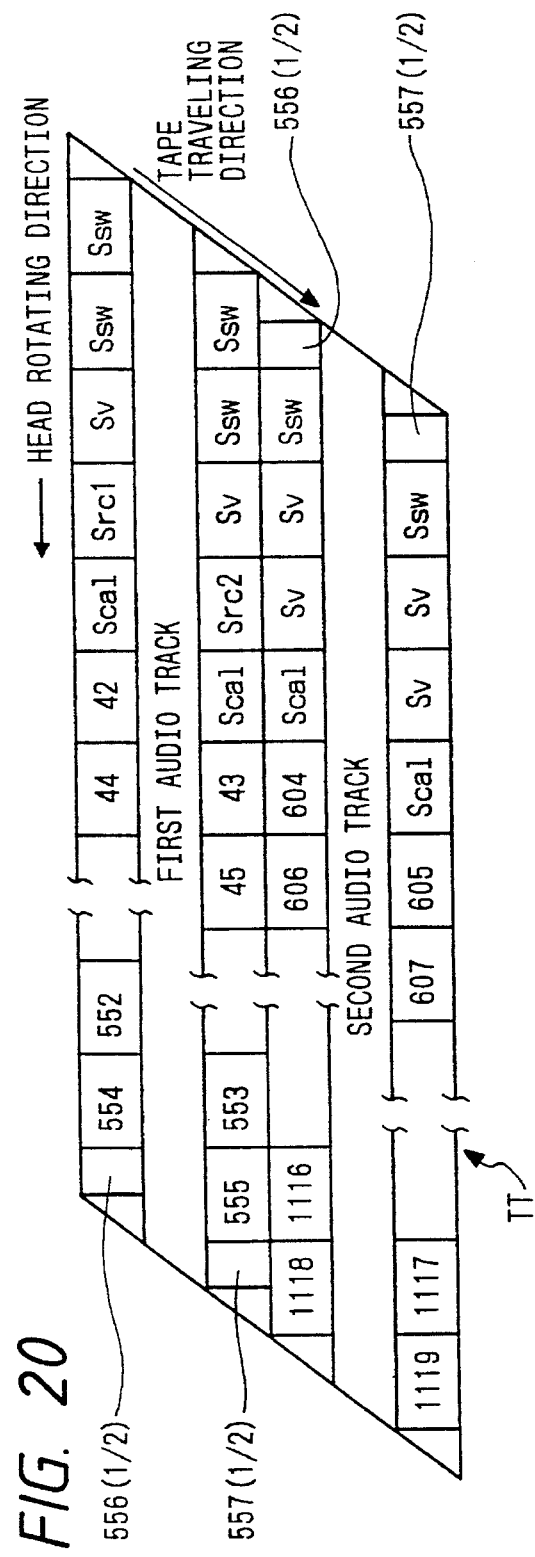
FIG. 19
FIG. 20

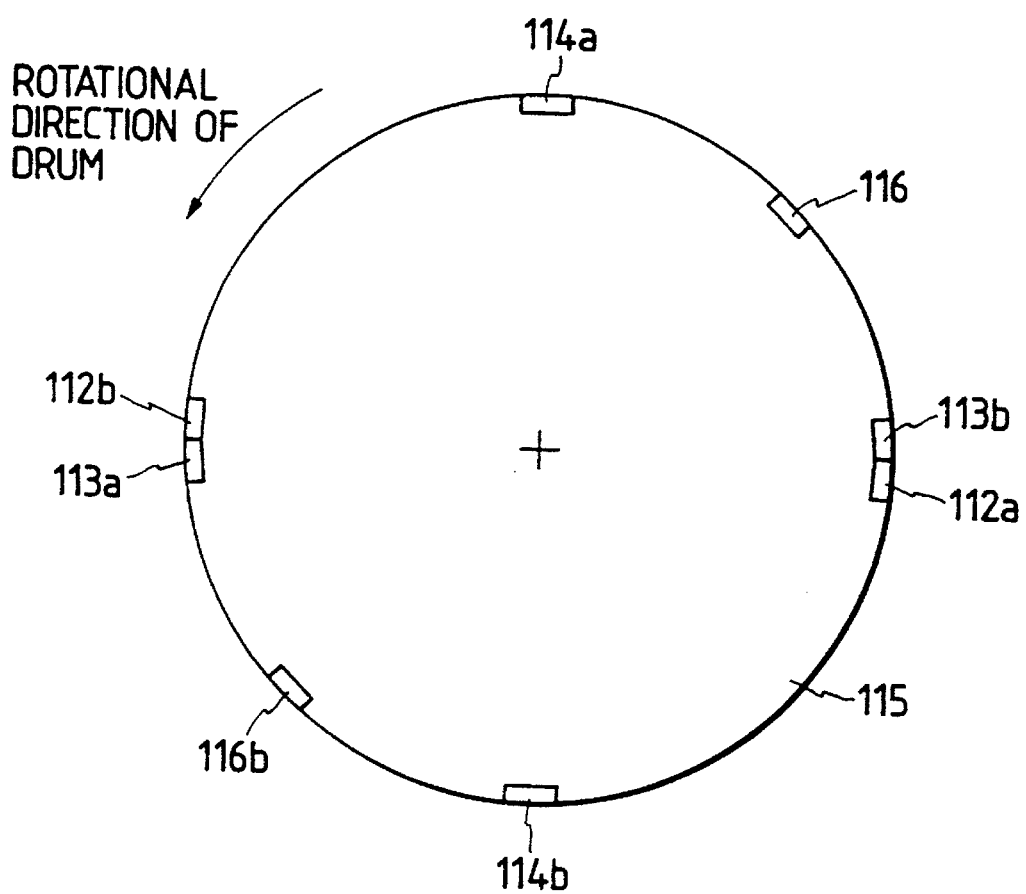

FIG. 32A CODE "0"

FIG. 32B CODE "1"

| CODE | STANDARD RECORDING SPEED | LOW RECORDING SPEED |
|---|---|---|
| "0" | FIRST RECORDING MODE | SECOND RECORDING MODE |
| "1" | THIRD RECORDING MODE | |

| CODE | STANDARD RECORDING SPEED | LOW RECORDING SPEED |
|---|---|---|
| "00" | FIRST RECORDING MODE | SECOND RECORDING MODE |
| "10" | THIRD RECORDING MODE | |
| "11" | FIFTH RECORDING MODE | |

PICTURE SIGNAL RECORDING/REPRODUCING METHOD AND APPARATUS FOR RECORDING/REPRODUCING A HIGH-DEFINITION PICTURE SIGNAL AND A NORMAL PICTURE SIGNAL

The present invention is a continuation-in-part application of application Ser. No. 08/224,493 (Title: HIGH-DEFINITION PICTURE SIGNAL RECORDING/REPRODUCING APPARATUS FOR RECORDING AND REPRODUCING A HIGH-DEFINITION PICTURE SIGNAL CONTROLLED ITS AMPLITUDE LEVEL) filed on APR. 7, 1994.

BACKGROUND OF THE INVENTION

1. Field of the Invention

The present invention relates to a high-definition picture signal recording apparatus for recording a high-definition picture signal of which an amplitude level is controlled, a high-definition picture signal reproducing apparatus for reproducing a high-definition picture signal of which an amplitude level is controlled, and a high-definition picture signal recording/reproducing apparatus for recording and reproducing a high-definition picture signal of which an amplitude level is controlled. Also, the present invention relates to picture signal recording method and apparatus for recording not only a high-definition picture signal but also a normal picture signal. In addition, the present invention relates to a picture signal recording apparatus for recording a picture signal such as a normal picture signal or a high-definition picture signal by determining a recording mode in dependence on a type of the picture signal and a high-definition picture signal reproducing apparatus for reproducing the picture signal recorded with the high-definition picture signal recording apparatus by distinguishing the recording mode.

2-1. A First Related Art

A broad-band type of high-definition picture signal such as a high-vision signal (hereinafter, called an HD picture signal) and an extended definition television signal (hereinafter, called an EDTV signal) have been recently known. The number of horizontal scanning lines in a frame of picture image displayed with the high-definition picture signal is higher than that in a frame of picture image displayed with a conventional picture signal such as a national television system committee (NTSC) type of signal. In an apparatus utilizing the high-definition picture signal, the signal is digitized to perform various types of digital processing for a digital signal. Therefore, because a dynamic range of the digital signal is strictly limited to perform the digital processing, it is required to control all amplitude level of the high-definition picture signal.

To control the amplitude level of high-definition picture signal in a conventional method, a synchronizing signal is synchronized with the high-definition picture signal, an amplitude level of the synchronizing signal is detected, and the amplitude level of the high-definition picture signal is controlled according to the amplitude level of the synchronizing signal. However, the high-definition picture signal is often processed according to various types of digital processing in an apparatus utilizing the high-definition picture signal while deleting a part of the high-definition picture signal transferred in vertical blanking periods and horizontal synchronizing signal periods to minimize a capacity of memories for storing the high-definition picture signal. Therefore, in cases where the amplitude level of the high-definition picture signal is corrected according to the amplitude level of the synchronizing signal, there is a drawback that the correction of the amplitude level is not accurate.

To solve the drawback, a level standard signal adding apparatus in which a level standard signal is added to one of horizontal scanning lines to which a high-definition picture signal is allocated and a high-vision signal to which the level standard signal is added have been proposed by this applicant.

Also, an amplitude level correcting apparatus in which an amplitude level of a high-definition picture signal is corrected according to a level standard signal has been proposed by this applicant.

2-2. Problems of the First Related Art to be Solved by the Present Invention

However, a high-definition picture signal is recorded with a recording/reproducing apparatus while deleting a part of the high-definition picture signal allocated to peripheral horizontal scanning lines placed at upper and lower peripheral portions of an image plane. In this case, the level standard signal cannot be recorded in a recording medium of the recording/reproducing apparatus because of the deletion of the level standard signal even though the level standard signal is added to the peripheral horizontal scanning lines. Therefore, even though the high-definition picture signal is recorded and reproduced with the recording/reproducing apparatus after the amplitude level of the high-definition picture signal is corrected in a level correcting apparatus provided in a recording section of the recording/reproducing apparatus, there is a drawback that an amplitude level error of the high-definition picture signal generated in the recording/reproducing apparatus cannot be eliminated.

Also, in cases where an information signal is multiplexed in the level standard signal, there is another drawback that the information signal is undesirably deleted because of the deletion of the level standard signal.

2-3. A Second Related Art

A so-called UNIHI (a registered trademark) type of high-vision video tape recorder (VTR) has been well-known as a magnetic recording/reproducing apparatus for recording/reproducing a high-definition picture signal which has a wider frequency band than that of a normal picture signal conventionally utilized and has a larger number of scanning lines than that of the normal picture. In the high-vision VTR, a pair of color difference signals belonging to a high-definition picture signal are respectively converted in order of scanning lines to produce a plurality color difference line signals, and the color difference line signals are respectively time-compressed to produce a plurality of compressed color difference line signals. In this case, because the number of scanning lines in the high-definition picture signal is too high to record the color difference line signals, the color difference line signals are thinned out on every other scanning line to reduce the number of color difference line signals time-compressed. Also, a luminance signal belonging to a high-definition picture signal is time-compressed to produce a compressed luminance signal. Thereafter, the compressed color difference line signals and the compressed luminance signal are unified according to a time-division multiplexing to produce a time compressed integration (TCI) signal, and the TCI signal is recorded and reproduced to/from an information recording medium such as a magnetic tape.

The reason that the color difference line signals are thinned out on every other scanning line is that a quality of picture image displayed in a displaying unit according to the high-definition signal reproduced is not degraded so much.

2-4. Problems of the Second Related Art to be Solved by the Present Invention

However, In cases where not only a high-definition picture signal but also a normal picture signal conventionally utilized are recorded and reproduced to/from an information recording medium in the high-vision VTR, the normal picture signal is also thinned out on every other scanning line. As a result, there is a drawback that a quality of picture image displayed in a displaying unit according to the normal picture signal reproduced is considerably degraded because the number of scanning lines in the normal picture signal is low.

2-5. A Third Related Art

In a conventional picture signal magnetic recording and reproducing apparatus, there are two types of recording mode in cases where a picture signal is recorded and reproduced according to a S-VHS (a registered trademark) method. One of the recording modes is a normal recording mode in which a picture signal is recorded to a normal recording medium within a normal frequency band. Also, the other recording mode is a high-performance recording mode in which a picture signal is recorded to a high-performance recording medium within a wider frequency band than the normal frequency band. Therefore, a VHS cassette in which the normal recording medium is held and a S-VHS cassette in which the high-performance recording medium is held are utilized.

The recording mode is determined in dependence on a type of recording medium loaded into the conventional picture signal magnetic recording and reproducing apparatus. Therefore, the applicant has proposed a picture signal magnetic recording and reproducing apparatus in which not only a normal picture signal such as a national television system committee (NTSC) type of signal or a phase alternation by line (PAL) type of signal but also a high-definition picture signal such as a high-vision signal (hereinafter, called an HD picture signal) or an extended definition television signal (hereinafter, called an EDTV signal) are recorded and reproduced. In the picture signal magnetic recording and reproducing apparatus proposed by the applicant, there are various recording modes such as a normal recording/reproducing mode conventionally utilized, a first recording mode in which a high-definition picture signal is recorded to a super high-performance recording medium such as a metal tape at a standard speed, a second recording mode in which a normal picture signal is recorded to the super high-performance recording medium at a low speed equal to ⅓ of the standard speed and a third recording mode in which two normal picture signals are simultaneously recorded to the super high-performance recording medium at the standard speed.

2-6. Problems of the Third Related Art to be Solved by the Present Invention

However, in the conventional picture signal magnetic recording and reproducing apparatus, the normal picture signal is limitedly processed, and the recording mode is determined according to a type of recording medium. Therefore, in cases where not only the normal picture signal but also a high-definition picture signal having a wide frequency band are processed in the conventional picture signal magnetic recording and reproducing apparatus, there is a drawback that the recording mode cannot be properly determined in the conventional picture signal magnetic recording and reproducing apparatus.

SUMMARY OF THE INVENTION

A first object of the present invention is to provide, with due consideration to the drawbacks of such a conventional high-definition picture signal recording/reproducing apparatus, a high-definition picture signal recording apparatus in which an amplitude level error of a high-definition picture signal is eliminated even though the high-definition picture signal is recorded. Also, the first object is to provide a high-definition picture signal reproducing apparatus in which an amplitude level error of a high-definition picture signal is eliminated even though the high-definition picture signal recorded is reproduced. Also, the first object is to provide a high-definition picture signal recording/reproducing apparatus in which an amplitude level error of a high-definition picture signal is eliminated even though the high-definition picture signal is recorded and reproduced.

A second object of the present invention is to provide a high-definition picture signal recording apparatus, a high-definition picture signal reproducing apparatus or a high-definition picture signal recording/reproducing apparatus in which an information signal multiplexed in a level standard signal is not deleted even though the level standard signal is added to peripheral horizontal scanning lines placed at upper and lower peripheral portions of an image plane.

A third object of the present invention is to provide picture signal recording method and apparatus in which not only a high-definition picture signal but also a normal picture signal are recorded without degrading a quality of picture image displayed according to the high-definition picture signal or the normal picture signal reproduced.

A fourth object of the present invention is to provide a picture signal recording apparatus in which a picture signal such as a normal picture signal or a high-definition picture signal is recorded according to a recording mode which is determined in dependence on a type of the picture signal to match the picture signal to a performance of a recording medium. Also, the fourth object is to provide a high-definition picture signal reproducing apparatus in which a picture signal is reproduced by distinguishing the recording mode determined in the high-definition picture signal recording apparatus.

The first object is achieved by the provision of a high-definition picture signal recording apparatus for recording a high-definition picture signal in which an input level reference signal indicating an amplitude level of the high-definition picture signal is added to a particular horizontal scanning line, comprising:

level correcting means for correcting an amplitude level of a high-definition picture signal to a corrected level according to an input level reference signal of an input level standard signal added to a particular horizontal scanning line of the high-definition picture signal;

recording level reference signal generating means for generating a recording level reference signal according to the input level reference signal of the input level standard signal interposed in the high-definition picture signal of which the amplitude level is corrected in the level correcting means;

high-definition picture signal processing means for processing the high-definition picture signal of which the amplitude level is corrected in the level correcting means by deleting line signals of the high-definition picture signal allocated to peripheral horizontal scanning lines placed at upper and lower peripheral portions of an image plane and deleting the input level reference signal of the input level standard signal interposed in the high-definition picture signal, a recording picture signal being generated in the high-definition picture signal processing means;

composite signal generating means for interposing the recording level reference signal generated in the recording level reference signal generating means in the recording picture signal generated in the high-definition picture signal processing means to generate a composite signal; and recording means for recording the composite signal generated in the composite signal generating means in a recording medium.

In the above configuration, a frame of high-definition picture signal such as a luminance signal, a first color difference signal or a second color difference signal is composed of a plurality of line signals allocated to a plurality of horizontal scanning lines other than a particular horizontal scanning line and an input level reference signal added to the particular horizontal scanning line. When the high-definition picture signal is input to the high-definition picture signal recording apparatus, an amplitude level of the high-definition picture signal is corrected in the level correcting means according to the input level reference signal.

Thereafter, a recording level reference signal is generated in the recording level reference signal generating means according to the input level reference signal. In detail, the recording level reference signal is formed by changing an input level of the input level reference signal to a recording level.

Also, a part of line signals of the high-definition picture signal allocated to peripheral horizontal scanning lines placed at upper and lower peripheral portions of an image plane is deleted to decrease the amount of the line signals of the high-definition picture signal recorded in a recording medium. In addition, the input level reference signal interposed in the high-definition picture signal is deleted because the recording level reference signal is utilized in place of the input level reference signal. Therefore, a recording picture signal is generated.

Thereafter, the recording level reference signal is interposed in the recording picture signal to generate a composite signal. Thereafter, the composite signal is recorded in a recording medium.

Accordingly, even though a part of line signals of the high-definition picture signal allocated to peripheral horizontal scanning lines placed at upper and lower peripheral portions of an image plane is deleted, the recording level reference signal can be interposed in the high-definition picture signal because the recording level reference signal is generated in the recording level reference signal generating means prior to the deletion of the input level reference signal. Therefore, the composite signal including the recording level reference signal and the recording picture signal can be recorded in the recording medium, and an amplitude level error of the high-definition picture signal can be eliminated even though the recording picture signal generated from the high-definition picture signal is recorded.

The first object is also achieved by the provision of a high-definition picture signal reproducing apparatus, comprising:

composite signal reproducing means for reproducing a composite signal from a recording medium, the composite signal being composed of a recording picture signal obtained by deleting line signals of an input high-definition picture signal allocated to peripheral horizontal scanning lines placed at upper and lower peripheral portions of an image plane and a recording level reference signal indicating an amplitude level of the input high-definition picture signal;

output level reference signal generating means for generating an output level reference signal according to the recording level reference signal included in the composite signal reproduced in the composite signal reproducing means;

output high-definition picture signal generating means for generating an output high-definition picture signal by interposing the output level reference signal generated in the output level reference signal generating means in the recording picture signal of the composite signal reproduced in the composite signal reproducing means, the output level reference signal being added to a particular horizontal scanning line of the output high-definition picture signal, and the output level reference signal indicating an amplitude level of the output high-definition picture signal; and output means for outputting the output high-definition picture signal.

In the above configuration, a composite signal is recorded in a recording medium and is composed of a recording picture signal obtained by deleting line signals of an input high-definition picture signal allocated to peripheral horizontal scanning lines placed at upper and lower peripheral portions of an image plane and a recording level reference signal indicating an amplitude level of the input high-definition picture signal.

The composite signal is reproduced from the recording medium with the composite signal reproducing means. Thereafter, an output level reference signal is generated in the output level reference signal generating means according to the recording level reference signal included in the composite signal. Thereafter, an output high-definition picture signal is generated in the output high-definition picture signal generating means by interposing the output level reference signal in the recording picture signal of the composite signal. That is, the output level reference signal is added to a particular horizontal scanning line of the output high-definition picture signal. Also, the output level reference signal indicates an amplitude level of the output high-definition picture signal. Thereafter, the output high-definition picture signal is output.

Accordingly, even though the composite signal composed of a recording picture signal obtained by deleting line signals of an input high-definition picture signal allocated to peripheral horizontal scanning lines placed at upper and lower peripheral portions of an image plane and a recording level reference signal indicating an amplitude level of the input high-definition picture signal is recorded in a recording medium, the output high-definition picture signal in which the output level reference signal is interposed can be reproduced. Therefore, an amplitude level error of the output high-definition picture signal can be eliminated.

The first object is also achieved by the provision of a high-definition picture signal recording/reproducing apparatus for recording an input high-definition picture signal in which an input level reference signal indicating an amplitude level of the high-definition picture signal is added to a particular horizontal scanning line and reproducing an output high-definition picture signal, comprising:

level correcting means for correcting an amplitude level of an input high-definition picture signal to a corrected level according to an input level reference signal of an input level standard signal added to a particular horizontal scanning line of the input high-definition picture signal;

recording level reference signal generating means for generating a recording level reference signal according to the input level reference signal of the input level standard signal interposed in the input high-definition picture signal of which the amplitude level is corrected in the level correcting means;

high-definition picture signal processing means for processing the input high-definition picture signal of which the amplitude level is corrected in the level correcting means by deleting line signals of the input high-definition picture signal allocated to peripheral horizontal scanning lines placed at upper and lower peripheral portions of an image plane and deleting the input level reference signal of the input level standard signal interposed in the input high-definition picture signal, a recording picture signal being generated in the high-definition picture signal processing means;

composite signal generating means for interposing the recording level reference signal generated in the recording level reference signal generating means in the recording picture signal generated in the high-definition picture signal processing means to generate a composite signal, the recording level reference signal indicating an amplitude level of the recording picture signal;

recording and reproducing means for recording the composite signal generated in the composite signal generating means in a recording medium and reproducing the composite signal from the recording medium;

output level reference signal generating means for generating an output level reference signal according to the recording level reference signal included in the composite signal reproduced in the recording and reproducing means;

output high-definition picture signal generating means for generating an output high-definition picture signal by interposing the output level reference signal generated in the output level reference signal generating means in the recording picture signal of the composite signal reproduced in the composite signal reproducing means, the output level reference signal being added to a particular horizontal scanning line of the output high-definition picture signal, and the output level reference signal indicating an amplitude level of the output high-definition picture signal; and output means for outputting the output high-definition picture signal.

In the above configuration, the input high-definition picture signal in which the input level reference signal is interposed is changed to the composite signal in which the recording level reference signal is interposed, and the composite signal is recorded and reproduced in the recording and reproducing means. Thereafter, the composite signal is changed to the output high-definition picture signal in which the output level reference signal is interposed.

Accordingly, amplitude level errors of the input and output high-definition picture signals can be eliminated.

The first and second objects are achieved by the provision of a high-definition picture signal recording apparatus for recording a high-definition picture signal in which an input level standard signal composed of an input level reference signal indicating all amplitude level of the high-definition picture signal and an input information signal indicating a piece of prescribed information is added to a particular horizontal scanning line, comprising:

level correcting means for correcting an amplitude level of a high-definition picture signal to a corrected level according to an input level reference signal of an input level standard signal added to a particular horizontal scanning line of the high-definition picture signal;

recording level reference signal generating means for generating a recording level reference signal according to the input level reference signal of the input level standard signal interposed in the high-definition picture signal of which the amplitude level is corrected in the level correcting means;

high-definition picture signal processing means for processing the high-definition picture signal of which the amplitude level is corrected in the level correcting means by deleting line signals of the high-definition picture signal allocated to peripheral horizontal scanning lines placed at upper and lower peripheral portions of an image plane and deleting the input level reference signal of the input level standard signal interposed in the high-definition picture signal, a recording picture signal being generated in the high-definition picture signal processing means;

recording information signal generating means for replacing a piece of prescribed information obtained by decoding an input information signal of the input level standard signal interposed in the high-definition picture signal of which the amplitude level is corrected in the level correcting means with a piece of new information and generating a recording information signal by encoding the new information;

composite signal generating means for interposing the recording level reference signal generated in the recording level reference signal generating means and the recording information signal generated in the recording information signal generating means in the recording picture signal generated in the high-definition picture signal processing means to generate a composite signal; and recording means for recording the composite signal generated in the composite signal generating means in a recording medium.

In the above configuration, an input information signal indicating a piece of prescribed information is multiplexed in an input level standard signal, and the input level standard signal is interposed in a high-definition picture signal. The input information signal is decoded to obtain the prescribed information, and the prescribed information is replaced with a piece of new information if necessary in the recording information signal generating means. Thereafter, the new information is encoded to generate a recording information signal, and the recording information signal is multiplexed in a composite signal in the composite signal generating means.

Accordingly, the input information signal multiplexed in the input level standard signal is not deleted even though the input level standard signal is added to peripheral horizontal scanning lines placed at upper and lower peripheral portions of an image plane.

The first and second objects are also achieved by the provision of a high-definition picture signal reproducing apparatus, comprising:

composite signal reproducing means for reproducing a composite signal from a recording medium, the composite signal being composed of a recording picture signal obtained by deleting line signals of an input high-definition picture signal allocated to peripheral horizontal scanning lines placed at upper and lower peripheral portions of an image plane, a recording level reference signal indicating an amplitude level of the input high-definition picture signal and a recording information signal indicating a prescribed information;

output level reference signal generating means for generating an output level reference signal according to the recording level reference signal included in the composite signal reproduced in the composite signal reproducing means;

output information signal generating means for replacing the prescribed information obtained by decoding the recording information signal of the composite signal reproduced in the composite signal reproducing means with a piece of new information and generating an output information signal by encoding the new information;

output high-definition picture signal generating means for generating an output high-definition picture signal by interposing an output level standard signal composed of the output level reference signal generated in the output level reference signal generating means and the output information signal generated in the output information signal generating means in the recording picture signal of the composite signal reproduced in the composite signal reproducing means, the output level standard signal being added to a particular horizontal scanning line of the output high-definition picture signal, and the output level reference signal indicating an amplitude level of the output high-definition picture signal; and output means for outputting the output high-definition picture signal.

In the above configuration, a recording information signal indicating a prescribed information is multiplexed in a composite signal. The prescribed information is obtained in the output information signal generating means by decoding the recording information signal and is replaced with a piece of new information if necessary. Thereafter, the new information is encoded to generate an output information signal. The output information signal is multiplexed in an output level standard signal, and the output level standard signal is interposed in an output high-definition picture signal in the output high-definition picture signal generating means.

Accordingly, the recording information signal multiplexed in the recording level standard signal is not deleted even though the recording level standard signal is added to peripheral horizontal scanning lines placed at upper and lower peripheral portions of an image plane.

The first and second objects are also achieved by the provision of a high-definition picture signal recording/reproducing apparatus for recording an input high-definition picture signal in which an input level standard signal composed of an input level reference signal indicating an amplitude level of the high-definition picture signal and an input information signal indicating a piece of prescribed information is added to a particular horizontal scanning line and reproducing an output high-definition picture signal, comprising:

level correcting means for correcting an amplitude level of an input high-definition picture signal to a corrected level according to an input level reference signal of an input level standard signal added to a particular horizontal scanning line of the input high-definition picture signal;

recording level reference signal generating means for generating a recording level reference signal according to the input level reference signal of the input level standard signal interposed in the input high-definition picture signal of which the amplitude level is corrected in the level correcting means;

high-definition picture signal processing means for processing the input high-definition picture signal of which the amplitude level is corrected in the level correcting means by deleting line signals of the input high-definition picture signal allocated to peripheral horizontal scanning lines placed at upper and lower peripheral portions of an image plane and deleting the input level reference signal of the input level standard signal interposed in the input high-definition picture signal, a recording picture signal being generated in the high-definition picture signal processing means;

recording information signal generating means for replacing a piece of prescribed information obtained by decoding an input information signal of the input level standard signal interposed in the input high-definition picture signal of which the amplitude level is corrected in the level correcting means with a piece of first replaced information and generating a recording information signal by encoding the first replaced information;

composite signal generating means for interposing the recording level reference signal generated in the recording level reference signal generating means and the recording information signal generated in the recording information signal generating means in the recording picture signal generated in the high-definition picture signal processing means to generate a composite signal;

recording and reproducing means for recording the composite signal generated in the composite signal generating means in a recording medium and reproducing the composite signal from the recording medium;

output level reference signal generating means for generating an output level reference signal according to the recording level reference signal included in the composite signal reproduced in the recording and reproducing means;

output information signal generating means for replacing the the first replaced information obtained by decoding the recording information signal of the composite signal reproduced in the recording and reproducing means with a piece of second replaced information and generating an output information signal by encoding the second replaced information;

output high-definition picture signal generating means for generating an output high-definition picture signal by interposing an output level standard signal composed of the output level reference signal generated in the output level reference signal generating means and the output information signal generated in the output information signal generating means in the recording picture signal of the composite signal reproduced in the composite signal reproducing means, the output level standard signal being added to a particular horizontal scanning line of the output high-definition picture signal, and the output level reference signal indicating an amplitude level of the output high-definition picture signal; and output means for outputting the output high-definition picture signal.

In the above configuration, an input information signal indicating a piece of prescribed information is multiplexed in an input level standard signal, and the input level standard signal is interposed in an input high-definition picture signal. The input information signal is changed to a recording information signal, and the recording information signal is multiplexed in a composite signal in the composite signal generating means. Thereafter, the composite signal is recorded and reproduced in the recorded and reproducing means. Thereafter, the recording information signal is changed to an output information signal, the output information signal is multiplexed in an output level standard signal, and the output level standard signal is interposed in an output high-definition picture signal in the output high-definition picture signal generating means.

Accordingly, the input information signal multiplexed in the input level standard signal is not deleted even though the input level standard signal is added to peripheral horizontal scanning lines placed at upper and lower peripheral portions of an image plane. Also, the recording information signal multiplexed in the recording level standard signal is not deleted even though the recording level standard signal is added to peripheral horizontal scanning lines placed at upper and lower peripheral portions of an image plane.

The third object is achieved by the provision of a picture signal recording method for recording a normal picture signal and a high-definition picture signal in which the number of scanning lines is higher than that in the normal picture signal, comprising the steps of:

time-compressing a plurality of luminance line signals of a luminance signal pertaining to a normal picture signal on every scanning line, each of the luminance line signals corresponding to a scanning line;

time-compressing a plurality of first color difference line signals of a first color difference signal pertaining to the normal picture signal on every scanning line, each of the first color difference line signals corresponding to a scanning line;

time-compressing a plurality of second color difference line signals of a second color difference signal pertaining to the normal picture signal, each of the second color difference line signals corresponding to a scanning line;

multiplexing in time division the luminance line signals time-compressed, the first color difference line signals time-compressed and the second color difference line signals time-compressed on every scanning line to produce a recorded TCI signal pertaining to the normal picture signal;

recording the recorded TCI signal pertaining to the normal picture on a recording medium;

alternately deleting a first color difference line signal of a first color difference signal pertaining to a high-definition picture signal and a second color difference line signal of the second color difference signal pertaining to the high-definition picture signal on every scanning line to produce a plurality of thinned first color difference line signals of the first color difference signal and a plurality of thinned second color difference line signals of the second color difference signal pertaining to the high-definition picture signal, the number of scanning lines in the high-definition picture signal being higher than that in the normal picture signal, the first color difference signal being composed of a plurality of first color difference line signals which each correspond to a scanning line, and the second color difference signal being composed of a plurality of second color difference line signals which each correspond to a scanning line;

time-compressing the thinned first color difference line signals and the thinned second color difference line signals on every scanning line;

time-compressing a plurality of luminance line signals of a luminance signal pertaining to the high-definition picture signal on every scanning line, each of the luminance line signals corresponding to a scanning line;

multiplexing in time division half of the luminance line signals time-compressed and the thinned first color difference line signals time-compressed on every scanning line to produce a first recorded TCI signal pertaining to the high-definition picture signal;

multiplexing in time division remaining half of the luminance line signals time-compressed and the thinned second color difference line signals time-compressed on every scanning line to produce a second recorded TCI signal pertaining to the high-definition picture signal; and recording the first recorded TCI signal and the second recorded TCI signal on the recording medium.

In the above steps, the number of scanning lines in the high-definition picture signal is higher than that in the normal picture signal. Therefore, even though line signals (or line components) of the high-definition picture signal are intermittently deleted, a quality of picture image obtained by reproducing the high-definition picture signal intermittently deleted is not degraded so much.

In the present invention, in cases where a normal picture signal is recorded, a luminance signal and a pair of first and second color difference signals pertaining to the normal picture signal are time-compressed without intermittently deleting line signals of the luminance and color difference signals. Thereafter, the luminance anti color difference signals time-compressed are multiplexed in time division and are recorded on a recording medium.

Accordingly, a quality of picture image displayed according to the normal picture signal reproduced is not degraded.

In contrast, in cases where a high-definition picture signal is recorded, a pair of first and second color difference signals pertaining to the high-definition picture signal are alternately deleted on every scanning line. Therefore, the first and second color difference signals pertaining to the high-definition picture signal are respectively thinned out. Thereafter, a luminance signal pertaining to the high-definition picture signal is time-compressed, and the first and second color difference signals thinned out are time-compressed. Thereafter, the luminance and color difference signals time-compressed are multiplexed in time division and are recorded on the same recording medium.

Accordingly, even though the high-definition picture signal ranging in a wider frequency band than that in the normal picture signal is input to a picture signal recording apparatus, the high-definition picture signal can be recorded in the same manner as the normal picture signal because the first and second color difference signals pertaining to the high-definition picture signal are respectively thinned out. Also, a quality of picture image obtained by reproducing the high-definition picture signal thinned out is not degraded so much.

It is preferred that a first ratio in time compression degree of the first or second color difference line signals to the luminance line signals pertaining to the normal picture signal be larger than a second ratio in time compression degree of the thinned first or second color difference line signals to the luminance line signals pertaining to the heigh-definition picture signal.

In the above configuration, a frequency band ratio of the first or second color difference signal to the luminance signal is set to an appropriate ratio for domestic use in comparison that the first ratio is the same as the second ratio. Accordingly, a high quality of picture signal can be recorded on the recording medium regardless of whether the high-definition picture signal or the normal picture signal is input to a picture signal recording apparatus.

The third object is also achieved by the provision of a picture signal recording apparatus for recording a normal picture signal and a high-definition picture signal in which the number of scanning lines is higher than that in the normal picture signal, comprising:

selecting means for selecting either a high-definition picture signal or a normal picture signal, the high-definition picture signal and the normal picture signal being respectively composed of a luminance signal, a first color difference signal and a second color difference signal;

recording processing means for time-compressing a plurality of luminance line signals of the luminance signal pertaining to the normal picture signal on every scanning line in cases where the normal picture signal is selected in the selecting means, time-compressing a plurality of first color difference line signals of the first color difference signal pertaining to the normal picture signal on every scanning line in cases where the normal picture signal is selected in the selecting means, time-compressing a plurality of second color difference line signals of the second color difference signal pertaining to the normal picture signal in cases where the normal picture signal is selected in the selecting means, multiplexing in time division the luminance line signals time-compressed, the first color difference line signals time-compressed and the second color difference line signals time-compressed on every scanning line to produce a recorded TCI signal pertaining to the normal picture signal, alternately deleting a first color difference line signal of the first color difference signal pertaining to the high-definition picture signal and a second color difference line signal of the second color difference signal pertaining to the high-definition picture signal on every scanning line to produce a plurality of thinned first color difference line signals and a plurality of thinned second color difference line signals from a plurality of first color difference line signals of the first color difference signal and a plurality of second color difference line signals of the second color difference signal in cases where the high-definition picture signal is selected in the selecting means, time-compressing the thinned first color difference line signals and the thinned second color difference line signals on every scanning line, time-compressing a plurality of luminance line signals of the luminance signal pertaining to the high-definition picture signal on every scanning line in cases where the high-definition picture signal is selected in the selecting means, multiplexing in time division half of the luminance line signals time-compressed and the thinned first color difference line signals time-compressed on every scanning line to produce a first recorded TCI signal pertaining to the high-definition picture signal, and multiplexing in time division remaining half of the luminance line signals time-compressed and the thinned second color difference line signals time-compressed on every scanning line to produce a second recorded TCI signal pertaining to the high-definition picture signal; and magnetic head means for recording the recorded TCI signal pertaining to the normal picture signal on a recording medium in cases where the normal picture signal is selected in the selecting means, and recording the first and second recorded TCI signals pertaining to the high-definition picture signal on the recording medium in cases where the high-definition picture signal is selected in the selecting means.

In the above configuration, either a high-definition picture signal or a normal picture signal is selected in the selecting means. In cases where the normal picture signal is selected, the normal picture signal is processed in the recording processing means. In detail, a plurality of luminance line signals of a luminance signal and a plurality of first and second color difference line signals of first and second color difference signals pertaining to the normal picture signal are respectively time-compressed on every scanning line, and the luminance line signals time-compressed and the first and second color difference line signals time-compressed are multiplexed in time division. Therefore, a recorded TCI signal pertaining to the normal picture signal. Thereafter, the recorded TCI signal is recorded on a recording medium in the magnetic head apparatus.

Also, in cases where the high-definition picture signal is selected in the selecting means, the high-definition picture signal is processed in the recording processing means. In detail, a first color difference line signal of a first color difference signal pertaining to the high-definition picture signal and a second color difference line signal of a second color difference signal pertaining to the high-definition picture signal are alternately deleted on every scanning line to produce a plurality of thinned first color difference line signals and a plurality of thinned second color difference line signals. Thereafter, a plurality of luminance line signals of the luminance signal and the thinned first and second color difference line signals are time-compressed on every scanning line. Thereafter, half of the luminance line signals time-compressed and the thinned first color difference line signals time-compressed are multiplexed in time division on every scanning line to produce a first recorded TCI signal pertaining to the high-definition picture signal, and remaining half of the luminance line signals time-compressed and the thinned second color difference line signals time-compressed are multiplexed in time division on every scanning line to produce a second recorded TCI signal pertaining to the high-definition picture signal. Therefore, a recorded TCI signal pertaining to the normal picture signal. Thereafter, the first and second recorded TCI signal are recorded on the same recording medium in the magnetic head apparatus.

Accordingly, even though the high-definition picture signal ranging in a wider frequency band than that in the normal picture signal is input to the picture signal recording apparatus, the high-definition picture signal can be recorded in the same manner as the normal picture signal because the first and second color difference signals pertaining to the high-definition picture signal are respectively thinned out. Also, a quality of picture image obtained by reproducing the high-definition picture signal thinned out is not degraded so much.

To achieve the third and fourth objects, it is preferred that the picture signal recording apparatus additionally include a recording mode determining unit for determining a recording mode in dependence on whether the high-definition picture signal is input to the selecting means, the high-definition picture signal being selected in preference to the normal picture signal in cases where the high-definition picture signal is input to the selecting means.

In the above configuration, the input of the high-definition picture signal to the picture signal recording apparatus is detected in the recording mode determining section, and a recording mode appropriate to record the high-definition picture signal on the recording medium is determined. Thereafter, the high-definition picture signal is necessarily recorded on the recording medium regardless of whether the normal picture signal is input to the picture signal recording apparatus. Therefore, the high-definition picture signal utilized to record a program at a high quality can be recorded in preference to the normal picture signal utilized to record a program at a normal quality even though the high-definition picture signal and the normal picture signal are simultaneously input to the picture signal recording apparatus. Accordingly, in cases where a program pertaining to the high-definition picture signal is the same as that pertaining to the normal picture signal, the high-definition picture signal can be selected in preference to the normal picture signal to record the program at a high quality.

In addition, it is preferred that the recording mode determining unit comprise:

picture signal detecting means for detecting the high-definition picture signal input to the selecting means; and recording mode determining means for determining a recording mode to select the high-definition picture signal according to the recording mode in the selecting means in cases where the high-definition picture signal is detected in the picture signal detecting means and select the normal picture signal according to the recording mode in the selecting means in cases where the high-definition picture signal is not detected in the picture signal detecting means.

In the above configuration, whether or not the high-definition picture signal is input to the selecting means can be judged in the picture signal detecting means. In cases where the high-definition picture signal is detected, the high-definition picture signal is selected in the selecting means in preference to the normal picture signal, and the high-definition picture signal is recorded on the recording medium. In contrast, in cases where the high-definition picture signal is not detected, the normal picture signal is selected in the selecting means and is recorded on the recording medium.

Also, it is preferred that the recording mode determining unit comprise:

picture signal detecting means for detecting the high-definition picture signal input to the selecting means;

recording speed selecting means for selecting either a standard recording speed or a low recording speed which is lower than the standard recording speed, the recording medium being run at the standard recording speed or the low recording speed selected in the recording speed selecting means; and recording mode determining means for determining a recording mode to select the high-definition picture signal according to the recording mode in the selecting means for the purpose of the recording of the high-definition picture signal on the recording medium at the standard recording speed in cases where the high-definition picture signal is detected in the picture signal detecting means and select the normal picture signal according to the recording mode in the selecting means for the purpose of the recording of the normal picture signal on the recording medium at the standard or low recording speed in cases where the high-definition picture signal is not detected in the picture signal detecting means, the normal picture signal selected in the selecting means being recorded on the recording medium at the standard recording speed in cases where the standard recording speed is selected in the recording speed selecting means, and the normal picture signal selected in the selecting means being recorded on the recording medium at the low recording speed in cases where the standard recording speed is selected in the recording speed selecting means.

In the above configuration, a recording mode is determined in the recording mode determining unit in dependence on whether the high-definition picture signal input to the selecting means is detected in the picture signal detecting means. In cases where the high-definition picture signal is detected, the high-definition picture signal is selected in the selecting means in preference to the normal picture signal and is recorded on the recording medium at the standard recording speed. In contrast, in cases where the high-definition picture signal is not detected on condition that the standard recording speed is selected in the recording speed selecting means, the normal picture signal is selected in the selecting means and is recorded on the recording medium at the standard recording speed. Also, in cases where the high-definition picture signal is not detected on condition that the low recording speed is selected in the recording speed selecting means, the normal picture signal is selected in the selecting means and is recorded on the recording medium at the low recording speed.

Accordingly, the normal picture signal can be recorded at an appropriate recording speed corresponding to a frequency band of the normal picture signal. In particular, in cases where the normal picture signal is to be recorded at the low recording speed, there is no probability that the normal picture signal is erroneously recorded at the standard recording speed higher than the low recording speed. Therefore, a utilization efficiency of the recording medium can be enhanced.

Also, it is preferred that the recording mode determining unit additionally include:

second magnetic head means for recording the recording mode determined in the recording mode determining means on the recording medium.

In the above configuration, because the recording mode determined in the recording mode determining means is recorded on the recording medium, the recording mode can be detected in a reproducing operation.

Also, it is preferred that the recording mode determining unit additionally include:

servo means for controlling a running speed of the recording medium according to the selection of the recording speed selecting means and generating a control signal to control a running speed of the recording medium in a reproducing operation;

control modulating means for modulating the control signal generated in the servo means to multiplex the recording mode determined in the recording mode determining means with the running speed indicated by the control signal; and second magnetic head means for recording the control signal modulated in the control modulating means on the recording medium to reproduce either the high-definition picture signal or the normal picture signal recorded on the recording medium with the magnetic head means in the reproducing operation according to the recording mode determined in the recording mode determining means and the recording speed of the recording medium selected in the recording speed selecting means.

In the above configuration, the recording mode determined in the recording mode determining means is recorded on the recording medium with the control signal indicating the running speed of the recording medium. Accordingly, any additional mode recording area is not required to record the recording mode. Therefore, a utilization efficiency of the recording medium can be enhanced.

Also, it is preferred that the recording mode determining unit comprises:

automatic/manual selecting means for selecting either an automatic determination of the recording mode or a manual determination of the recording mode;

input signal selecting means for selecting either the high-definition picture signal input to the selecting means or the normal picture signal input to the selecting means on condition that the manual determination is selected in the automatic/manual selecting means;

recording speed selecting means for selecting either a standard recording speed or a low recording speed which is lower than the standard recording speed, the recording medium being run at the standard recording speed or the low recording speed selected in the recording speed selecting means;

picture signal detecting means for detecting the high-definition picture signal input to the selecting means on condition that the automatic determination is selected in the automatic/manual selecting means;

recording mode determining means for determining a recording mode to select the high-definition picture signal in the selecting means according to the recording mode for the purpose of the recording of the high-definition picture signal on the recording medium at the standard recording speed in cases where the high-definition picture signal is detected in the picture signal detecting means, select the normal picture signal in the selecting means according to the recording mode for the purpose of the recording of the normal picture signal on the recording medium at the low recording speed selected in the recording speed selecting means in cases where the high-definition picture signal is not detected in the picture signal detecting means, select the high-definition picture signal in the selecting means according to the recording mode for the purpose of the recording of the high-definition picture signal on the recording medium at the standard recording speed in cases where the high-definition picture signal is selected in the input signal selecting means, and select the normal picture signal in the selecting means according to the recording mode for the purpose of the recording of the normal picture signal on the recording medium at the low recording speed in cases where the normal picture signal is selected in the input signal selecting means.

In the above configuration, the input signal selecting means is provided in the recording mode determining unit to manually select either the high-definition picture signal or the normal picture signal input to the selecting means on condition that the manual determination is selected in the automatic/manual selecting means. Therefore, in cases where the normal picture signal is selected in the input signal selecting means, the normal picture signal can be selectively recorded on the recording medium even though the normal picture signal and the high-definition picture signal are simultaneously input to the selecting means. Accordingly, even though a recording capacity of the recording medium is small, the normal picture signal can be selectively recorded for a long time because the normal picture signal is recorded at the low recording speed.

Also, the picture signal detecting means is provided in the recording mode determining unit to automatically select the high-definition picture signal input to the selecting means on condition that the automatic determination is selected in the automatic/manual selecting means. Accordingly, the high-definition picture signal utilized to record a program at a high quality can be recorded in preference to the normal picture signal utilized to record a program at a normal quality even though the high-definition picture signal and the normal picture signal are simultaneously input to the selecting means.

Also, the third and fourth object is achieved by the provision of a picture signal recording apparatus for recording a first normal picture signal, a second normal picture signal and a high-definition picture signal in which the number of scanning lines is higher than that in the first or second normal picture signal, comprising:

picture signal detecting means for detecting a high-definition picture signal;

recording speed selecting means for selecting either a standard recording speed or a low recording speed which is lower than the standard recording speed, a recording medium being run at the standard recording speed or the low recording speed selected in the recording speed selecting means;

recording mode determining means for determining a recording mode by adopting a first recording mode in cases where the high-definition picture signal is detected in the picture signal detecting means, adopting a second recording mode in cases where the high-definition picture signal is not detected in the picture signal detecting means on condition that the low recording speed is selected in the recording speed selecting means, and adopting a third recording mode in cases where the high-definition picture signal is not detected in the picture signal detecting means on condition that the standard recording speed is selected in the recording speed selecting means;

selecting means for selecting the high-definition picture signal input to the selecting means in cases where the first recording means is adopted in the recording mode determining means, selecting the first normal picture signal input to the selecting means in cases where the second recording means is adopted in the recording mode determining means, and selecting the first and second normal picture signals input to the selecting means in cases where the third recording means is adopted ill the recording mode determining means;

recording processing means for alternately deleting a first color difference signal and a second color difference signal pertaining to the high-definition picture signal on every scanning line to produce a thinned first color difference signal and a thinned second color difference signal in cases where the high-definition picture signal is selected in the selecting means, time-compressing the thinned first and second color difference signals on every scanning line, time-compressing a luminance signal pertaining to the high-definition picture signal on every scanning line in cases where the high-definition picture signal is selected in the selecting means, multiplexing in time division half of the luminance signal time-compressed and the thinned first color difference signal time-compressed on every scanning line to produce a first recorded TCI signal pertaining to the high-definition picture signal, multiplexing in time division remaining half of the luminance signal time-compressed and the thinned second color difference signal time-compressed on every scanning line to produce a second recorded TCI signal pertaining to the high-definition picture signal, time-compressing a luminance signal and first anti second color difference signals pertaining to the first normal picture signal on every scanning line in cases where the first normal picture signal is selected in the selecting means, multiplexing in time division the luminance signal time-compressed and the first and second color difference signals time-compressed on every scanning line to produce a first recorded TCI signal pertaining to the first normal picture signal, time-compressing a luminance signal and first and second color difference signals pertaining to the second normal picture signal on every scanning line in cases where the second normal picture signal is selected in the selecting means, and multiplexing in time division the luminance signal time-compressed and the first and second color difference signals time-compressed on every scanning line to produce a second recorded TCI signal pertaining to the first normal picture signal; and magnetic head means for recording the first and second recorded TCI signals pertaining to the high-definition picture signal on the recording medium at the standard recording speed selected in the recording speed selecting means, recording the first recorded TCI signal pertaining to the first normal picture signal on the recording medium at the low recording speed selected in the recording speed selecting means, and recording the first and second recorded TCI signals pertaining to the first and second normal picture signals on the recording medium at the standard recording speed selected in the recording speed selecting means.

In the above configuration, a high-definition picture signal input to the selecting means is detected in the picture signal detecting means, and either a standard recording speed or a low recording speed is selected in the recording speed selecting means. Thereafter, a recording mode is determined in the recording mode determining means according to the detection of the high-definition picture signal and the selection of a recording speed. In cases where the high-definition picture signal is detected, a first recording mode is adopted as the recording mode. In cases where the high-definition picture signal is not detected on condition that the low recording speed is selected, a second recording mode is adopted as the recording mode. In cases where the high-definition picture signal is not detected on condition that the standard recording speed is selected, a third recording mode is adopted as the recording mode. Thereafter, the high-definition picture signal, a first normal picture signal or a second normal picture signal is recorded on a recording medium according to the recording mode determined in the recording mode determining means.

In detail, in cases where the first recording mode is adopted, the high-definition picture signal is selected in the selecting means and is processed in the recording processing means. That is, first and second color difference signals pertaining to the high-definition picture signal are alternately deleted on every scanning line to produce a thinned first color difference signal and a thinned second color difference signal. Thereafter, half of a luminance signal pertaining to the high-definition picture signal and the thinned first color difference signal are time-compressed and multiplexed in time division to produce a first recorded TCI signal, and remaining half of the luminance signal and the thinned second color difference signal are time-compressed and multiplexed in time division to produce a second recorded TCI signal. Thereafter, the first and second recorded TCI signals are recorded on the recording medium through the magnetic head means at the standard recording speed.

In cases where the second recording mode is adopted, the first normal picture signal is selected in the selecting means and is processed in the recording processing means. That is, a luminance signal and first and second color difference signals pertaining to the first normal picture signal are time-compressed and multiplexed to produce a first recorded TCI signal. Thereafter, the first recorded TCI signal is recorded on the recording medium through the magnetic head means at the low recording speed.

In cases where the third recording mode is adopted, the first and second normal picture signals are selected in the selecting means and are processed in the recording processing means. That is, a luminance signal and first and second color difference signals pertaining to the first normal picture signal are time-compressed and multiplexed to produce a first recorded TCI signal. Also, a luminance signal and first and second color difference signals pertaining to the second normal picture signal are time-compressed and multiplexed to produce a second recorded TCI signal. Thereafter, the first and second recorded TCI signals are recorded on the recording medium through the magnetic head means at the low recording speed.

Accordingly, two types of normal picture signals pertaining to two different programs can be simultaneously recorded on the recording medium at the standard recording speed.

Also, the third and fourth objects are achieved by the provision of a picture signal reproducing apparatus for reproducing a normal picture signal and a high-definition picture signal in which the number of scanning lines is higher than that in the normal picture signal, comprising:

recording medium means for recording a reproduced TCI signal pertaining to a normal picture signal, first and second reproduced TCI signals pertaining, to a high-definition picture signal, a first control signal in which a recording speed of the high-definition picture signal and a recording mode of the high-definition picture signal is multiplexed, and a second control signal in which a recording speed of the normal picture signal and a recording mode of the normal picture signal is multiplexed, the reproduced TCI signal pertaining to the normal picture signal being composed of a luminance signal, first and second color difference signals multiplexed with each other on every scanning line and a recording mode signal indicating the recording mode of the normal picture signal, the first reproduced TCI signal pertaining to the high-definition picture signal being composed of half of luminance signal, a thinned first color difference signal multiplexed with each other on every scanning line and a recording mode signal indicating the recording mode of the high-definition picture signal, the second reproduced TCI signal pertaining to the high-definition picture signal being composed of remaining half of luminance signal and a thinned second color difference signal multiplexed with each other on every scanning line, and the thinned first and second color difference signals being composed of first and second color difference signals alternately deleted on every scanning line;

magnetic head means for reading either the reproduced TCI signal pertaining to the normal picture signal recorded on the recording medium means or the first and second reproduced TCI signals pertaining to the high-definition picture signal recorded on the recording medium means and reading either the first control signal or the second control signal recorded on the recording medium means;

normal or search reproducing mode selecting means for selecting either a normal reproducing mode or a search reproducing mode in which the reproduced TCI signal pertaining to the normal picture signal or the first and second reproduced TCI signals pertaining to the high-definition picture signal are intermittently read out from the recording medium means through the magnetic head means;

reproducing mode determining means for determining a reproducing mode corresponding to the recording mode signal included in either the reproduced TCI signal pertaining to the normal picture signal or the first reproduced TCI signal pertaining to the high-definition picture signal in cases where the normal reproducing mode is selected in the normal or search reproducing mode selecting means and determining a reproducing mode corresponding to the recording mode multiplexed in the first or second control signal recorded on the recording medium means in cases where the search reproducing mode is selected in the normal or search reproducing mode selecting means;

reproducing processing means for reproducing the luminance signal and the first and second color difference signals of the normal picture signal from the reproduced TCI signal pertaining to the normal picture signal read in the magnetic head means according to the reproducing mode determined in the reproducing mode determining means in cases where the reproduced TCI signal pertaining to the normal picture signal is read in the magnetic head means and reproducing the luminance signal and the first and second color difference signals of the high-definition picture signal from the first and second reproduced TCI signals pertaining to the high-definition picture signal read in the magnetic head means according to the reproducing mode determined in the reproducing mode determining means in eases where the first and second reproduced TCI signals pertaining to the high-definition picture signal are read in the magnetic head means; and selecting means for selecting either the luminance signal and the first and second color difference signals of the normal picture signal or the luminance signal and the first and second color difference signals of the high-definition picture signal according to the reproducing mode determined in the reproducing mode determining means.

In the above configuration, the determination of a reproducing mode corresponding to a recording mode which regulates the recording of a normal picture signal or a high-definition picture signal is required to reproduce the normal picture signal or the high-definition picture signal. In the present invention, the recording mode of the high-definition picture signal is included not only in the first reproduced TCI signal but also in the first control signal recorded on the recording medium means, and the recording mode of the normal picture signal is included not only in the reproduced TCI signal but also in the second control signal recorded on the recording medium means. In cases where the normal reproducing mode is selected in the normal or search reproducing mode selecting means, the recording mode included in the reproduced TCI signal or the first reproduced TCI signal is distinguished in the reproducing mode determining means to determine a reproducing mode.

In contrast, in cases where the search reproducing mode is selected in the normal or search reproducing mode selecting means, the recording mode included in the first or second control signal is distinguished in the reproducing mode determining means because the reproduced TCI signal or the first reproduced TCI signal is intermittently read from the recording medium means. Accordingly, because the recording mode recorded on the recording medium means is distinguished in the reproducing mode determining means, a reproducing mode corresponding to the recording mode can be rapidly determined in the reproducing mode determining means.

Also, because the recording mode included in the first reproduced TCI signal (or the reproduced TCI signal) is distinguished in case of the selection of the normal reproducing mode, the recording mode can be detected each time the first reproduced TCI signal equivalent to a frame of picture signal is reproduced even though the recording mode is indicated by a plurality of bits. In addition, because the recording mode included in the first or second control signal is distinguished in case of the selection of the search reproducing mode, the recording mode can be rapidly distinguished in the reproducing mode determining means to determine the reproducing mode.

BRIEF DESCRIPTION OF THE DRAWINGS

The objects, features and advantages of the present invention will be apparent from the following description taken in conjunction with the accompanying drawings, in which:

FIG. 4 is a block diagram of another input level standard signal generating apparatus;

FIG. 5A is a waveform of an input level standard signal Sst interposed in an input HD picture signal Sin to obtain an output HD picture signal Sout;

FIG. 5B is a waveform of a first selecting signal Sse;

FIG. 15B shows a block diagram of a level correcting section pertaining to a first color difference signal PB according to the modification of the first embodiment;

FIG. 15C shows a block diagram of a level correcting section pertaining to a second color difference signal PR according to the modification of the first embodiment;

FIG. 17A shows a waveform of a first composite recording signal Scr1 generated in a first composite signal generating section shown in FIG. 8;

FIG. 17B shows a waveform of a second composite recording signal Scr2 generated in a second composite signal generating section shown in FIG. 8;

FIG. 19 shows a magnetic tape pattern of a picture signal and first and second composite recording signals Scr1, Scr2 recorded in a magnetic tape TT according to the first embodiment;

FIG. 20 shows a magnetic tape pattern of a picture signal and first and second composite recording signals Scr1, Scr2 recorded in a magnetic tape TT according to a modification of the first embodiment;

FIG. 27 is an upper front view of a rotational drum to show an arrangement of pairs of magnetic heads on the rotational drum;

FIG. 32A shows a wave form of a recording control signal Src in which a high level period is set to X% to designate a code "0";

FIG. 32B shows a wave form of the recording control signal Src in which a high level period is set to Y% to designate a code "1";

DETAIL DESCRIPTION OF THE PREFERRED EMBODIMENTS

Preferred embodiments of high-definition picture signal recording/reproducing apparatus and method according to the present invention are described with reference to drawings.

A generating method and apparatus for generating an input level standard signal is described prior to the description of a high-definition picture signal recording/reproducing apparatus.

In an input level standard signal generating method and apparatus, an input level standard signal having a piece of input level information is added to an effective horizontal scanning line, which pertains to a high-definition picture signal transferred in a limited period except a vertical blanking period, in place of a part of the picture signal. In addition, the input level standard signal also has an identifying signal to distinguish the input level standard signal from the picture signal.

In this specification, an HD picture signal such as a luminance signal, a first color difference signal or a second color difference signal is utilized as an example of the high-definition picture signal.

Figure 1:
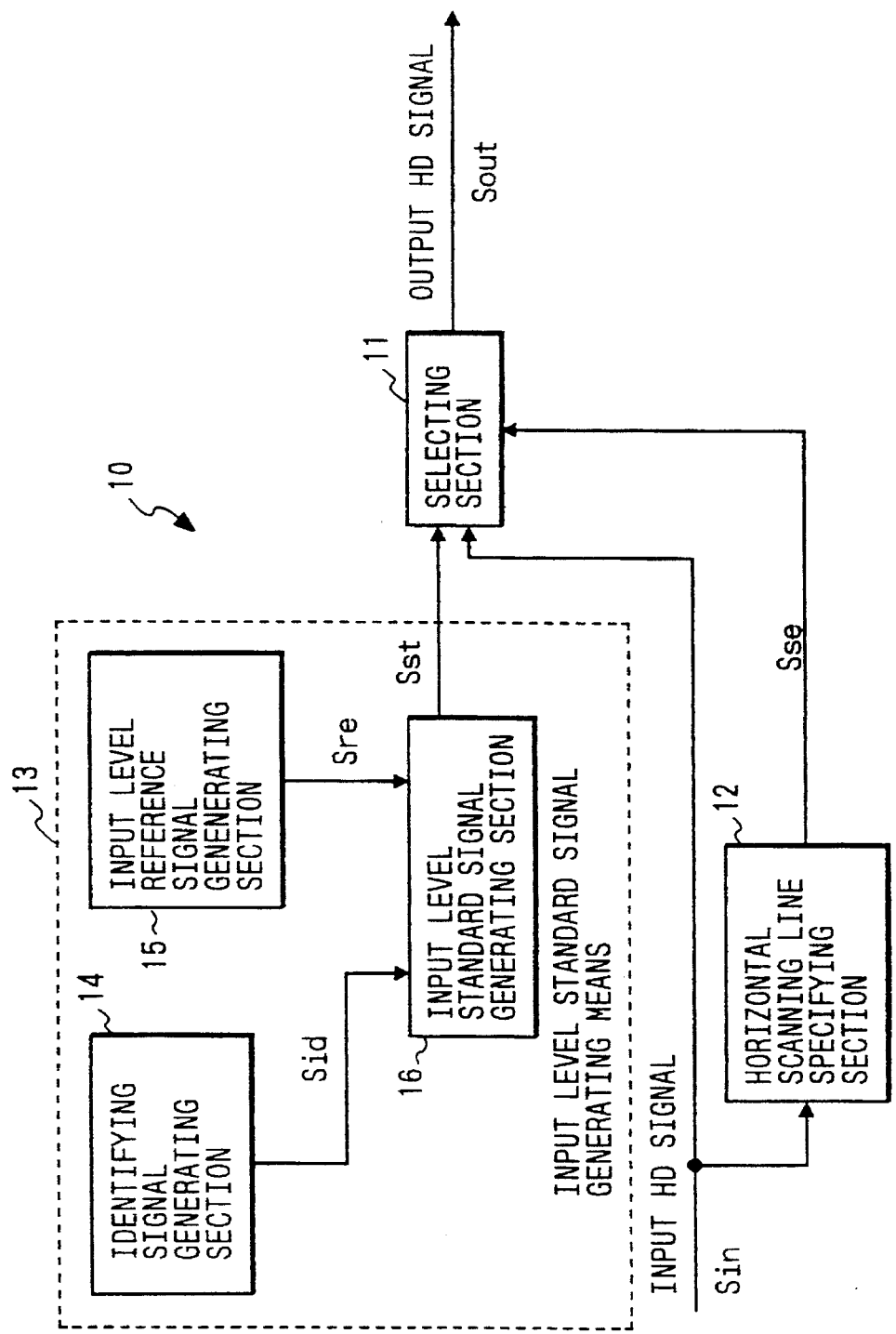
FIG. 1 is a block diagram of an input level standard signal generating apparatus.
Figure 2:
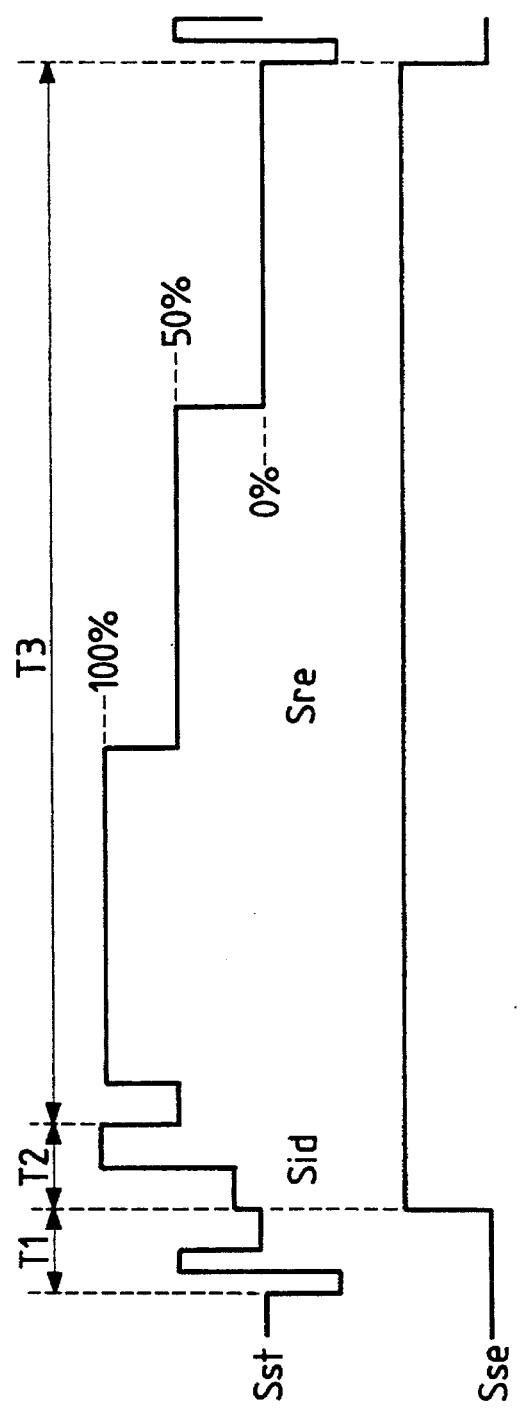
FIG. 2A shows a waveform of an input level standard signal Sst generated in an input level standard signal generating section shown in FIG. 1.
FIG. 2B shows a waveform of a first selecting signal Sse.

FIG. 1 is a block diagram of an input level standard signal generating apparatus. FIG. 2B shows a waveform of a first selecting signal Sse.

As shown in FIG. 1, in an input level standard signal generating apparatus 10, an input HD picture signal Sin is transferred one after another to a selecting section 11 and a horizontal scanning line specifying section 12 through a transmission path. The input HD picture signal Sin is a signal selected from among a luminance signal Y, a first color difference signal PB and a second color difference signal PR in conformity to Japanese high-vision standards. That is, the signals Y, PB and PR are formed by transforming three primary color signals such as a red signal R, a green signal G and a blue signal B according to equations (1), (2) and (3).

$$Y1 = 0.7154*G + 0.0721*B + 0.2125*R \quad (1)$$

$$PB1 = 0.5389*(-0.7154*G + 0.9279*B - 0.2125*R) \quad (2)$$

$$PR1 = 0.6349*(-0.7154*G - 0.0721*B + 0.7875*R) \quad (3)$$

Here, the symbols Y1, PB1 and PR1 denote an input amplitude level of the luminance signal Y, an input amplitude level of the first color difference signal PB and an input amplitude level of the second color difference signal PR.

In the horizontal scanning line specifying section 12, vertical synchronizing signals included in the input HD signals Sin are separated from horizontal synchronizing signals included in the input HD signals Sin, and the number of vertical synchronizing signals and the number of horizontal synchronizing signals are counted to specify a particular horizontal scanning line to which an input level standard signal Sst transferred from an input level standard signal generating means 13 to the selecting signal 11 is prepared to be interposed. Thereafter, a first selecting signal Sse shown in FIG. 2B is transferred from the specifying section 12 to the selecting section 11.

The input level standard signal generating means 13 comprises an identifying signal generating section 14 for generating an identifying signal Sid having a 2-bit length, an input level reference signal generating section 15 for generating an input level reference signal Sre having three reference levels of 100%, 50% and 0%, and an input level standard signal generating section 16 for combining the identifying signal Sid and the input level reference signal Sre to generate the input level standard signal Sst. The input level reference signal Sre is utilized to adjust an amplitude level of the input HD picture signal in a high-definition picture signal recording/reproducing apparatus according to the reference levels of 100%, 50% and 0%.

FIG. 2A shows a waveform of the input level standard signal Sst generated in the input level standard signal generating section 16 shown in FIG. 1.

As shown in FIG. 2A, the input level standard signal Sst generated in the input level standard signal generating section 16 is composed of the identifying signal Sid added to the particular horizontal scanning line in a second period T2 subsequent to a first period T1 in which a horizontal synchronizing signal of the input HD picture signal Sin is transferred to the particular horizontal scanning line and the input level reference signal Sre added to the particular horizontal scanning line in a third period T3 subsequent to the second period T2. The reason that the identifying signal Sid is interposed in the input level standard signal Sst prior to the input level reference signal Sre is to judge whether or not a signal pertaining to the particular horizontal scanning line is the input level standard signal Sst.

In the selecting section 11, when the first selecting signal Sse is set to a low level, the input HD picture signal Sin is selected. In contrast, when the first selecting signal Sse is set to a high level, the input level standard signal Sst generated in the input level standard signal generating section 16 is selected. Therefore, an output HD picture signal Sout in which the input level standard signal Sst added to the particular horizontal scanning line is interposed in the input HD picture signal Sin in place of a part of the input HD picture signal Sin pertaining to the third period T3 is output from the selecting section 11 to a transmission path.

The selection of the particular horizontal scanning line is described with reference to FIG. 3.

Figure 3:
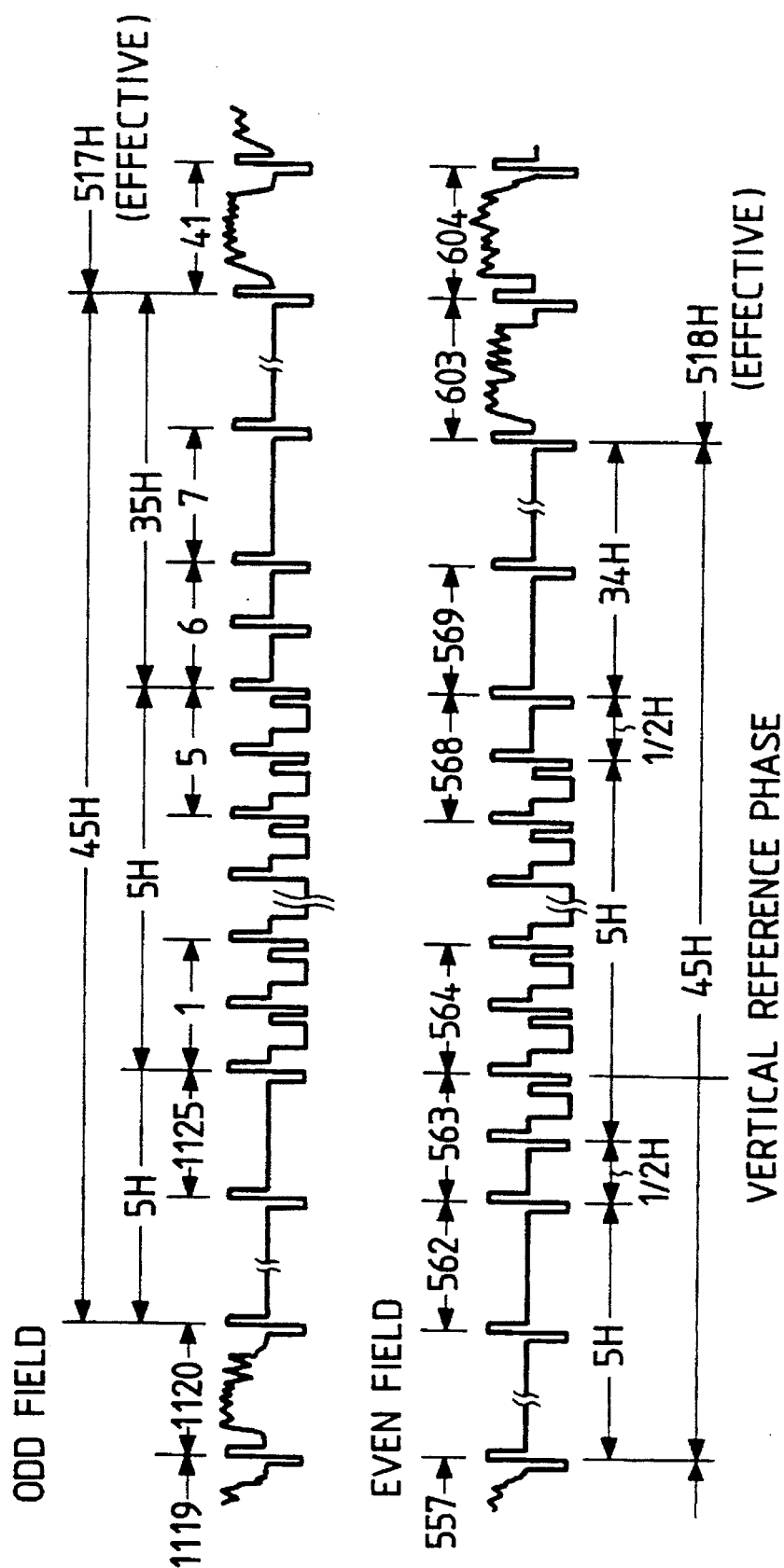
FIG. 3 shows a series of waveforms of an input HD signal Sin pertaining to various numbers of the horizontal scanning lines.

FIG. 3 shows a series of waveforms of the input HD signal Sin pertaining to various numbers of the horizontal scanning lines. The numerals shown in FIG. 3 denote the numbers of the horizontal scanning lines, and the input HD signal Sin pertaining to the first horizontal scanning line is a vertical synchronizing signal of an odd field.

As shown in FIG. 3, the input HD signal Sin comprises a plurality of line signals allocated at a plurality of horizontal scanning lines numbered by various numerals. The particular horizontal scanning line to which the input level standard signal Sst is added in the selecting section 11 is selected from among all of the horizontal scanning lines of a frame of picture image displayed in an image plane. In this case, parts of the output HD picture signal Sout transferred in the vertical blanking periods in which the vertical synchronizing signals are transferred and the horizontal synchronizing signal periods are sometimes deleted according to a function of a high-vision apparatus. Therefore, the input level standard signal Sst is required to be added to one of the effective horizontal scanning lines. Also, because the input level standard signal Sst is not the picture signal, a monitor is required to have an over-scan characteristic in which an over-scan ratio for all of the horizontal scanning lines ranges from 8% to 10% to prevent any image pertaining to the input level standard signal Sst from being displayed in the image plane of the monitor.

Therefore, one or more particular horizontal scanning lines are selected from a plurality of horizontal scanning lines consisting of a first group ranging from the forty-first horizontal scanning line (called the 41-line) to the sixty-sixth horizontal scanning line (called the 66-line), a second group ranging from the five hundred thirty-second horizontal scanning line (called the 532-line) to the five hundred fifty-seventh horizontal scanning line (called the 557-line), a third group ranging from the six hundred third horizontal scanning line (called the 603-line) to the six hundred twenty-eighth horizontal scanning line (called the 628-line), and a fourth group ranging from the one thousand ninety-fifth horizontal scanning line (called the 1095-line) to the one thousand one hundred twentieth horizontal scanning line (called the 1120-line).

Also, the number of horizontal scanning lines overscanned in a monitor differs from that overscanned in another monitor. Therefore, it is preferred that the particular horizontal scanning line be selected from effective horizontal scanning lines which each are emerged in the image plane at a low probability.

Also, the number of horizontal scanning lines in a frame of picture image displayed by utilizing the HD picture signal in conformity to a studio standard is 1035, and an effective picture displaying period is in a first range from the 41-line to the 557-line and a second range from the 603-line to the 1120-line. Also, the number of horizontal scanning lines in a frame of picture image displayed by utilizing a MUSE decoder output signal is 1032, and an effective picture displaying period is in a first range from the 42-line to the 557-line and a second range from the 604-line to the 1119-line.

Accordingly, the 41-line the 557-line, the 603-line, the 1120-line, the 42-line, the 604-line, the 557-line and the 1121-line are respectively an effective horizontal scanning line and are emerged in the image plane at a low probability. Therefore, it is preferred that one or more horizontal scanning lines selected from among the 41-line, the 42-line, the 557-line, the 603-line, the 604-line, the 1120-line and the 1121-line be specified as the particular horizontal scanning line in the specifying section 12.

In addition, the 41-line and the 603-line are not effective horizontal scanning lines in case of the MUSE decorder output signal but are effective horizontal scanning lines in case of the HD picture signal in conformity to the studio standard. Therefore, in cases where it is supposed that any HD signal is not encoded to a MUSE signal, it is preferred that the 41-line and/or the 603-line be specified as the particular horizontal scanning line in the specifying section 12 before the input level standard signal Sst is added to the particular horizontal scanning line. Also, it is preferred that the 603-line or the 604-line be specified as the particular horizontal scanning line in the specifying section 12 because the 604-line is adjacent to the 603-line, and it is preferred that the 41-line or the 42-line be specified as the particular horizontal scanning line in the specifying section 12 because the 42-line is adjacent to the 41-line.

Next, another input level standard signal generating method and apparatus is described with reference to FIGS. 4 to 6.

Figures 6A, 6B, 6C:
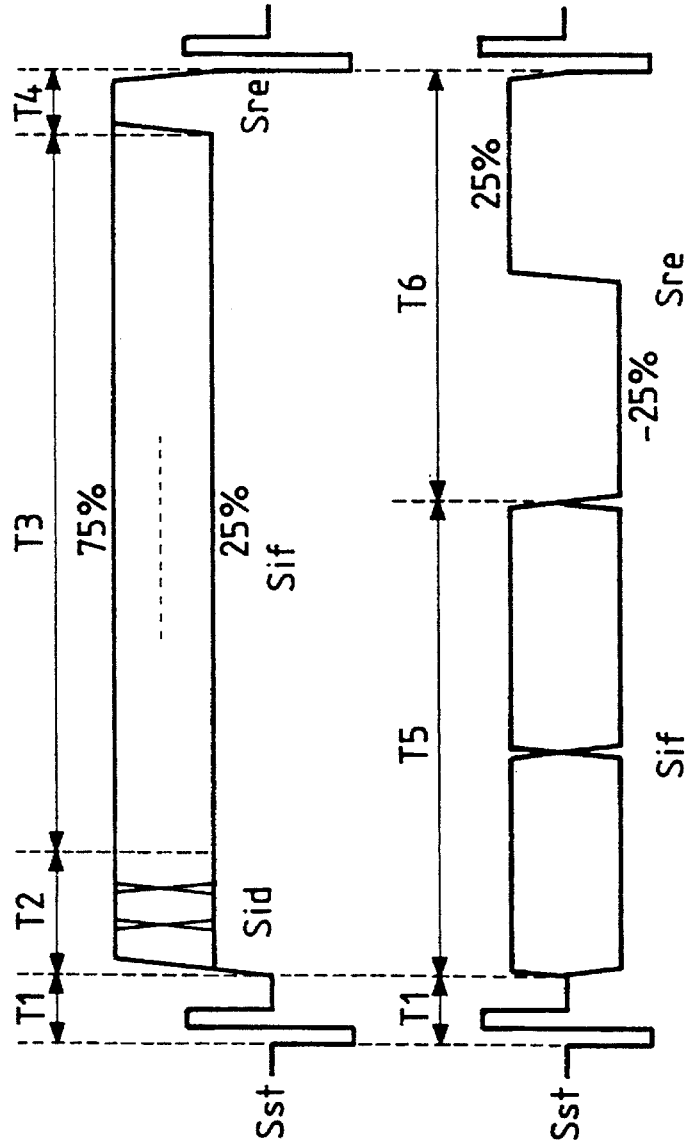
FIGS. 6A, 6B is respectively a waveform of another input level standard signal Sst interposed in an input HD picture signal Sin to obtain another output HD picture signal Sout.
FIG. 6C shows a configuration of a combined signal composed of an identifying signal Sid and an information signal Sif included in the input level standard signal Sst shown in FIG. 5A, 6A or 6B.

FIG. 4 is a block diagram of another input level standard signal generating apparatus. FIG. 5A is a waveform of an input level standard signal Sst interposed in an input HD picture signal Sin to obtain an output ID picture signal Sout. FIG. 5B is a waveform of a first selecting signal Sse. FIGS. 6A, 6B is respectively a waveform of another input level standard signal Sst interposed in an input HD picture signal Sin to obtain another output HD picture signal Sout. FIG. 6C shows a configuration of a combined signal composed of an identifying signal Sid and an information signal Sif included in the input level standard signal Sst shown in FIG. 5A, 6A or 6B.

As shown in FIG. 4, an input level standard signal generating apparatus 20 comprises an input level standard signal generating means 23, the selecting section 11, and the horizontal scanning line specifying section 12. The input level standard signal generating means 23 comprises the identifying signal generating section 14, the level reference signal generating section 15, an information signal generating section 21 for generating a piece of information signal Sif, and an input level standard signal generating section 22 for multiplexing the identifying signal Sid, the input level reference signal Sre and the information signal Sif in that order according to a time sharing process.

In the above configuration, a piece of information signal Sir output from the information signal generating section 21 is a binary signal having two information levels of 0% and 100%. As shown in FIG. 5A, the information signal Sif is added to a particular horizontal scanning line such as the 603-line or the 41-line in a fourth period T4 subsequent to the third period T3 to form an output HD picture signal Sout.

The waveform of the output HD picture signal Sout is not limited to that shown in FIG. 5A. That is, as shown in FIG. 6A, in cases where the input HD picture signal Sin is a luminance signal Y, the identifying signal Sid is added to the particular horizontal scanning line in a second period T2 subsequent to a first period T1 in which the horizontal synchronizing signal of the input HD picture signal pertaining to the particular horizontal scanning line is placed, the information signal Sif is added to the particular horizontal scanning line in a third period T3 subsequent to the second period T2, and the input level reference signal Sre is added to the particular horizontal scanning line in a fourth period T4 subsequent to the third period T3. Therefore, the input level standard signal Sst composed of the identifying signal Sid, the information signal Sif and the input level reference signal Sre is interposed in the input HD picture signal Sin.

A combined signal composed of the identifying signal Sid and the information signal Sif has, for example, a 84-bit length. That is, as shown in FIG. 6C, the combined signal consists of a post-amble signal having an 8-bit length, the identification signal Sid having an 8-bit length, a data signal having a 36-bit length, a 28-bit length time code signal pertaining to the input HD picture signal Sin and a check code signal having an 8-bit length. The signals of the combined signal respectively have a high level of 75% and a low level of 25%. The data signal indicates various pieces of information pertaining to the input HD picture signal Sin such as a piece of information pertaining to a picture displaying form (for example, the existence of a squeeze signal or a letter box signal), a piece of information pertaining to an audio mode (for example, a monophonic mode, a stereophonic mode, a monolingual mode and bilingual mode), a piece of information pertaining to the identification of various programs, a piece of information pertaining to a caption and a piece of editing information. The input level reference signal Sre has an 8-bit length and has a reference level of 75% which is the same as that of the high level in the combined signal.

In contrast, as shown in FIG. 6B, in cases where the input HD picture signal Sin is a first color difference signal PB or a second color difference signal PR, the information signal Sir is added to the particular horizontal scanning line in a fifth period T5 subsequent to the first period T1 in which the horizontal synchronizing signal of the input HD picture signal Sin pertaining to the particular horizontal scanning line is placed, and the input level reference signal Sre is added to the particular horizontal scanning line in a sixth period T6 subsequent to the fifth period T5. The reason that the identifying signal Sid is omitted is that the judgement of whether or not a signal pertaining to the particular horizontal scanning line is the input level standard signal Sst is performed by utilizing the identifying signal Sid interposed in the luminance signal Y which is transferred with the first and second color difference signals PB, PR. Also, the information signal Sir and the input level reference signal Sre respectively have a high level of 25% and a low level of −25%.

Accordingly, because the identifying signal Sid, the input level reference signal Sre and the information signal Sif are multiplexed in time sharing in the input level standard signal Sst, not only a piece of information pertaining to a reference level of input but also various pieces of information pertaining to the input HD picture signal Sin can be added to the particular horizontal scanning line and can be transferred together. Therefore, a transmission efficiency of information can be enhanced.

Also, because the information signal Sif multiplexed in the input level standard signal Sst is not deleted even though a high-vision apparatus in which parts of the input HD picture signal transferred in the vertical blanking periods and the horizontal synchronizing signal periods are deleted is utilized to transfer the input level standard signal Sst, various pieces of information indicated by the information signal Sif can be reliably transferred.

In addition, because not only the identification of the input level reference signal Sre but also the identification of the information signal Sin can be performed by the identifying signal Sid, a transmission efficiency of information can be enhanced as compared with that a horizontal scanning line in which the identifying signal Sid and the input level reference signal Sre are multiplexed differs from another horizontal scanning line in which the identifying signal Sid and the information signal Sin are multiplexed.

Next, another input level standard signal generating method and apparatus is described with reference to FIG. 7.

The reference levels of the input level reference signal Sre generated in the input level standard signal generating apparatuses 10, 20 are unchangeable. Also, an amplitude level of the input HD picture signal Sin is normal in the generating apparatuses 10, 20. However, there is a case that the input HD picture signal Sin is supplied to an input level standard signal generating apparatus after the input HD picture signal Sin is processed according to an analog processing without deleting error signals synchronized with the input HD picture signal Sin in a signal cable, an amplifier and a distributing element. In this case, an input level standard signal generating apparatus in which reference levels of the input level reference signal Sre are determined while considering amplitude levels of the error signals is required.

Figure 7:
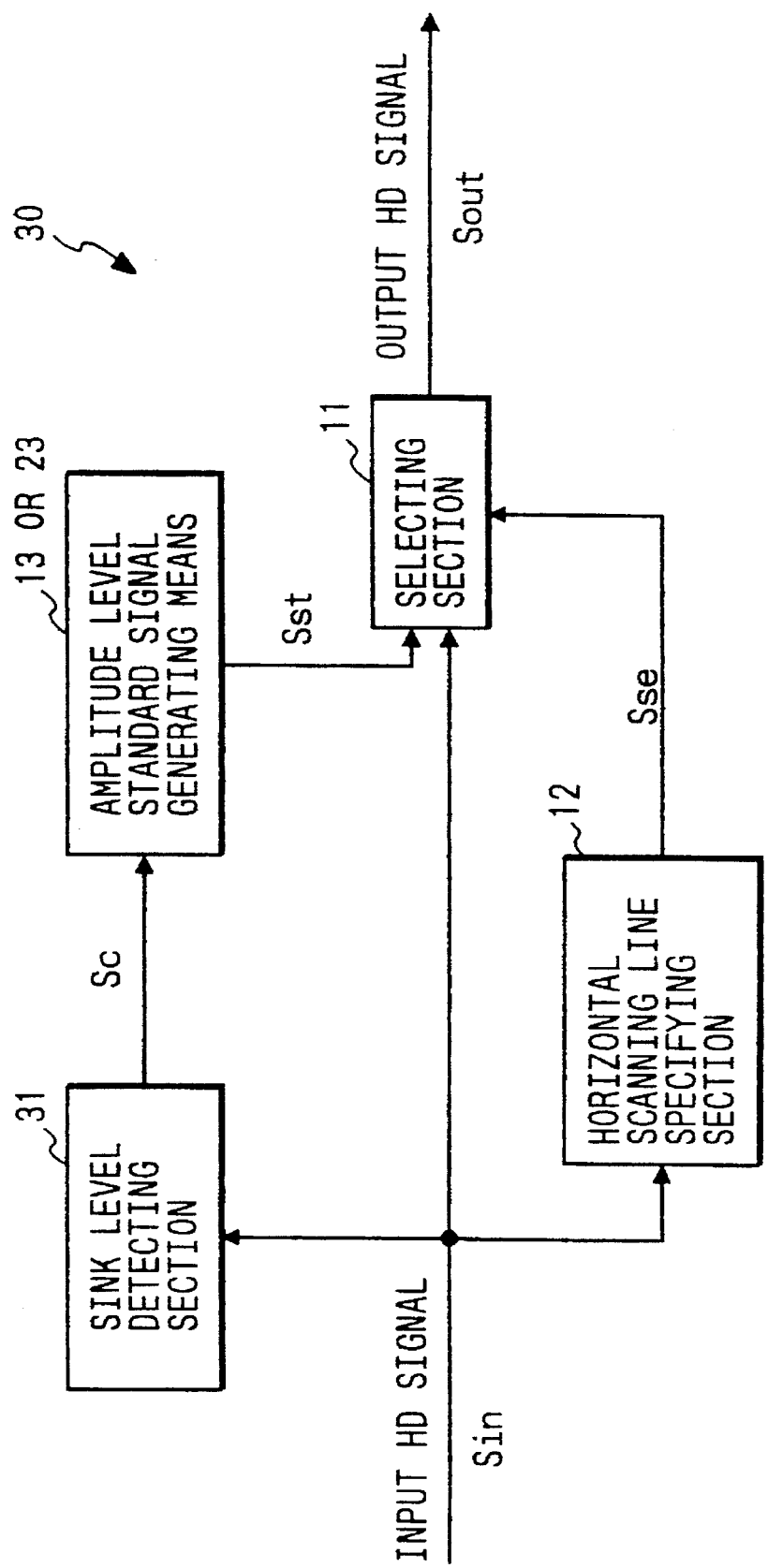
FIG. 7 is a block diagram of an input level standard signal generating apparatus in which reference levels of an input level reference signal Sre are adjusted.

FIG. 7 is a block diagram of an input level standard signal generating apparatus in which reference levels of the input level reference signal Sre are adjusted.

As shown in FIG. 7, an input level standard signal generating apparatus 30 comprises a sink level detecting section 31 for detecting an amplitude level of a horizontal synchronizing signal separated from the input HD picture signal Sin, the input level standard signal generating means 13 or 23, the specifying section 12, and the selecting section 11.

In the above configuration, the input HD picture signal Sin is supplied to the sink level detecting section 31, and a horizontal synchronizing signal is separated from the input HD signal Sin. Thereafter, an amplitude level of the horizontal synchronizing signal is detected in the sink level detecting section 31, and a control signal Sc is supplied to the input level reference signal generating section 15 of the generating means 13 or 23. In the generating section 15, reference levels of an input level reference signal Sre are adjusted according to the control signal Sc. Thereafter, the input level reference signal Sre is multiplexed in time sharing with the identifying signal Sid and the information signal Sir to form the input level standard signal Sst, and the input level standard signal Sst is added to the particular horizontal scanning line in the selecting section 11 to interpose the signal Sst in the input HD picture signal.

Accordingly, even though the input HD picture signal Sin is processed according to an analog processing without deleting error signals synchronized with the input HD picture signal Sin in a signal cable, an amplifier and a distributing element before the input HD picture signal Sin is supplied to the input level standard signal generating apparatus 30, the output HD picture signal Sout in which reference levels of the input level reference signal Sre are determined while considering amplitude levels of the error signals can be generated.

Next, a high-definition picture signal recording/reproducing apparatus according to the present invention is described.

In the present invention, the output HD picture signal Sout generated in the input level standard signal generating apparatus 10, 20 or 30 is input to a high-definition picture signal recording/reproducing apparatus to detect an input level standard signal Sst added to a particular horizontal scanning line of the output HD picture signal Sout, an amplitude level of the HD picture signal is corrected according to an input level reference signal Sre of the input level standard signal Sst, the input level standard signal Sst are decoded, pieces of information indicated by the input level standard signal Sst are replaced with other pieces of information if necessary, and a recording level standard signal obtained by encoding the input level standard signal Sst is recorded in a magnetic tape as a data signal included in a time compressed integration (TCI) signal. Also, the recording level standard signal is reproduced from the magnetic tape and is decoded, pieces of information indicated by the recording level standard signal are replaced with other pieces of information if necessary, an output level standard signal obtained by encoding the recording level standard signal is added to another particular horizontal scanning line of another HD picture signal, and the HD picture signal interposed by the output level standard signal is output.

In a high-definition picture signal recording/reproducing apparatus according to a first embodiment, a luminance signal Y equivalent to the output HD picture signal Sout in which the input level standard signal Sst shown in FIG. 6A is added to the 603-line or the 604-line and first and second color difference signals PB, PR respectively equivalent to the output HD picture signal Sout in which the input level standard signal Sst shown in FIG. 6B is added to the 603-line or the 604-line are processed. Also, a non-interpolated HD picture signal in which the input level standard signal Sst is not added to any horizontal scanning line are processed. The reason that the non-interpolated HD picture signal are also processed in this embodiment is as follows.

The input level standard signal Sst is not interposed in a HD picture signal obtained as an output signal of a high-vision camera currently utilized. Also, the input level standard signal Sst is necessarily not interposed in all types of HD picture signals. Therefore, it is required to suppose that a HD picture signal in which the input level standard signal Sst is interposed and the non-interposed HD picture signal are supplied to a high-vision apparatus.

Figure 8:
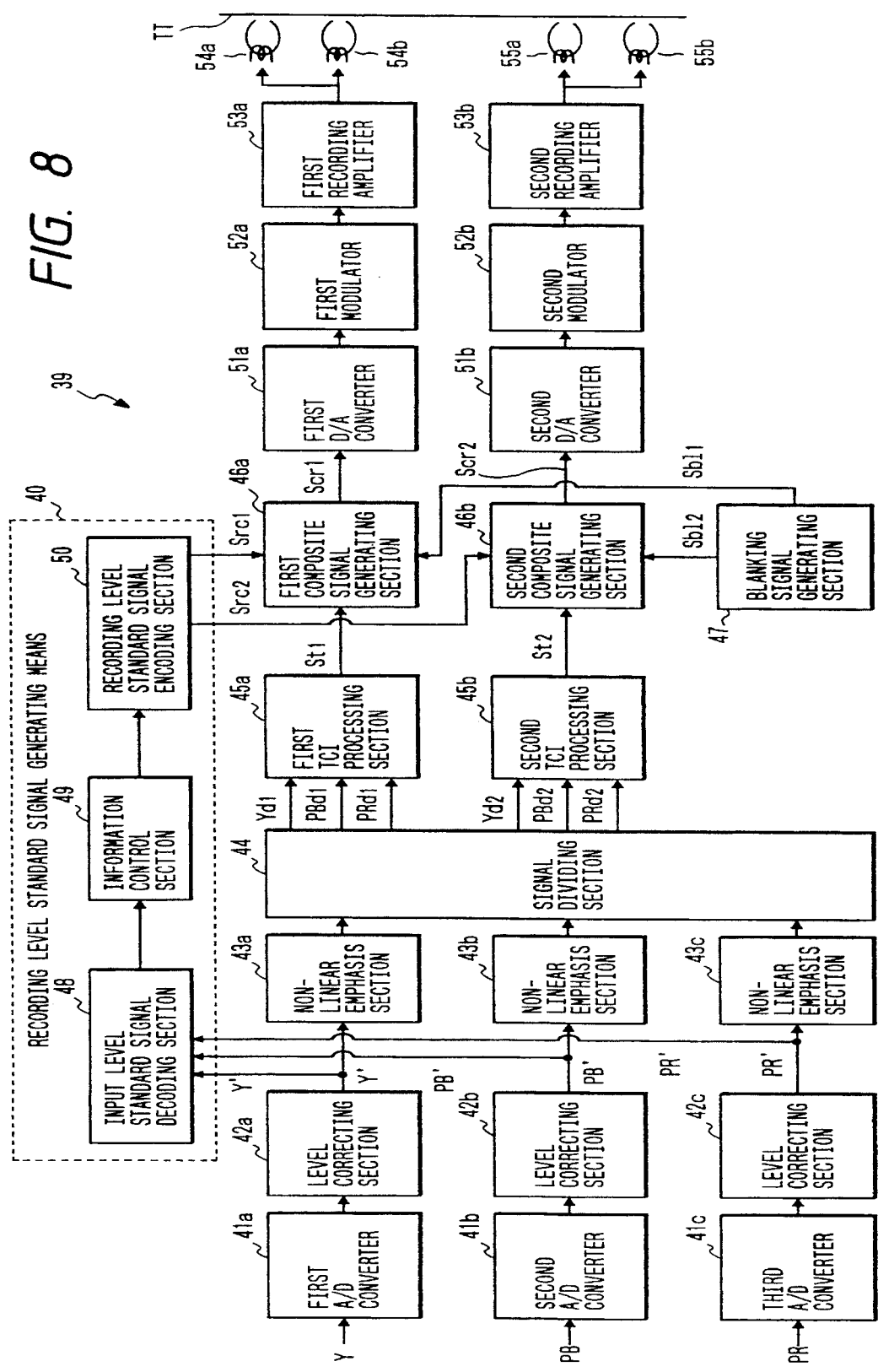
FIG. 8 is a block diagram of a high-definition picture signal recording system in a high-definition picture signal recording/reproducing apparatus according to a first embodiment of the present invention.

FIG. 8 is a block diagram of a high-definition picture signal recording system in a high-definition picture signal recording/reproducing apparatus according to a first embodiment.

A luminance signal Y, a first color difference signal PB and a second color difference signal PR are supplied to a clamping section (not shown), and pedestal levels (0%) of horizontal synchronizing signals in the signals Y, PB and PR are clamped. The signals Y, PB and PR are respectively equivalent to the output HD picture signal Sout in which the input level standard signal Sst shown in FIG. 6A or 6B is added to the 603-line or the 604-line or the non-interpolated HD picture signal. Thereafter, as shown in FIG. 8, in a high-definition picture signal recording system 39, the signals Y, PB and PR are converted to digital signals in analog-to-digital converters 41A, 41B, 41C. Thereafter, amplitude levels of the signals Y, PB and PR are corrected to normal amplitude levels in level correcting sections 42a, 42B, 42C. In detail, in cases where the input level standard signal Sst shown in FIG. 6A or FIG. 6B is added to the 603-line, an amplitude level correction is performed according to the input level standard signal Sst added to the 603-line. In cases where the input level standard signal Sst is added to the 604-line on condition that the input level standard signal Sst is not added to the 603-line, an amplitude level correction is performed according to the input level standard signal Sst added to the 604-line. In cases where the input level standard signal Sst is not added to the 603-line or the 604-line, an amplitude level correction is performed according to the horizontal synchronizing signals of each of the signals Y, PB and PR. The operation in each of the level correcting sections 42a, 42B, 42C are described in detail.

Figure 9:
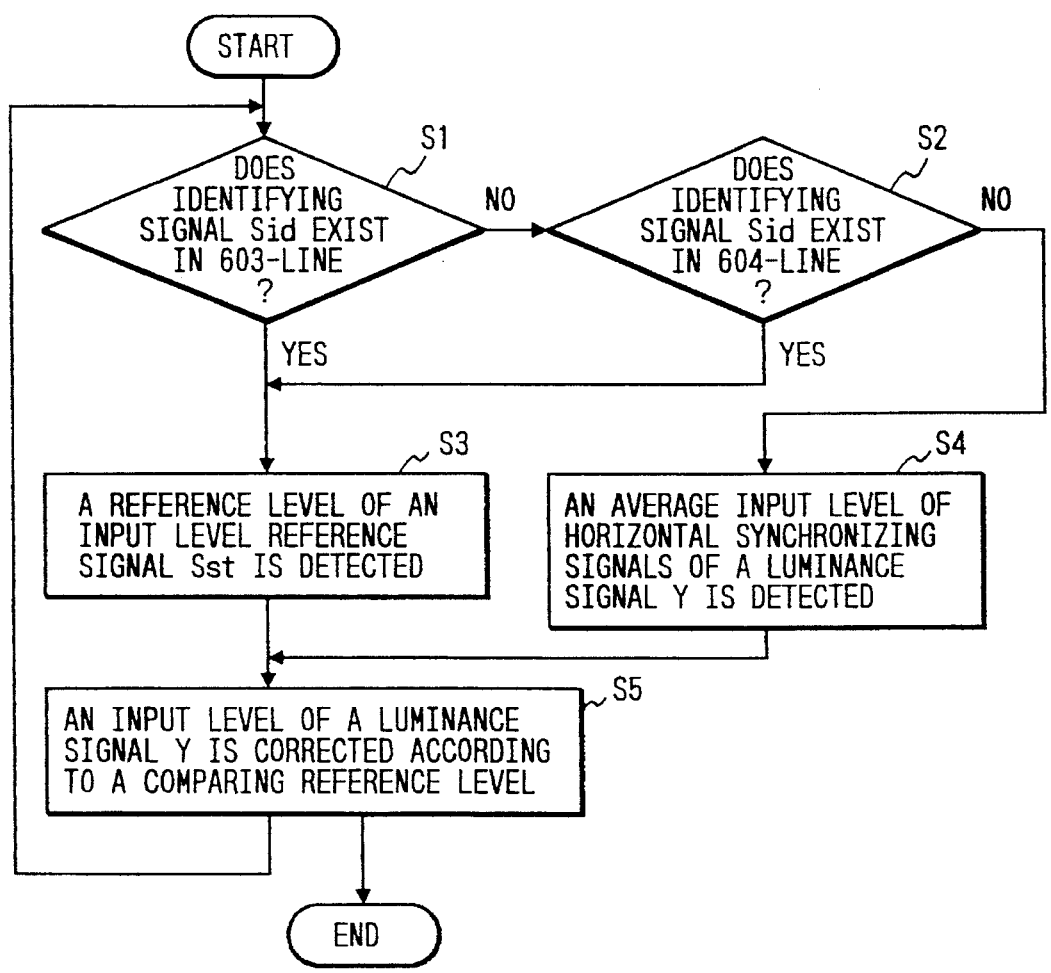
FIG. 9 shows a flow chart showing the procedure in level correcting sections 42a, 42B, 42C shown in FIG. 8.

FIG. 9 shows a flow chart showing the procedure in the level correcting sections 42a, 42B, 42C.

As shown in FIG. 9, it is judged in a step S1 whether or not the identifying signal Sid of the input level standard signal Sst exists in the 603-line. In other words, it is judged whether or not the input level standard signal Sst is added to the 603-line. In cases where the identifying signal Sid is detected in the 603-line, the procedure proceeds to a step S3. In cases where any identifying signal Sid is not detected in the 603-line, the procedure proceeds to a step S2. In the step S2, it is judged whether or not the identifying signal Sid of the input level standard signal Sst exists in the 604-line. In other words, it is judged whether or not the input level standard signal Sst is added to the 604-line. The detail of the procedure performed in the steps S1, S2 is described with reference to FIGS. 10 to 11.

Figure 10:
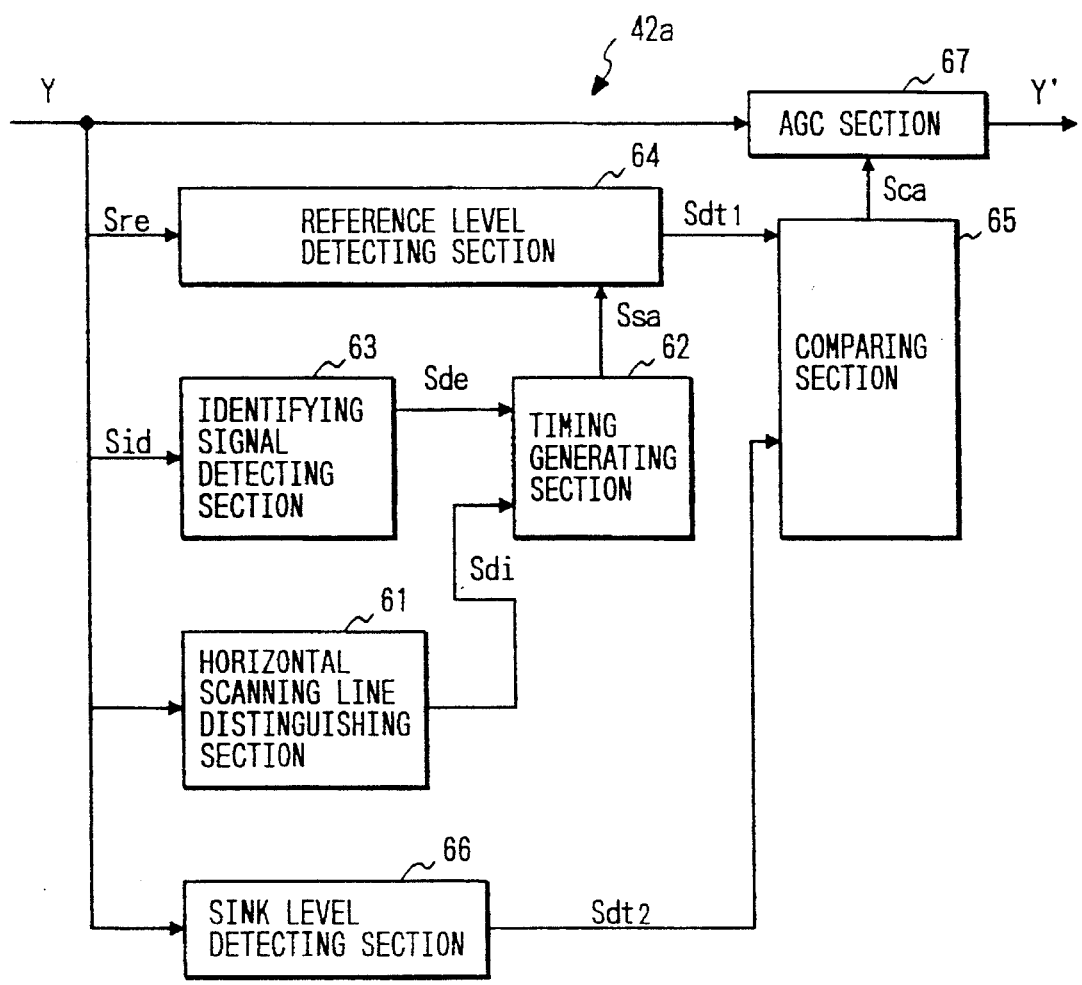
FIG. 10 shows a block diagram of level correcting sections 42a shown in FIG. 8 in which the procedure shown in FIG. 9 are performed.

FIG. 10 shows a block diagram of the level correcting sections 42a in which the procedure shown in FIG. 9 are performed.

As shown in FIG. 10, in a horizontal scanning line distinguishing section 61 of the level correcting sections 42a, vertical synchronizing signals and horizontal synchronizing signals in the luminance signal Y are detected, and the number of horizontal synchronizing signals is counted to distinguish the 603-line and the 604-line after a vertical synchronizing signal in an odd field is started. Thereafter, a horizontal scanning line distinguishing signal Sdi set to a high level in periods of the 603-line and the 604-line is sent from the horizontal scanning line distinguishing section 61 to a timing generating section 62. Also, the identifying signal Sid of the input level standard signal Sst added to the 603-line or the 604-line of the luminance signal Y is detected in an identifying signal detecting section 63, and a detecting signal Sde is sent to the timing generating section 62. The detecting signal Sde is set to a high level in a detecting period that the identifying signal Sid interpolated in the luminance signal Y is detected. Thereafter, in the timing generating section 62, a sample signal Ssa is set to a high level in a high level period that the distinguishing signal Sdi and the detecting signal Sde are respectively set to the high level, and the sample signal Ssa is sent to a reference level detecting section 64.

Returning to FIG. 9, in cases where the identifying signal Sid of the input level standard signal Sst added to the 604-line is detected in the step S2, the procedure proceeds to the step S3. In cases where any identifying signal Sid added to the 604-line is not detected in the step S2, the procedure proceeds to a step S4. In the step S3, because the input level standard signal Sst is added to the 603-line or the 604-line, a reference level of the input level reference signal Sre multiplexed in the input level standard signal Sst is detected. In detail, as shown in FIG. 10, the input level reference signal Sre of the input level standard signal Sst interposed in the luminance signal Y is detected with the sample signal Ssa and is held in the reference level detecting section 64 according to a sample-hold process. Thereafter, a first level detecting signal Sdt1 having a reference level which agrees with the reference level of the input level reference signal Sre is formed. The first level detecting signal Sdt1 is sent to a comparing section 65.

Returning to FIG. 9, in the step S4, because an input level standard signal Sst is not added to the 603-line or the 604-line, an average amplitude level of the horizontal synchronizing signals of the luminance signal Y is detected and converted to a reference level. That is, as shown in FIG. 10, the average amplitude level of the horizontal synchronizing signals is detected in a sink level detecting section 66. A detecting method for detecting the average amplitude level of the horizontal synchronizing signals is described in detail with reference to FIG. 11A.

Figure 11A:
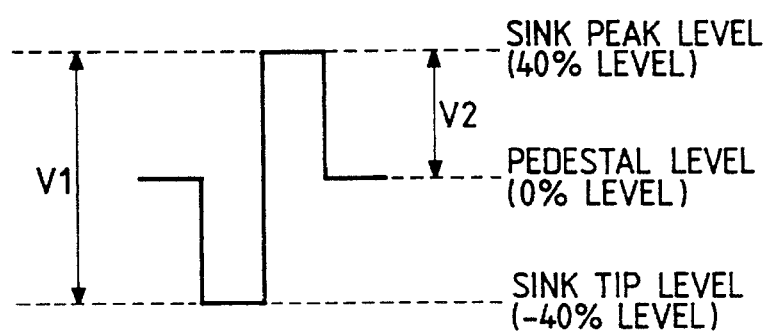
FIG. 11A shows a waveform of a ternary-value type of horizontal synchronizing signal.

FIG. 11A shows a waveform of a ternary-value type of horizontal synchronizing signal.

As shown in FIG. 11A, each of the horizontal synchronizing signals has a sink peak level of 40%, a pedestal level of 0% and a sink tip level of –40%. Therefore, a first level difference V1 between the sink peak level and the sink tip level is detected as an amplitude level of a horizontal synchronizing signal according to a first detecting method, and a second level difference V2 between the sink peak level and the pedestal level is detected as another amplitude level of a horizontal synchronizing signal according to a second detecting method. In the first embodiment, because a dynamic range in the level correcting sections 42a is substantially enlarged by shifting the dynamic range in a direction of the sink peak level, the second detecting method in which the second level difference V2 of 40% is detected as the amplitude level of the horizontal synchronizing signal is adopted. Therefore, the second level difference V2 of 40% is converted to a reference level Lr of 75% according to an equation (4).

$$Lr = V2 * 2 - 5 \qquad (4)$$

Thereafter, the reference levels of the horizontal synchronizing signals are averaged to newly form a reference level, and a second level detecting signal Sdt2 having the reference level is sent from the sink level detecting section 66 to the comparing section 65.

After the reference level is obtained in the step S3 or the step S4, as shown in FIG. 9, the procedure proceeds to a step S5, and an amplitude level of the luminance signal Y is corrected according to a comparing reference level. In detail, as shown in FIG. 10, the reference level of either the first level detecting signal Sdt1 or the second level detecting signal Sdt2 sent to the comparing section 65 are compared with a comparing reference level of 75% which is stored in the comparing section 65 in advance. In cases where the reference level of the first or second level detecting signal Sdt1 or Sdt2 is lower than the comparing reference level, an input level control signal Sca is sent to an automatic gain control (AGC) section 67 to decrease the amplitude level of the luminance signal Y. In contrast, in cases where the reference level of the first or second level detecting signal Sdt1 or Sdt2 is higher than the comparing reference level, another input level control signal Sca is sent to the AGC section 67 to increase the amplitude level of the luminance signal Y. In the AGC section 67, the amplitude level of the luminance signal Y is corrected according to the input level control signal Sca to form a corrected luminance signal Y', and the corrected luminance signal Y' is output.

Therefore, in cases where the amplitude level of the luminance signal Y is corrected in the level correcting sections 42a, the detection of the input level standard signal Sst added to the 603-line is performed prior to the detection of the input level standard signal Sst added to the 604-line, and the amplitude level of the luminance signal Y is corrected according to the input level standard signal Sst added to the 603-line. In cases where the input level standard signal Sst is not added to the 603-line, the detection of the input level standard signal Sst added to the 604-line is performed prior to the detection of an average amplitude level of the horizontal synchronizing signals in the luminance signal Y, and the amplitude level of the luminance signal Y is corrected according to the input level standard signal Sst added to the 604-line. In cases where the input level standard signal Sst is not added to the 603-line or the 604-line, the amplitude level of the luminance signal Y is corrected according to the average amplitude level of the horizontal synchronizing signals of the luminance signal Y.

Figure 11B:
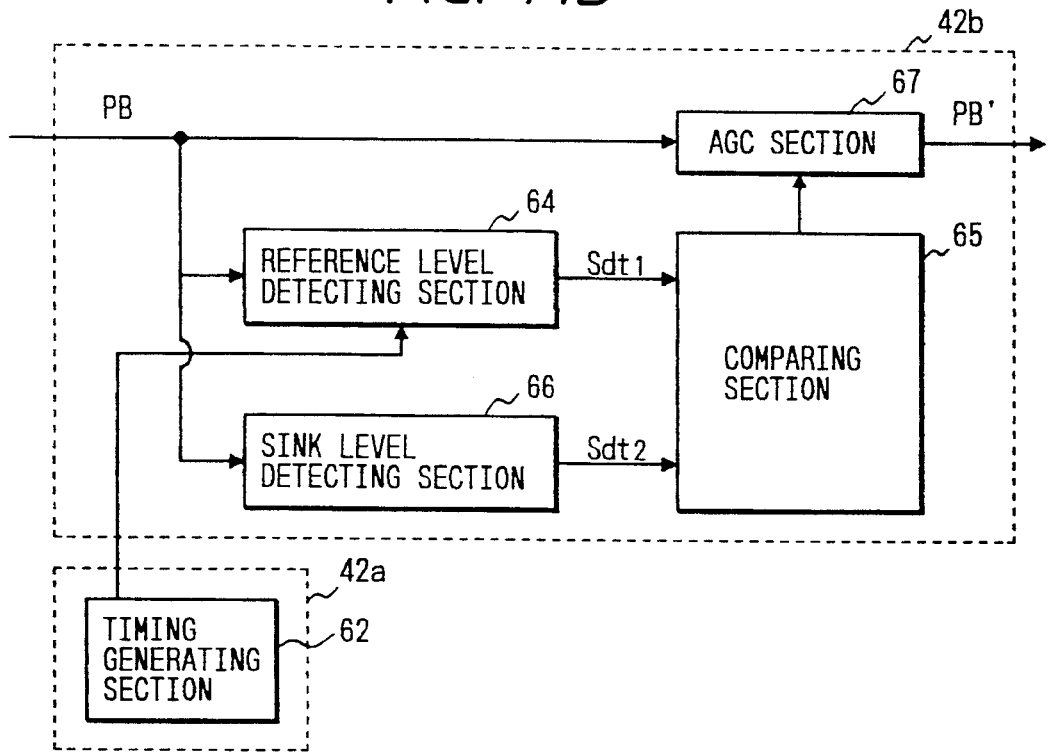
FIG. 11B shows a block diagram of level correcting sections 42b shown in FIG. 8 in which the procedure shown in FIG. 9 are performed.
Figure 11C:
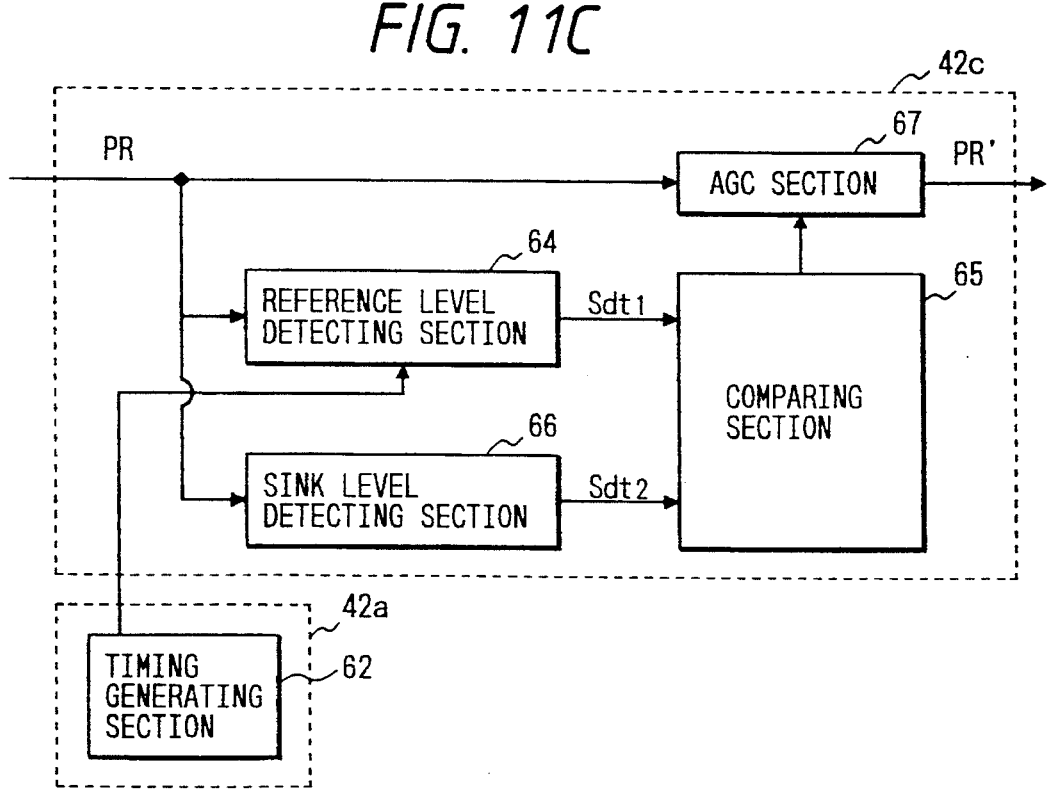
FIG. 11C shows a block diagram of level correcting sections 42c shown in FIG. 8 in which the procedure shown in FIG. 9 are performed.

In the same manner, the amplitude level of the first color difference signal PB is corrected in the level correcting section 42b, and a corrected first color difference signal PB' having a corrected amplitude level is formed. Also, the amplitude level of the second color difference signal PR is corrected in the level correcting section 42c, and a corrected second color difference signal PR' having a corrected amplitude level is formed. However, any identifying signal is not multiplexed in the input level standard signals Sst interposed in the first and second color difference signals PB, PR. Also, the number of the horizontal scanning line to which the input level standard signal Sst interposed in each of the first and second color difference signals PB, PR is added is the same as that of the horizontal scanning line to which the input level standard signal Sst interposed in the luminance signal Y is added. Therefore, as shown in FIGS. 11B, 11C, each of the level correcting sections 42b, 42c comprises the reference level detecting section 64, the comparing section 65, the sink level detecting section 66 and the AGC section 67. That is, the sample signal Ssa formed in the horizontal scanning line distinguishing section 61, the timing generating section 62 and the identifying signal detecting section 63 of the level correcting section 42a is sent to the level correcting sections 42b, 42c.

In the first embodiment, the HD picture signal in which the input level standard signal Sst is added to the 603-line or the 604-line are utilized. However, it is not limited to the 603-line and the 604-line. That is, it is applicable that the HD picture signal in which the input level standard signal Sst is added to the 41 line or the 42 line be utilized. In this case, the detection of the input level standard signal Sst added to the 41 line is performed prior to the detection of of the input level standard signal Sst added to the 42 line.

Also, it is applicable that the HD picture signal in which the input level standard signal Sst is interposed in a series of lines ranging from the 603-line to the 628-line be utilized. In this case, the input level standard signal Sst added to a horizontal scanning line numbered by a lower number has priority to be detected.

Also, the input level standard signals Sst shown in FIGS. 6A, 6B are utilized. However, it is applicable that the input level standard signal Sst shown in FIG. 2B or FIG. 5B be utilized.

Next, another level correcting section according to a modification of the first embodiment is described.

Figure 12:
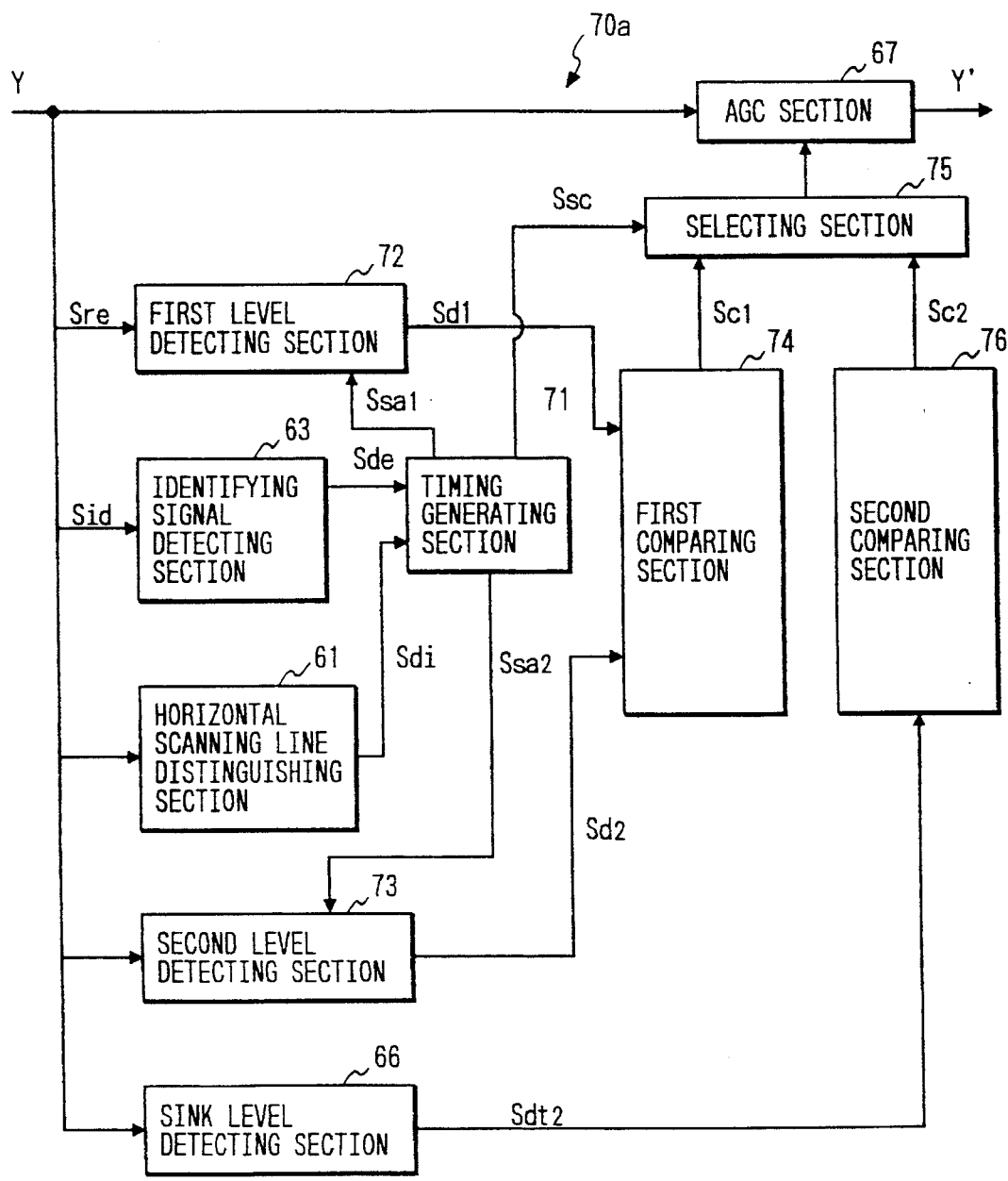
FIG. 12 shows a block diagram of a level correcting section pertaining to a luminance signal Y according to a modification of the first embodiment.
Figure 13:
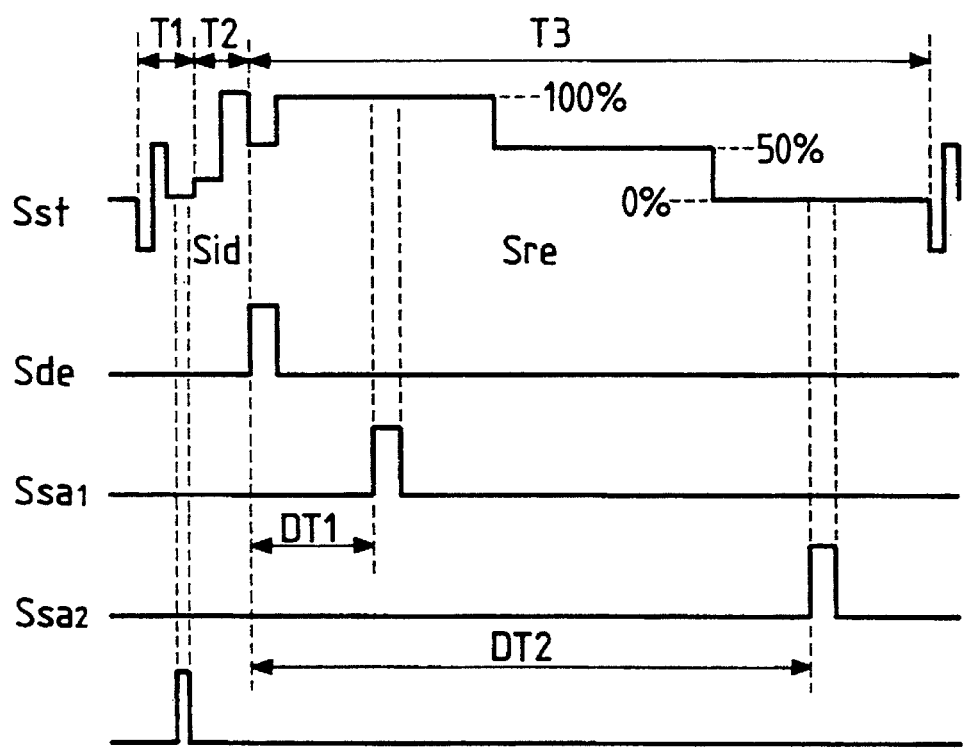
FIG. 13 is a timing chart of various signals processed in the level correcting section shown in FIG. 12.

FIG. 12 shows a block diagram of a level correcting section according to a modification of the first embodiment, the input level standard signal Sst shown in FIG. 2B being added to the 603-line or the 604-line. FIG. 13 is a timing chart of various signals processed in the level correcting section shown in FIG. 12.

As shown in FIGS. 12, 13, the amplitude level of the luminance signal Y is corrected in a level correcting section 70a. That is, the horizontal scanning line distinguishing signal Sdi generated in the distinguishing section 61 and the detecting signal Sde generated in the detecting section 63 are sent to a timing generating section 71. In the timing generating section 71, in cases where the detecting signal Sde is set to a high level in a period that the horizontal scanning line distinguishing signal Sdi is set to a high level, the detecting signal Sde is delayed by a first delaying time DT1 to form a first sampling signal Ssa1 and is delayed by a second delaying time DT2 to form a second sampling signal Ssa2. The first sampling signal Ssa1 is sent to a first level detecting section 72, and the second sampling signal Ssa2 is sent to a second level detecting section 73. Thereafter, a first amplitude level 100% of the input level reference signal Sre is sampled in a period that the first sampling signal Ssa1 is set to a high level, and a first level detecting signal Sd1 having a first amplitude level of 100% is sent to a first comparing section 74. Also, a second amplitude level 0% of the input level reference signal Sre is sampled in a period that the second sampling signal Ssa2 is set to a high level, and a second level detecting signal Sd2 having a second amplitude level of 0% is sent to the first comparing section 74. In the first comparing section 74, an amplitude level difference between the first and second amplitude levels is calculated, and a comparing reference level stored in the first comparing section 74 in advance is compared with the amplitude level difference. Thereafter, a first level control signal Sc1 is formed according to a first compared difference between the comparing reference level and the amplitude level difference. That is, a reference level of the first level control signal Sc1 is equal to the first compared difference. The first level control signal Sc1 is sent to a selecting section 75.

Also, the second level detecting signal Sdt2 generated in the sink level detecting section 66 is sent to a second comparing section 76. In the second comparing section 76, the reference level of the second level detecting signal Sdt2 is compared with a reference sink level stored in the second comparing section 76 in advance. Thereafter, a second level control signal Sc2 is formed according to a second compared difference between the reference sink level and the reference level of the second level detecting signal Sdt2. That is, a reference level of the second level control signal Sc2 is equal to the second compared difference. The second level control signal Sc2 is sent to the selecting section 75. In the selecting section 75, the first level control signal Sc1 is selected in cases where the input level standard signal Sst is added to the 603-line or the 604-line. Also, the second level control signal Sc2 is selected in cases where the input level standard signal Sst is not added to the 603-line or the 604-line. The selection of the first or second level control signal Sc1 or Sc2 is performed under control of a selection controlling signal Ssc generated in the timing generating section 71.

The procedure of the generation of the selection controlling signal Ssc is described with reference to FIGS. 14, 15.

Figure 14:
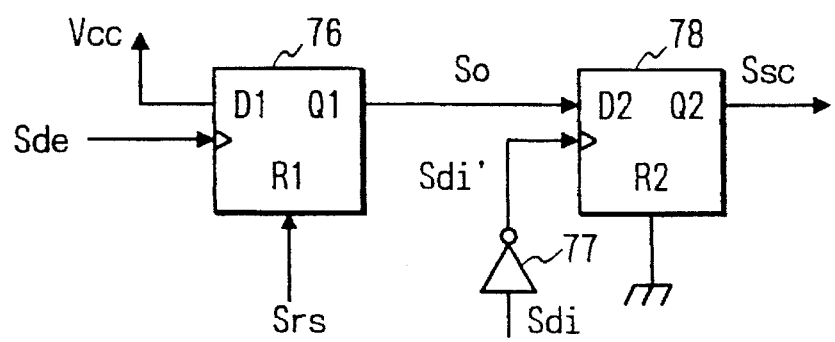
FIG. 14 is a block diagram of a part of a timing generating section shown in FIG. 12 in which a selection controlling signal Ssc is generated.
Figure 15A:
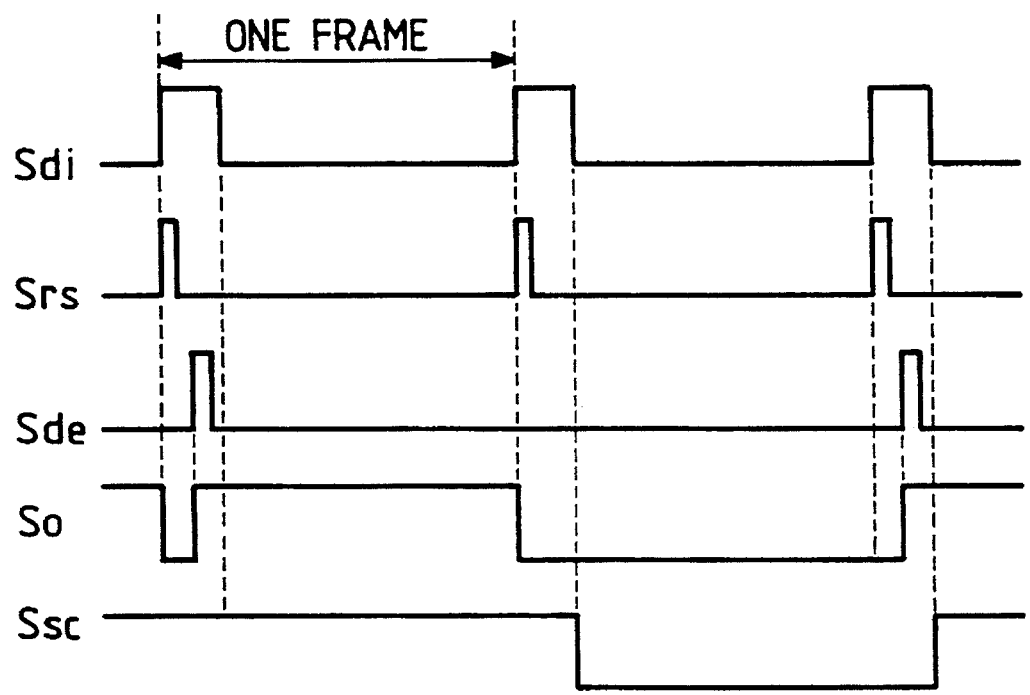
FIG. 15A is a timing chart of various signals processed in a timing generating section shown in FIG. 14.

FIG. 14 is a block diagram of a part of the timing generating section 71 in which the selection controlling signal Ssc is generated. FIG. 15A is a timing chart of various signals processed in the timing generating section 71 shown in FIG. 14.

As shown in FIGS. 14, 15A, the timing generating section 71 comprises a first D flip-flop 76 receiving a reset signal Srs and the detecting signal Sde, an inverter 77 for inverting the horizontal scanning line distinguishing signal Sdi to form an inverted distinguishing signal Sdi', and a second D flip-flop 78 receiving an output signal So of the first D flip-flop 76 and the inverted distinguishing signal Sdi'.

In the above configuration, the reset signal Srs formed by detecting leading edges of the horizontal scanning line distinguishing signal Sdi is sent to a reset terminal R1 of the first D flip-flop 76. Because the distinguishing signal Sdi is set to a high level in a period corresponding to the 603-line and 604-line, the reset signal Srs is set to a high level in a starting point of the 603-line. Also, the detecting signal Sde is sent to a clock terminal of the first D flip-flop 76. Therefore, the output signal So of the first D flip-flop 76 is sent to a data terminal D2 of the second D flip-flop 78. Also, the horizontal scanning line distinguishing signal Sdi is inverted in the inverter 77, and the inverted distinguishing signal Sdi' is sent to a clock terminal of the second D flip-flop 78. Therefore, the selection controlling signal Ssc is output from the second D flip-flop 78.

In the selecting section 75 shown in FIG. 12, the first level control signal Sc1 is selected in a period that the selection controlling signal Ssc is set to a high level, and the second level control signal Sc2 is selected in a period that the selection controlling signal Ssc is set to a low level. Thereafter, the first or second level control signal Sc1 or Sc2 is sent to the AGC section 67 to correct the amplitude level of the luminance signal Y according to the reference level of the first or second level control signal Sc1 or Sc2.

Accordingly, in cases where the input level standard signal Sst is added to the 603-line or the 604-line, the amplitude level of the luminance signal Y can be corrected according to the input level reference signal Sre multiplexed in the input level standard signal Sst. Also, in cases where the input level standard signal Sst is not added to the 603-line or the 604-line, the amplitude level of the luminance signal Y can be corrected according to the average amplitude level of the horizontal synchronizing signals of the luminance signal Y.

In the same manner, the amplitude level of the first color difference signal PB is corrected in a level correcting section 70b shown in FIG. 15B, and a corrected first color difference signal PB' having a corrected amplitude level is formed.

Also, the amplitude level of the second color difference signal PR is corrected in the level correcting section 70c shown in FIG. 15C, and a corrected second color difference signal PR' having a corrected amplitude level is formed.

In the above embodiment, the input level standard signal Sst shown in FIG. 2B is utilized. However, it is applicable that the input level standard signal Sst shown in FIG. 5A be utilized.

Returning to FIG. 8, the corrected luminance signal Y', the corrected first color difference signal PB' and the corrected second color difference signal PR' of which amplitude levels are corrected to normal amplitude levels in the level correcting sections 42a, 42b and 42c (or 70a, 70b and 70c) are sent to non-linear emphasis sections 43a, 43b and 43c and a recording level standard signal generating means 40.

In the non-linear emphasis sections 43a, 43b and 43c, high frequency components of the corrected signals Y', PB' and PR' are emphasized as compared with low frequency components of the corrected signals Y', PB' and PR'. The reason that the high frequency components of the corrected signals Y', PB' and PR' are emphasized after the amplitude levels of the signals Y, PB and PR are corrected in the level correcting sections 42a, 42b and 42c is that operational characteristics in the non-linear emphasis sections 43a, 43b and 43c vary according to amplitude levels of signals input to the sections 43a, 43b and 43c. Thereafter, each of the corrected signals Y', PB' and PR' emphasized is transferred to a signal dividing section 44. In this case, each of the corrected signals Y', PB' and PR' is composed of a plurality of line signals allocated to a plurality of horizontal scanning lines (shown in FIG. 3) other than the particular horizontal scanning line (that is, the 603-line or the 604-line) and the input level standard signal Sst added to the particular horizontal scanning line. In the signal dividing section 44, a part of line signals allocated to peripheral horizontal scanning lines placed at upper and lower peripheral portions of an image plane are deleted to decrease a volume of the line signals recorded in a recording medium such as a magnetic tape. For example, in cases where the 603-line is utilized as the particular horizontal scanning line, a first group of line signals allocated at the 1-line to the 41-line, a second group of line signals allocated at the 558-line to 602-line and the input level standard signal Sst added to the particular horizontal scanning line (that is, the 603-line) are deleted according to a MUSE standard in Japan. Thereafter, each of the corrected signals Y', PB' and PR' is divided into a first signal and a second signal in the signal dividing section 44 to record the corrected signals Y', PB' and PR' in a magnetic tape according to a two-track parallel recording. A dividing processing in the signal dividing section 44 is described in detail with reference to FIG. 16.

Figure 16:
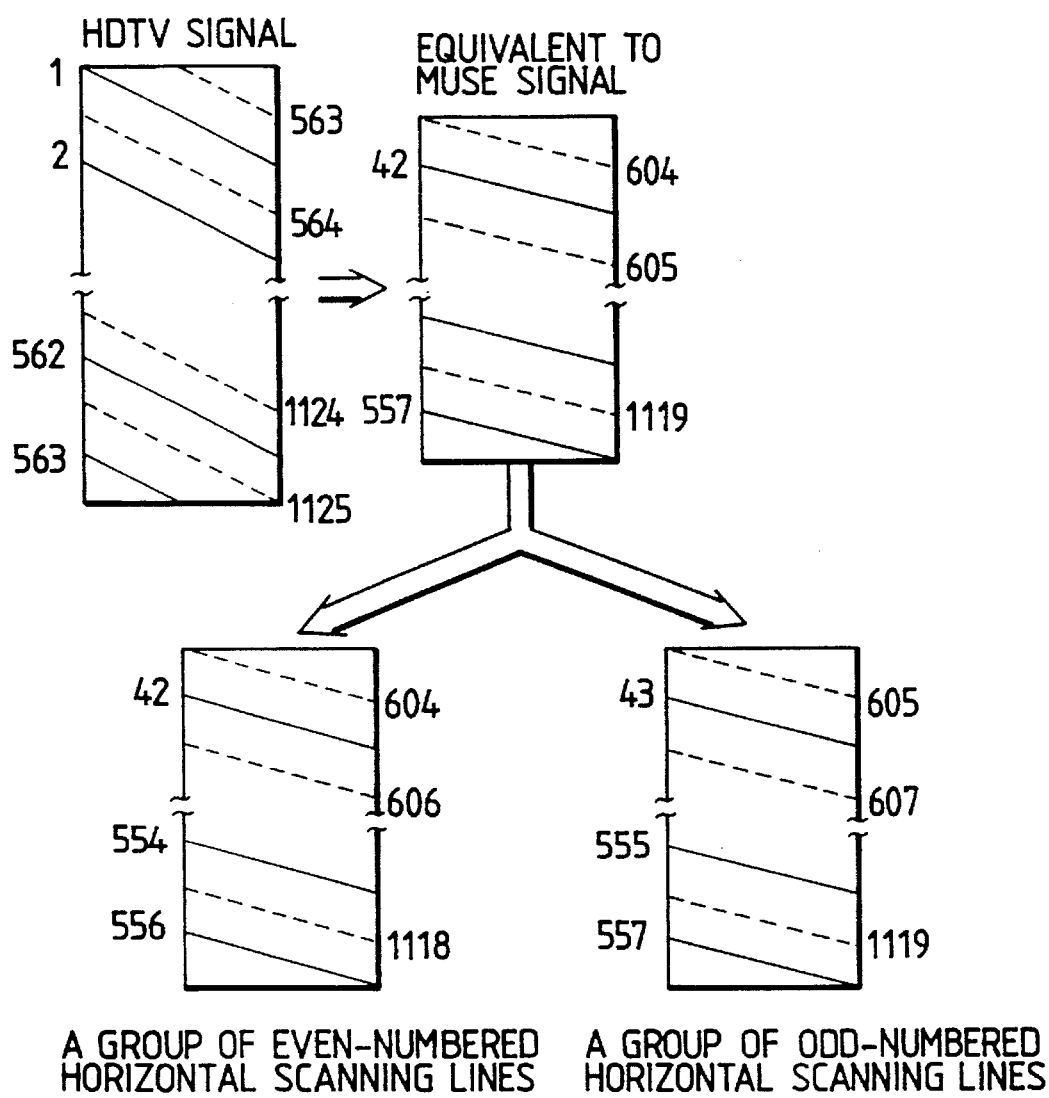
FIG. 16 conceptually shows horizontal scanning lines in a high-definition television (HDTV) signal, horizontal scanning lines in a line reduced signal equivalent to a MUSE signal, even-numbered horizontal scanning lines in the line reduced signal and odd-numbered horizontal scanning lines in the line reduced signal.

FIG. 16 conceptually shows horizontal scanning lines in a high-definition television (HDTV) signal, horizontal scanning lines in a line reduced signal equivalent to a MUSE signal, even-numbered horizontal scanning lines in the line reduced signal and odd-numbered horizontal scanning lines in the line reduced signal.

As shown in FIG. 16, because the corrected signals Y', PB' and PR' emphasized is a high-definition television (HDTV) signal, the number of horizontal scanning lines provided in each of frames is 1125. In the signal dividing section 44, a plurality of horizontal scanning lines pertaining to the synchronizing signal and upper and lower sides of an image plane are omitted from each of the corrected signals Y', PB' and PR' emphasized to form a line reduced signal equivalent to a MUSE signal. In the line reduced signal, the number of horizontal scanning lines provided in each of frames is 1032, and the horizontal horizontal scanning lines of the line reduced signal are positioned in a first range from the 42-line to the 557-line and a second range from the 604-line to the 1119-line. Thereafter, the horizontal horizontal scanning lines of the line reduced signal are divided into a group of even-numbered horizontal scanning lines and a group of odd-numbered horizontal scanning lines. Therefore, the corrected luminance signal Y' emphasized is divided into a first Y signal Yd1 pertaining to the even-numbered horizontal scanning lines and a second Y signal Yd2 pertaining to the odd-numbered horizontal scanning lines, the corrected first color difference signal PB' emphasized is divided into a first PB signal PBd1 pertaining to the even-numbered horizontal scanning lines and a second PB signal PBd2 pertaining to the odd-numbered horizontal scanning lines, and the corrected second color difference signal PR' emphasized is divided into a first PR signal PRd1 pertaining to the even-numbered horizontal scanning lines and a second PR signal PRd2 pertaining to the odd-numbered horizontal scanning lines. The first Y signal Yd1, the first PB signal PBd1 and the first PR signal PRd1 are transferred to a first time compressed integration (TCI) processing section 45a, and the second Y signal Yd2, the second PB signal PBd2 and the second PR signal PRd2 are transferred to a second TCI processing section 45b.

the first TCI processing section 45a, the first PB signal PBd1 and the first PR signal PRd1 are combined with each other to form a first line-order chromaticity signal, and the first line-order chromaticity signal is compressed in point of time to form a first compressed line-order chromaticity signal. Also, the first Y signal Yd1 is compressed in point of time to form a first compressed luminance signal. Thereafter, the first compressed line-order chromaticity signal and the first compressed luminance signal are multiplexed with each other to form a first TCI signal St1. The first TCI signal St1 is transferred to a first composite signal generating section 46a. In the second TCI processing section 45b, the second PB signal PBd2 and the second PR signal PRd2 are combined with each other to form a second line-order chromaticity signal, and the second line-order chromaticity signal is compressed in point of time to form a second compressed line-order chromaticity signal. Also, the second Y signal Yd2 is compressed in point of time to form a second compressed luminance signal. Thereafter, the second compressed line-order chromaticity signal and the second compressed luminance signal are multiplexed with each other to form a second TCI signal St2. The second TCI signal St2 is transferred to a second composite signal generating section 46b.

In the first composite signal generating section 46a, a first recording level standard signal Src1 generated in the recording level standard signal generating means 40 and a first blanking signal Sb11 generated in a blanking signal generating section 47 are interposed in the first TCI signal St1 to add the first recording level standard signal Src1 and the first blanking signal Sb11 to first horizontal scanning lines between the 1118-line of a preceding frame and the 42-line and second horizontal scanning lines between the 556-line to the 604-line. Therefore, a first composite recording signal Scr1 having a recording level is generated in the first composite signal generating section 46a. Also, a second recording level standard signal Src2 generated in the recording level standard signal generating means 40 and a second blanking signal Sb12 generated in the blanking signal generating section 47 are interposed in the second TCI signal St2 to add the second recording level standard signal Src2 and the second blanking signal Sb12 to third horizontal scanning lines between the 1119-line of a preceding frame and the 43-line and fourth horizontal scanning lines between the 557-line to the 605-line. Therefore, a second composite recording signal Scr2 having a recording level is generated in the second recording level standard signal Src2.

FIG. 17A shows a waveform of the first composite recording signal Scr1 generated in the first composite signal generating section 46a, and FIG. 17B shows a waveform of the second composite recording signal Scr2 generated in the second composite signal generating section 46b.

As shown in FIGS. 17A, 17B, the first and second TCI signals St1, St2 are respectively combined in first recording periods TR1, the first and second blanking signals Sb11, Sb12 are respectively combined in second recording periods TR2, and the first and second recording level standard signals Src1, Src2 are respectively combined in third recording periods TR3.

In the blanking signal generating section 47, one or more switching signals Ssw, one or more horizontal-vertical synchronizing signal Sv and a calibrating signal Scal are combined to form the first and second blanking signals Sb11, Sb12. The switching signals Ssw are utilized to make a margin for the change of a magnetic head. The calibrating signal Scal is a signal obtained by repeatedly replacing a signal with another signal selected from among a ramp signal for calibrating the linearity between an even-numbered system and an odd-numbered system, a gray scale signal for adjusting direct current levels between the systems and amplitude levels between the systems, a multi-burst signal for calibrating frequency characteristics between the systems, and the like.

In the recording level standard signal generating means 40, the input level standard signals Sst of the corrected signals Y', PB' and PR' shown in FIGS. 6A, 6B are respectively decoded in an input level standard signal decoding section 48 to read out pieces of prescribed information designated by the information signals Sif of the corrected signals Y', PB' and PR' and pieces of reference level information designated by the input level reference signals Sre of the corrected signals Y', PB' and PR', and the prescribed information and the reference level information are transferred to an information control section 49. In the information control section 49, the prescribed information is replaced with pieces of renewed information if necessary. Thereafter, the prescribed information or the renewed information arid the reference level information are transferred to a recording level standard signal encoding section 50 as pieces of input information.

Figure 18:
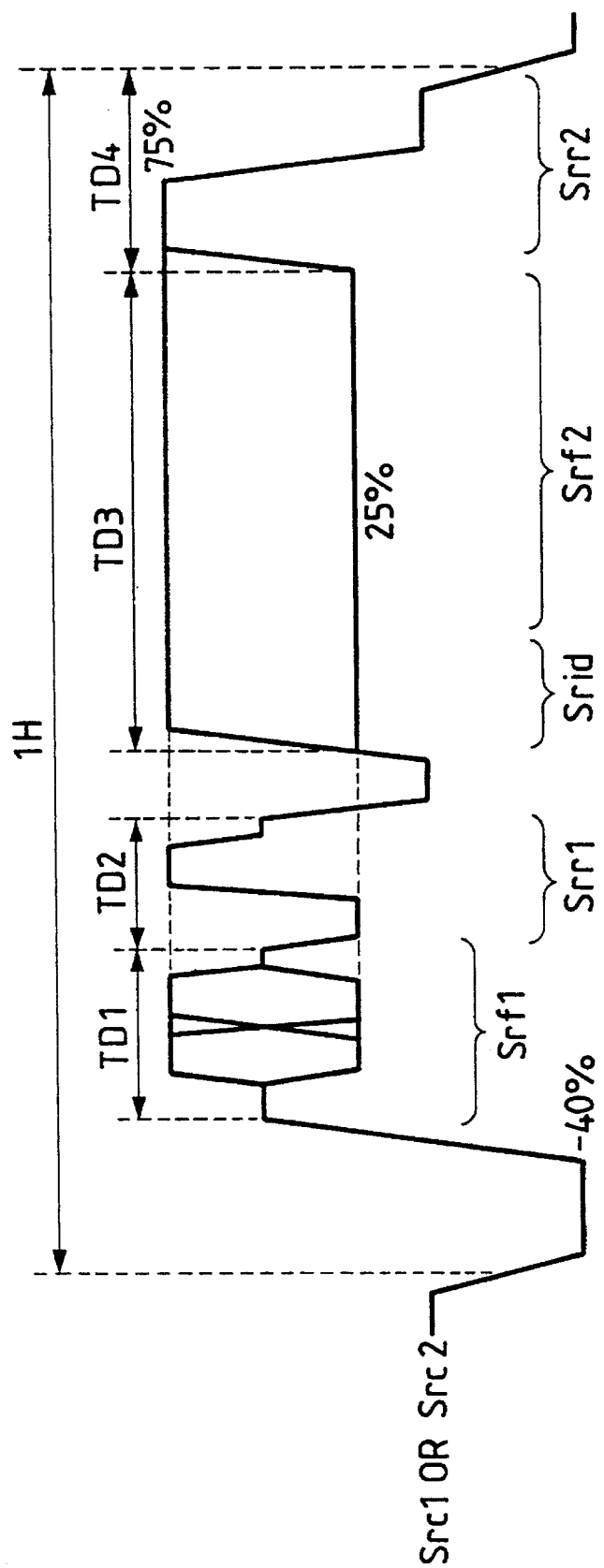
FIG. 18 shows a waveform of a recording level standard signal Src1 or Src2 generated in a recording level standard signal encoding section shown in FIG. 8.

In the recording level standard signal encoding section 50, the first and second recording level standard signals Src1, Src2 shown in FIG. 18 are generated according to the input information. In detail, each of the first and second recording level standard signals Src1, Src2 is composed of a recording information signal Srf1 compressed and combined in a first decoding period TD1, a recording level reference signal Srr1 compressed and combined in a second decoding period TD2, a recording level identifying signal Srid and a recording information signal Srf2 compressed and combined in a third decoding period TD3, and a recording level reference signal Srr2 compressed and combined in a fourth decoding period TD4. The recording information signal Srf1 indicates one or more pieces of information pertaining to the first and second color difference signals PB, PR and is formed by changing the amplitude level of the information signal Sif of the first or second color difference signal PB or PR to a recording level, the recording level reference signal Srr1 indicates amplitude levels of the first and second color difference signals PB, PR and is formed by changing the amplitude level of the input level reference signal Sre of the first or second color difference signal PB or PR to a recording level, the recording level identifying signal Srid is formed by changing the amplitude level of the identifying signal Sid of the luminance signal Y to a recording level, the recording information signal Srf2 indicates one or more pieces of information pertaining to the luminance signal Y and is formed by changing the information signal Sif of the luminance signal Y to a recording level, and the recording level reference signal Srr2 indicates amplitude levels of the luminance signal Y and is formed by changing the amplitude level of the input level reference signal Sre of the luminance signal Y to a recording level.

In this case, the time compressibility of the recording information signals Srf1, Srf2, the recording level identifying signal Srid and the recording level reference signals Srr1, Srr2 in the first and second recording level standard signals Src1, Src2 is the same as that of a chromaticity signal and a luminance signal compressed in a picture signal in series. Therefore, a series of decoding periods TD1, TD2 in the first and second recording level standard signals Src1, Src2 agrees with a period of the chromaticity signal in the picture signal, and a series of decoding periods TD3, TD4 in the first and second recording level standard signals Src1, Src2 agrees with a period of the luminance signal in the picture signal.

Thereafter, the first composite recording signal Scr1 generated in the first composite signal generating section 46a is converted into an analog signal in a first digital-to-analog converter 51a and is modulated according to a frequency modulation in a first modulator 52a. Also, the second composite recording signal Scr2 generated in the second composite signal generating section 46b is converted into an analog signal in a second digital-to-analog converter 51b and is modulated according to a frequency modulation in a second modulator 52b. Thereafter, the first composite recording signal Scr1 modulated is amplified in a first recording amplifier 53a and is recorded on a magnetic tape TT through a first magnetic head 54a and a second magnetic head 54b. That is, the first composite recording signal Scr1 shown in FIG. 17A is divided into a first even-numbered recording signal ranging from a switching signal Ssw to a half of a picture signal pertaining to the 556-line and a second even-numbered recording signal ranging from the other half of the picture signal pertaining to the 556-line to a picture signal pertaining to the 1118-line. Thereafter, the first even-numbered recording signal is recorded on the magnetic tape TT through the first magnetic head 54a, and the second even-numbered recording signal is recorded on the magnetic tape TT through the second magnetic head 54b.

Also, the second composite recording signal Scr2 modulated is amplified in a second recording amplifier 53b and is recorded on the magnetic tape TT through a first magnetic head 55a and a second magnetic head 55b. That is, the second composite recording signal Scr2 shown in FIG. 17B is divided into a first odd-numbered recording signal ranging from a switching signal Ssw to a half of a picture signal pertaining to the 557-line and a second odd-numbered recording signal ranging from the other half of the picture signal pertaining to the 557-line to a picture signal pertaining to the 1119-line. Thereafter, the first odd-numbered recording signal is recorded on the magnetic tape TT through the first magnetic head 55a, and the second odd-numbered recording signal is recorded on the magnetic tape TT through the second magnetic head 55b.

FIG. 19 shows a magnetic tape pattern of the picture signal and the first and second composite recording signals Scr1, Scr2 recorded on the magnetic tape TT.

As shown in FIG. 19, the first even-numbered recording signal of the first composite recording signal Scr1 is recorded on a first even-numbered track of the magnetic tape TT with the first magnetic head 54a, and the first odd-numbered recording signal of the second composite recording signal Scr2 is recorded on a first odd-numbered track of the magnetic tape TT with the first magnetic head 55a. The recording of the first even-numbered recording signal is performed simultaneously with that of the First odd-numbered recording signal. In addition, an audio signal is recorded on a first audio track with a first audio magnetic head (not shown) preceding the first and second magnetic heads 54a, 55a.

Also, the second even-numbered recording signal of the first composite recording signal Scr1 is recorded on a second even-numbered track of the magnetic tape TT with the second magnetic head 54b succeeding the first magnetic head 54a, and the second odd-numbered recording signal of the second composite recording signal Scr2 is recorded on a second odd-numbered track of the magnetic tape TT with the second magnetic head 55b succeeding the first magnetic head 55a. The recording of the second even-numbered recording signal is performed simultaneously with that of the second odd-numbered recording signal. In addition, another audio signal is recorded on a second audio track with a second audio magnetic head (not shown) preceding the first anti second magnetic heads 54b, 55b.

Accordingly, the input level standard signal Sst added to the 603-line or the 604-line of each of the luminance signal Y, the first color difference signal PB and the second color difference signal PR can be substantially recorded on the magnetic tape TT.

The magnetic tape pattern is not limited to that shown in FIG. 19. That is, in cases where the positional relationship in the height of the magnetic heads 54a, 54b, 55a, 55b and the audio magnetic heads attached to a rotational drum is suitably adjusted, a magnetic tape pattern shown in FIG. 20 can be obtained.

Next, a high-definition picture signal reproducing system in the high-definition picture signal recording/reproducing apparatus is described with reference to FIG. 21.

Figure 21:
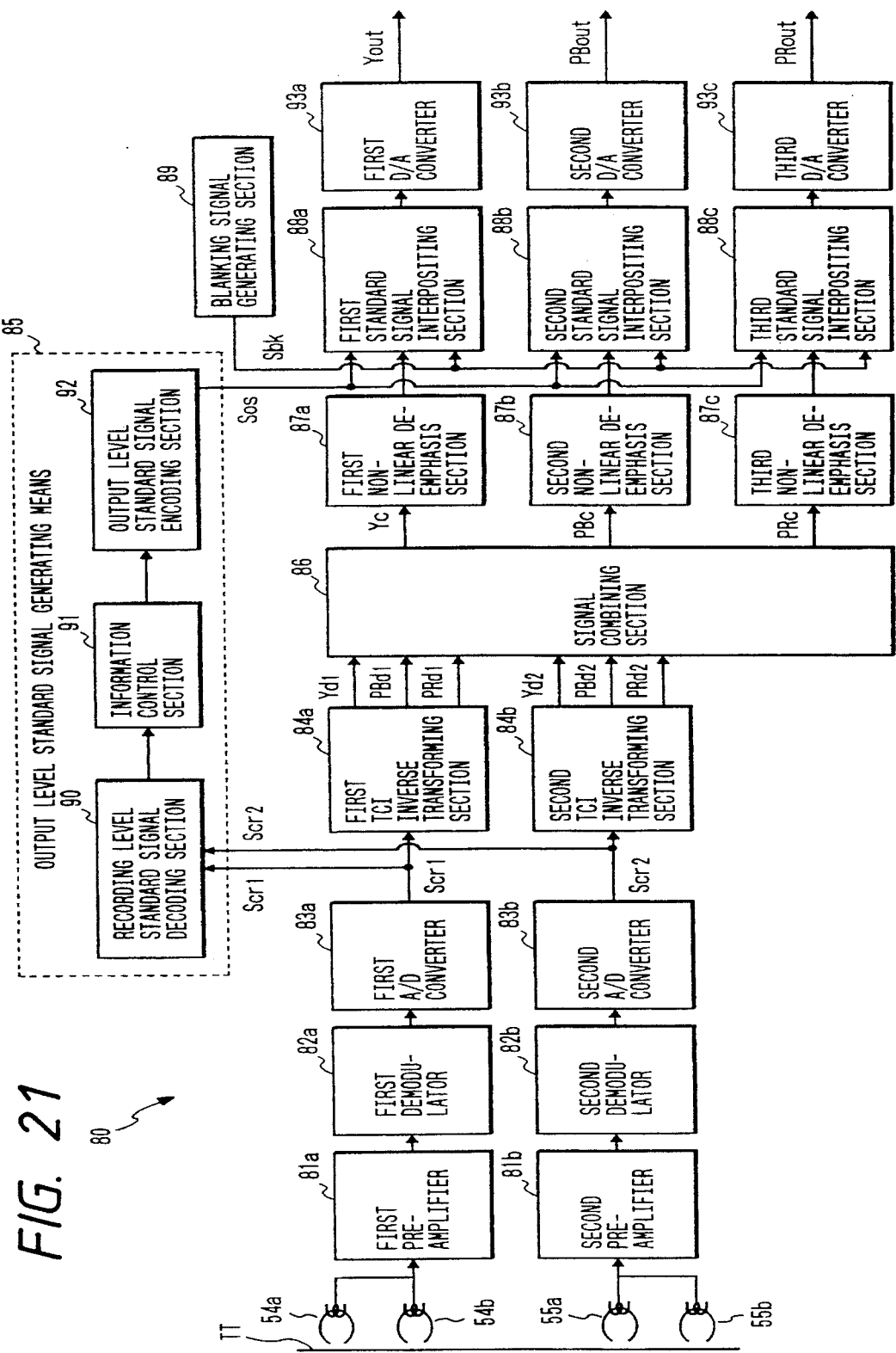
FIG. 21 is a block diagram of a high-definition picture signal reproducing system in a high-definition picture signal recording/reproducing apparatus according to the first embodiment.

FIG. 21 is a block diagram of a high-definition picture signal reproducing system in the high-definition picture signal recording/reproducing apparatus according to the first embodiment.

As shown in FIG. 21, in a high-definition picture signal reproducing system 80, the first even-numbered recording signal of the first composite recording signal Scr1 recorded in the first even-numbered track of the magnetic tape TT is reproduced with the first magnetic head 54a, and the first odd-numbered recording signal of the second composite recording signal Scr2 recorded on the first odd-numbered track of the magnetic tape TT is reproduced with the first magnetic head 55a. Also, the second even-numbered recording signal of the first composite recording signal Scr1 recorded on the second even-numbered track of the magnetic tape TT is reproduced with the second magnetic head 54b, and the second odd-numbered recording signal of the second composite recording signal Scr2 recorded on the second odd-numbered track of the magnetic tape TT is reproduced with the second magnetic head 55b. The first composite recording signal Scr1 reproduced is amplified in a first pre-amplifier 81a and is demodulated in a first demodulator 82a. Also, the second composite recording signal Scr2 reproduced is amplified in a second pre-amplifier 81b and is demodulated in a second demodulator 82b. Thereafter, the first composite recording signal Scr1 demodulated is converted into an analog signal in a first analog-to-digital converter 83a and is transferred to a first TCI inverse transforming section 84a and an output level standard signal generation means 85, and the second composite recording signal Scr2 demodulated is converted into an analog signal in a second analog-to-digital converter 83b and is transferred to a second TCI inverse transforming section 84b and the output level standard signal generation means 85.

The first TCI inverse transforming section 84a complementarily relates to the first TCI processing section 45a, and the second TCI inverse transforming section 84b complementarily relates to the second TCI processing section 45b. In detail, the first TCI signal St1 of the first recording level standard signal Scr1 is divided into the first compressed luminance signal and the first compressed line-order chromaticity signal in the first TCI inverse transforming section 84a, and the first compressed luminance signal and the first compressed line-order chromaticity signal are respectively expanded in the first TCI inverse transforming section 84a to form the first Y signal Yd1, the first PB signal PBd1 and the first PR signal PRd1. The first Y signal Yd1, the first PB signal PBd1 and the first PR signal PRd1 are transferred to a signal combining section 86. Also, the second TCI signal St2 in the second recording level standard signal Scr2 are divided into the second compressed luminance signal and the second compressed line-order chromaticity signal, and the second compressed luminance signal and the second compressed line-order chromaticity signal are respectively expanded in the second TCI inverse transforming section 84b to form the second Y signal Yd2, the second PB signal PBd2 and the second PR signal PRd2. The second Y signal Yd2, the second PB signal PBd2 and the second PR signal PRd2 are transferred to the signal combining section 86.

The signal combining section 86 complementarily relates to the signal dividing section 44. In detail, the first and second Y signals Yd1, Yd2 are combined with each other in the signal combining section 86 to form a composite luminance signal Yc, the first and second PB signals PBd1, PBd2 are combined with each other in the signal combining section 86 to form a composite first color difference signal PBc, and the first and second PR signals PRd1, PRd2 are combined with each other in the signal combining section 86 to form a composite second color difference signal PRc. The composite luminance signal Yc is transferred to a first non-linear de-emphasis section 87a, the composite first color difference signal PBc is transferred to a second non-linear de-emphasis section 87b, and the composite second color difference Signal PRc is transferred to a third non-linear de-emphasis section 87c.

In the first non-linear de-emphasis section 87a, high frequency components of the composite luminance signal Yc are attenuated as compared with low frequency components of the composite luminance signal Yc, in dependence on an amplitude level of the composite luminance signal Yc. Thereafter, the composite luminance signal Yc de-emphasized is transferred to a first standard signal interposing section 88a. In the second non-linear de-emphasis section 87b, high frequency components of the composite first color difference signal PBc are attenuated as compared with low frequency components of the composite first color difference signal PBc, in dependence on an amplitude level of the composite first color difference signal PBc. Thereafter, the composite first color difference signal PBc de-emphasized is transferred to a second standard signal interposing section 88b. In the third non-linear de-emphasis section 87c, high frequency components of the composite second color difference signal PRc are attenuated as compared with low frequency components of the composite second color difference signal PRc, in dependence on an amplitude level of the composite second color difference signal PRc. Thereafter, the composite second color difference signal PRc de-emphasized is transferred to a third standard signal interposing section 88c.

In a blanking signal generating section 89, a first blanking signal Sbk pertaining to vertical blanking periods and horizontal synchronizing periods in the composite luminance signal Yc, the composite first color difference signal PBc and the composite second color difference signal PRc is generated, and the first blanking signal Sbk is transferred to the first standard signal interposing section 88a, the second standard signal interposing section 88b and the third standard signal interposing section 88c.

In the output level standard signal generating means 85, the first recording level standard signal Src1 of the first composite recording signal Scr1 converted in the first analog-to-digital converter 83a is selectively decoded in a recording level standard signal decoding section 90. That is, a piece of prescribed information is obtained by decoding the recording information signals Srf1, Srf2 of the first recording level standard signal Src1 compressed in the decoding periods TD1, TD3 shown in FIG. 18, and a piece of reference level information is obtained by decoding the recording level reference signals Srre of the first recording level standard signal Src1 compressed in the decoding periods TD2, TD4 shown in FIG. 18. Also, the second recording level standard signal Src2 of the second composite recording signal Scr2 converted in the second analog-to-digital converter 83b is selectively decoded in the recording level standard signal decoding section 90. That is, another piece of prescribed information is obtained by decoding the recording information signals Srf1, Srf2 of the second recording level standard signal Src2 compressed in the decoding periods TD1, TD3, and another piece of reference level information is obtained by decoding the recording level reference signals Srr1, Srr2 of the second recording level standard signal Src2 compressed in the decoding periods TD2, TD4. The prescribed information and the reference level information are transferred to an information control section 91. In the information control section 91, the prescribed information is replaced with pieces of renewed information if necessary. Thereafter, the prescribed information or the renewed information and the reference level information are transferred to an output level standard signal encoding section 92 as pieces of input information. In the output level standard signal encoding section 92, an output information signal which is composed of output level information signals and an output level identifying signal formed by changing the recording levels of the recording information signals Srf1, Srf2 and the recording level identifying signal Srid compressed in the decoding periods TD1, TD3 is generated according to the input information, and an output level reference signal which is composed of output level reference signals formed by changing the recording levels of the recording level reference signals Srr1, Srr2 compressed in the coding periods TD2, TD4 is generated according to the input information. Thereafter, an output level standard signal Sos composed of the output information signal and the output level reference signal is transferred to the first standard signal interposing section 88a, the second standard signal interposing section 88b and the third standard signal interposing section 88c.

In the first standard signal interposing section 88a, the composite luminance signal Yc de-emphasized, the output level standard signal Sos generated in the output level standard signal encoding section 92 and the first blanking signal Sbk generated in the blanking signal generating section 89 are combined to form an output luminance signal Yout. The output luminance signal Yout is transferred to a first digital-to-analog converter 93a to convert into a digital signal, and the output luminance signal Yout converted is output to a luminance transmission path (not shown). In the second standard signal interposing section 88b, the composite first color difference signal PBc de-emphasized, the output level standard signal Sos and the first blanking signal Sbk are combined to form an output first color difference signal PBout. The output first color difference signal PBout is transferred to a second digital-to-analog converter 93b to convert into a digital signal, and the output first color difference signal About converted is output to a first color difference transmission path (not shown). In the third standard signal interposing section 88c, the composite second color difference signal PRc de-emphasized, the output level standard signal Sos and the first blanking signal Sbk are combined to form an output second color difference signal PRout. The output second color difference signal PRout is transferred to a third digital-to-analog converter 93c to convert into a digital signal, and the output second color difference signal PRout converted is output to a second color difference transmission path (not shown).

Accordingly, even though 1032 horizontal scanning lines selected from among the horizontal scanning lines of a HD signal are recorded on the magnetic tape TT according to a MUSE standard in cases where an input level standard signal Sst is added to the 603-line or the 604-line of the HD signal, the input level standard signals Sst of the input signals Y, PB and PR can be converted into the recording level standard signals Src1, Src2, and the recording level standard signals Src1, Src2 can be recorded on the magnetic tape TT.

Also, in cases where the recording level standard signals Src1, Src2 are reproduced from the magnetic tape TT, the recording level standard signals Src1, Src2 can be converted into the output level standard signal Sos, and a HD picture signal in which the output level standard signal Sos is added to the 603-line or the 604-line can be output as the output luminance signal Yout, the output first color difference signal PBout or the output first color difference signal PBout. Therefore, in cases where the HD picture signals such as the output luminance signal Yout, the output first color difference signal PBout and the output first color difference signal PBout are input to a high-vision apparatus, amplitude levels of the HD signals can be easily controlled.

In the above embodiment, the amplitude level reference signals Sre in the first and second recording level standard signals Src1, Src2 are generated in the recording level standard signal encoding section 50 according to the amplitude level reference signals Sre of the amplitude level standard signals Sst. However, because signal/noise ratios in the amplitude level reference signals Sre are degraded by repeatedly performing a dubbing operation in a video tape recorder in which the magnetic tape TT is utilized as a recording medium, it is preferred that a read only memory (ROM) be provided in the recording level standard signal encoding section 50 to store the amplitude level reference signals Sre of the first and second recording level standard signals Src1, Src2. Also, because signal/noise ratios in the output level reference signal of the output level standard signal Sos generated in the output level standard signal encoding section 92 are degraded in the same manner, it is preferred that a read only memory (ROM) be provided in the output level standard signal encoding section 92 to store the output level reference signal of the output level standard signal Sos.

Also, a video tape recorder in which the magnetic tape TT is utilized as a recording medium is an example of the high-definition picture signal recording/reproducing apparatus according to the present invention. However, the recording medium is not limited to the magnetic tape TT of the video tape recorder. That is, an optical disk, a floppy disk, a semiconductor memory or the like is applicable as the recording medium.

Next, a second embodiment according to the present invention is described to solve the third object.

Figure 22:
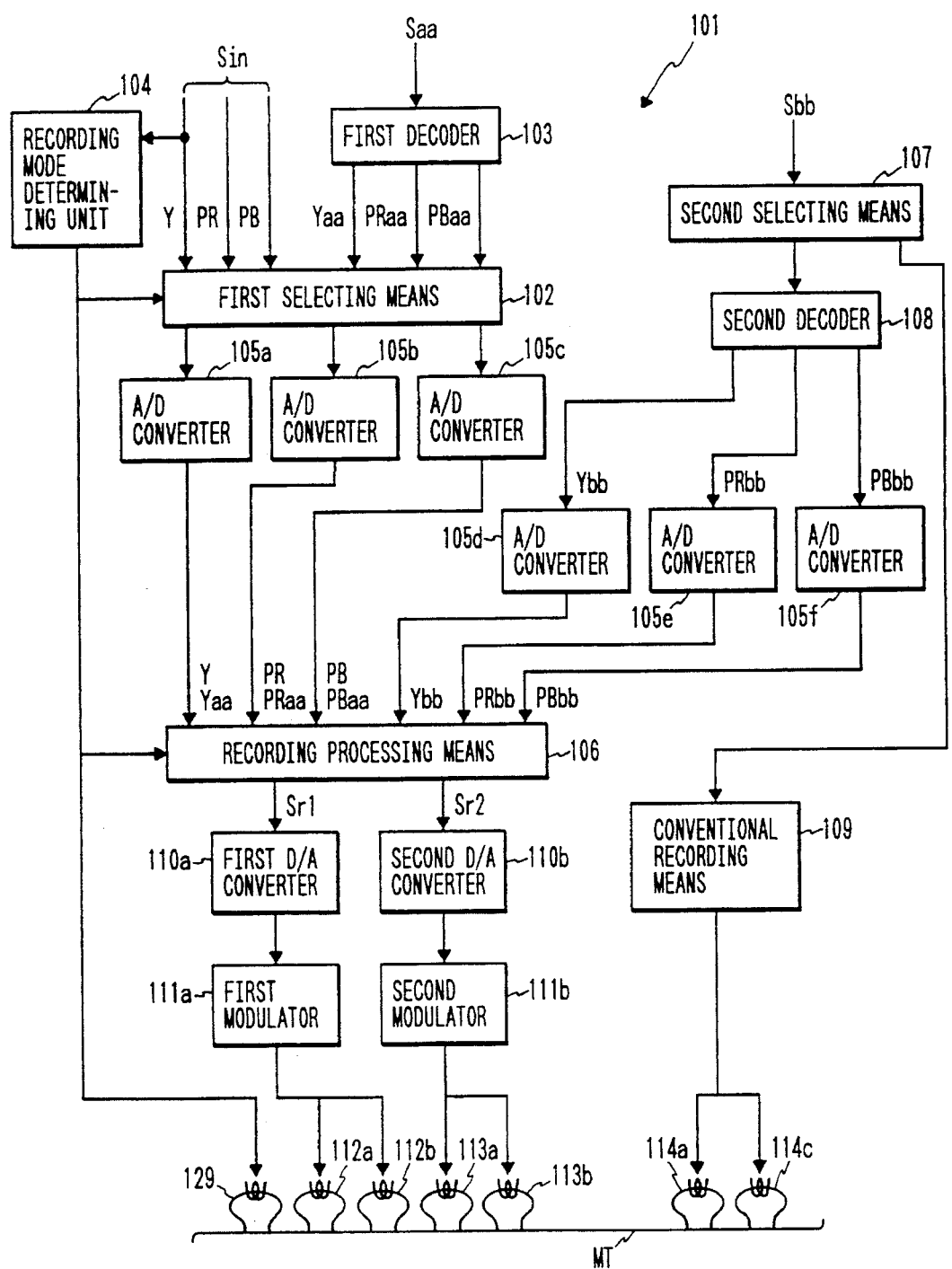
FIG. 22 is a block diagram of a picture signal recording apparatus according to a second embodiment.

FIG. 22 is a block diagram of a picture signal recording apparatus according to a second embodiment.

In a picture signal recording apparatus 101 shown in FIG. 22, an HD signal and an NTSC type of picture signal classified as a normal picture signal conventionally utilized are recorded according to one of various recording modes. A first recording mode is initially described in detail. A pair of color difference signals PR, PB belonging to the HD signal are respectively composed of a series of color difference line signals PRi (i=1, 2,--) or PBi. The color difference line signals PRi pertaining to even-numbered scanning lines are deleted to produce a series of color difference line signals PR1, PR3,--. Also, the color difference line signals PBi pertaining to odd-numbered scanning lines are deleted to produce a series of color difference line signals PB2, PB4,--. Thereafter, the color difference line signals are respectively time-compressed to respectively produce a series of compressed color difference line signals. Also, a luminance signal Y belonging to the HD picture signal is composed of a series of luminance line signals Yi. The luminance line signals Yi are respectively time-compressed to produce a series of compressed luminance line signals. Thereafter, the compressed color difference line signals and the compressed luminance line signals are unified according to a time-division multiplexing to produce a time compressed integration (TCI) signal, and the TCI signal is splitted in a first recorded TCI signal pertaining to odd-numbered scanning lines and a second recorded TCI signal pertaining to even-numbered scanning lines. Thereafter, the first and second recorded TCI signals and an audio signal are simultaneously recorded on three corresponding tracks of a high-performance information recording medium such as a metal tape or a deposited tape at a standard recording speed according to the first recording mode.

Next, a second recording mode is described. A pair of color difference signals belonging to the normal picture signal are respectively time-compressed at every scanning line to produce a compressed color difference signal. Also, a luminance signal belonging to the normal picture signal is time-compressed at every scanning line to produce a compressed luminance signal. Thereafter, the compressed color difference signals and the compressed luminance signal are unified according to a time-division multiplexing to produce a time compressed integration (TCI) signal, and the TCI signal is recorded on a track of the high-performance information recording medium at a low recording speed equal to ⅓ of the standard recording speed according to the second recording mode.

Next, a third recording mode is described. A pair of color difference signals belonging to the normal picture signal are respectively time-compressed at every scanning line to produce a compressed color difference signal. Also, a luminance signal belonging to the normal picture signal is time-compressed at every scanning line to produce a compressed luminance signal. Thereafter, the compressed color difference signals and the compressed luminance signal are unified according to a time-division multiplexing to produce a time compressed integration (TCI) signal, and the TCI signal is recorded on two tracks of the high-performance information recording medium at the standard recording speed according to the third recording mode. Next, a fourth recording mode is described. A normal picture signal is modulated according to a frequency modulation (FM), and the picture signal modulated is recorded on a track of a normal information recording medium such as an iron oxide tape according to the fourth recording mode.

As shown in FIG. 22, a luminance signal Y, a first color difference signal PB and a second color difference signal PR of a HD input signal Sin are supplied from a transmission path (not shown) to a first selecting means 102. The signals Y, PB, PR of the HD input picture signal Sin are in conformity to Japanese high-vision standards. That is, the signals Y, PB and PR are defined according to equations (1), (2) and (3).

Also, a first normal picture signal Saa pertaining to a first program is supplied from a transmission path (not shown) to a first decoder 103 to demodulate the signal Saa. Thereafter, a luminance signal Yaa, a first color difference signal PBaa and a second color difference signal PRaa of the signal Saa are produced in the first decoder 103 and are supplied to the first selecting means 102. In cases where the first recording mode is performed according to the determination of a recording mode determining section 104 in the picture signal recording apparatus 101, the luminance signal Y and the first and second color difference signals PB, PR are selected and output from the first selecting means 102. In contrast, in cases where the second or third recording mode is performed according to the determination of the recording mode determining section 104, the luminance signal Yaa and the first and second color difference signals PBaa, PRaa are selected and output from the first selecting means 102. The signals selected in the first selecting means 102 are converted to digital signals in analogue-to-digital (A/D) converters 105a, 105b, 105c, and the digital signals are supplied to a recording processing means 106.

Also, a second normal picture signal Sbb pertaining to a second program is supplied from a transmission path (not shown) to a second selecting means 107. In the second selecting means 107, the second normal picture signal Sbb is supplied to a second decoder 108 in cases where the third recording mode is performed according to the determination of the recording mode determining section 104. In contrast, the second normal picture signal Sbb is supplied to a conventional recording means 109 in cases where the fourth recording mode is performed according to the determination of the recording mode determining section 104. In the second decoder 108, the second normal picture signal Sbb is demodulated in the same manner as in the first decoder 103 to produce a luminance signal Ybb, a first color difference signal PBbb and a second color difference signal PRbb. Thereafter, the signals Ybb, PBbb, PRbb are converted to digital signals in analogue-to-digital (A/D) converters 105d, 105e and 105f, and the digital signals are supplied to the recording processing means 106.

Therefore, the luminance signal Y and the first and second color difference signals PB, PR of the HD input signal Sin are supplied to the recording processing means 106 in case of the first recording mode, the luminance signal Yaa and the first and second color difference signals PBaa, PRaa of the first normal picture signal Saa are supplied to the recording processing means 106 in case of the second recording mode, and the luminance signal Yaa and the first and second color difference signals PBaa, PRaa of the first normal picture signal Saa and the luminance signal Ybb and the first and second color difference signals PBbb, PRbb of the second normal picture signal Sbb are supplied to the recording processing means 106 in case of the third recording mode.

Next, an action of the recording processing means 106 is described with reference to FIGS. 23(A) to 23(I).

FIGS. 23(A) to 23(I) are respectively a timing chart showing a time division multiplexing of the luminance signal and the first and second color difference signals performed in the recording processing means 106. Numerals in FIGS. 23(A) to 23(I) denote the numbers of the horizontal scanning lines.

Figure 23A:
FIGS. 23(A) to 23(I) are respectively a timing chart showing a time division multiplexing of a luminance signal Yi (i=1,2,--) and first and second color difference signals PRi, PBi performed in a recording processing means shown in FIG. 22.
Figure 23B:
Figure 23C:
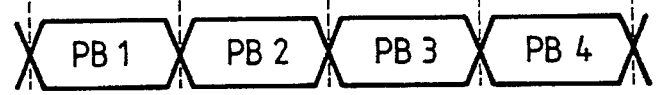
Figure 23D:
Figure 23E:
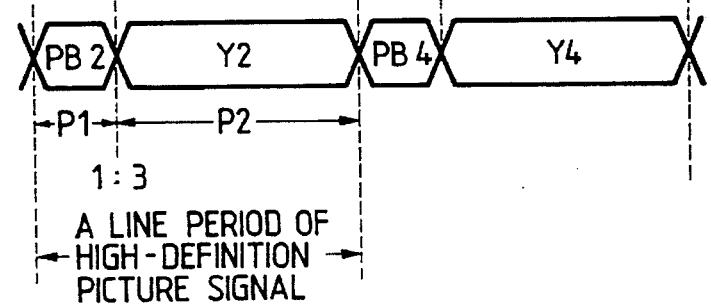

In case of the first recording mode, first color difference line signals PRi pertaining to even-numbered scanning lines in the first color difference signal PB shown in FIG. 23(B) are respectively deleted to produce a series of first color difference line signals PRi pertaining to odd-numbered scanning lines, and the first color difference line signals PRi pertaining to odd-numbered scanning lines are respectively time-compressed to produce a series of compressed first color difference line signals. In the same manner, second color difference line signals PBi pertaining to odd-numbered scanning lines in the second color difference signal PB shown in FIG. 23(B) are respectively deleted to produce a series of second color difference line signals PBi pertaining to even-numbered scanning lines, and the second color difference line signals PBi pertaining to even-numbered scanning lines are respectively time-compressed to produce a series of compressed second color difference line signals. Also, luminance line signals Y1 of the luminance signal Y shown in FIG. 23(A) are respectively time-compressed to produce a series of compressed luminance line signals. Thereafter, the compressed color difference line signals of the color difference signals PB, PR and the compressed luminance line signals are unified according to a time-division multiplexing to produce a time compressed integration (TCI) signal, and the TCI signal is splitted into a first recorded TCI signal Sr1 pertaining to odd-numbered scanning lines shown in FIG. 23(D) and a second recorded TCI signal Sr2 pertaining to even-numbered scanning lines shown in FIG. 23(E). In detail, as shown in FIG. 23(D), the compressed first color difference line signals PRi pertaining to odd-numbered scanning lines and the luminance line signals Yi pertaining to odd-numbered scanning lines are alternately arranged in order of odd-numbered scanning line to form the first recorded TCI signal Sr1. Also, as shown in FIG. 23(E), the compressed second color difference line signals PBi pertaining to even-numbered scanning lines and the luminance line signals Yi pertaining to even-numbered scanning lines are alternately arranged in order of even-numbered scanning line to form the second recorded TCI signal St2. A ratio of a period P1 of the time compressed color difference line signal PBi or PRi to another period P2 of the time compressed luminance line signal Yi is set to 1:3. In other words, a ratio in time compression degree of the time compressed color difference line signal PBi or PRi to the time compressed luminance line signal Yi is set to 3:1.

The generation of the color difference line signal PBi or PRi is described with reference to FIG. 24A.

Figure 24A:
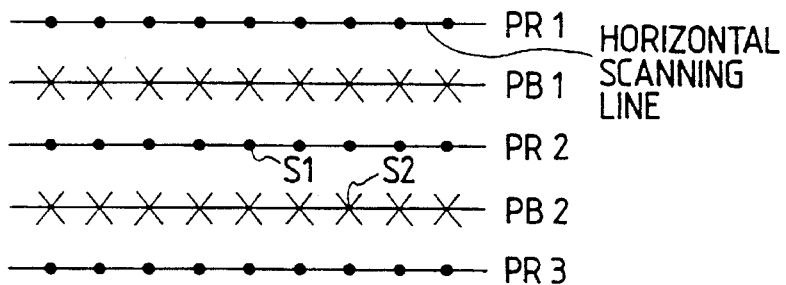
FIG. 24A shows a series of first pixels selected as sampling points S1 in each of horizontal scanning lines on every other scanning line to form a first color difference line signal PRi and another series of second pixels selected as sampling points S2 in each of other horizontal scanning lines on every other scanning line to form a second color difference line signal PBi, the scanning line pertaining to the sampling points S1 and the scanning line pertaining to the sampling points S2 being alternately arranged in a field of picture image.

FIG. 24A shows a series of first pixels selected as sampling points S1 in a horizontal scanning line to form a first color difference line signal PRi and another series of second pixels selected as sampling points S2 in another horizontal scanning line to form a second color difference line signal PBi, the scanning line pertaining to the sampling points S1 and the scanning line pertaining to the sampling points S2 being alternately arranged in a field of picture image.

As shown in FIG. 24A, the horizontal scanning lines arranged in a field alternately correspond to a first color difference line signal PRi and a second color difference line signal PBi at every scanning line. That is, a first color difference line signal PRi is produced by pieces of information designated by pixels placed in a horizontal scanning line corresponding to the first color difference line signal PRi, and a second color difference line signal PBi is produced by pieces of information designated by pixels placed in a horizontal scanning line corresponding to the second color difference line signal PBi.

Figure 24B:
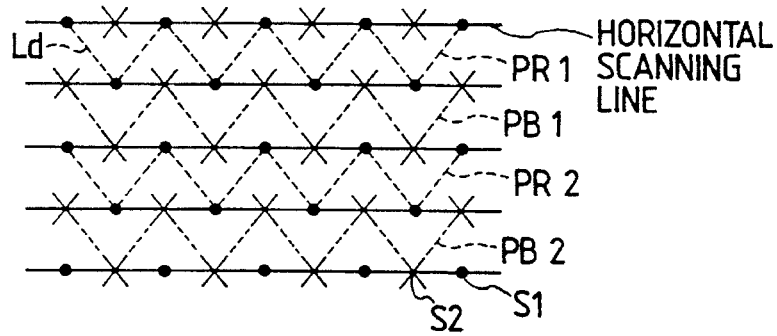
FIG. 24B shows a series of first pixels selected as sampling points S1 on every other pixel in each of horizontal scanning lines and another series of second pixels selected as sampling points S2 on every other pixel in each of horizontal scanning lines.

In this embodiment, the horizontal scanning lines corresponding to the color difference line signals PRi, PBi are arranged in a field of picture image. However, it is applicable that a first color difference line signal PRi and a second color difference line signal PBi be alternately selected on every other line in a frame of picture image. Also, there is another method as a modification of the second embodiment to generate the color difference line signals PRi, PBi. As shown in FIG. 24B, pixels placed in a horizontal scanning line are alternately selected as a sampling point S1 of a first color difference line signal PRi and another sampling point S2 of a second color difference line signal PBi, and a series of sampling points S1 connected by a dotted line Ld over two horizontal scanning lines is regarded as first pixels pertaining to a first color difference line signal PRi. The first color difference line signal PRi is produced by pieces of information designated by the first pixels. Also, a series of sampling points S2 connected by a line (not shown) over two horizontal scanning lines is regarded as second pixels pertaining to a second color difference line signal PBi. The second color difference line signal PBi is produced by pieces of information designated by the second pixels.

Figure 24C:
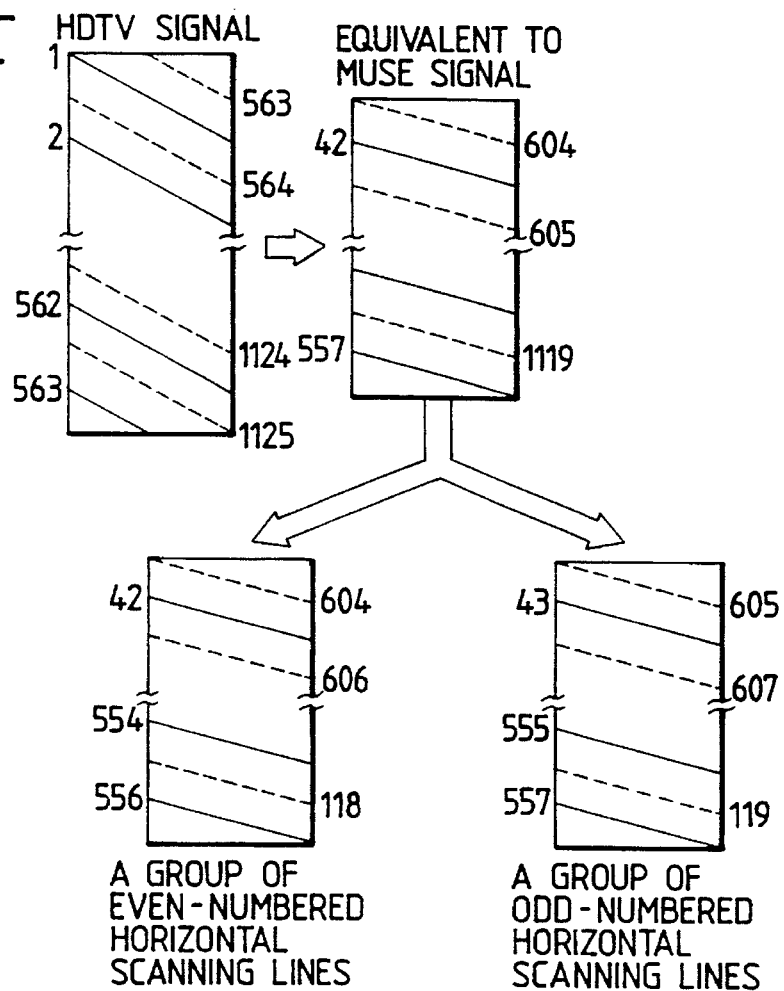
FIG. 24C conceptually shows horizontal scanning lines in a high-definition television (HDTV) signal, horizontal scanning lines in a reduced HD signal equivalent to a MUSE signal, even-numbered horizontal scanning lines in the line reduced signal and odd-numbered horizontal scanning lines in the line reduced signal.

In the picture signal recording apparatus 101, a servo system arranged in the recording mode determining section 104 is utilized for the normal picture signals Saa, Sbb and the HD input signal Sin, and video tracks on which the recorded TCI signals Sr1, Sr2 are recorded are arranged side by side. Therefore, a drum diameter and a tape running speed in the picture signal recording apparatus 101 are the same as those in a conventional picture signal recording apparatus operated according to a VHS method or an 8 mm film method. As a result, the number of horizontal scanning lines of a picture signal possible to be recorded on a track of a recording tape in the picture signal recording apparatus 101 is limited to 262.5 lines which is the same as that in the conventional picture signal recording apparatus. In contrast, the number of horizontal scanning lines of the HD input signal Sin is equal to 562.5 per a field. Therefore, even though the horizontal scanning lines of the HD input signal Sin is splitted in two, there is a drawback that the number of horizontal scanning lines splitted is over 262.5. To avoid the drawback, upper and lower horizontal scanning lines including a vertical synchronizing signal of the HD input signal Sin arranged in upper and lower sides of an image plane are deleted, and another vertical synchronizing signal newly added and remaining effective horizontal scanning lines of the HD input signal Sin are converted in the recording processing means 106. In detail, as shown in FIG. 24C, upper and lower horizontal scanning lines including a vertical synchronizing signal of the HD input signal Sin (or HDTV signal) arranged in upper and lower sides of an image plane are deleted to form a reduced HD signal equivalent to a MUSE signal in which the number of effective horizontal scanning lines is equal to 1032. Thereafter, the effective scanning lines of the reduced HD signal are splitted into a group of odd-numbered horizontal scanning lines of the first recorded TCI signal Sr1 and a group of even-numbered horizontal scanning lines of the second recorded TCI signal Sr2.

Figure 23F:
Figure 23G:
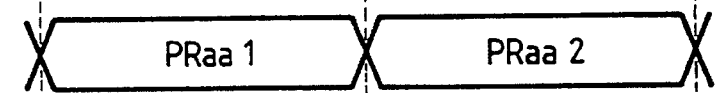
Figure 23H:

Next, in case of the second recording mode, the luminance signal Yaa shown in FIG. 23(F) and the first and second color difference signals PBaa, PRaa shown in FIGS. 23(G), 23(H) are supplied to the recording processing means 106. Thereafter, the first and second color difference signals PBaa, PRaa are respectively time-compressed, and the luminance signal Yaa is time-compressed. Thereafter, the first and second color difference signals PBaa, PRaa time-compressed and the luminance signal Yaa time-compressed are multiplexed according to the time division multiplexing to form the first recording TCI signal Sr1 shown in FIG. 23(I). In this case, a relationship among a period P3 of the first color difference signal PRaa compressed, a period P4 of the second color difference signal PBaa compressed, and a period P5 of the luminance signal Yaa compressed is set to P3:P4:P5=1:1:6. In other words, a ratio in time compression degree of the first color difference signal PRaa compressed to the luminance signal Yaa compressed is set to 6:1, and a ratio in time compression degree of the second color difference signal PBaa compressed to the luminance signal Yaa compressed is set to 6:1. Therefore, the time compression ratio (6:1) in the first normal picture signal Saa is larger than the time compression ratio (3:1) in the HD input signal Sin.

In case of the third recording mode, the first recorded TCI signal Sr1 is formed of the first normal picture signal Saa pertaining to the first program in the same manner as in the second recording mode. Also, the luminance signal Ybb and the first and second color difference signals PBbb, PRbb of the second normal picture signal are supplied to the recording processing means 106. Thereafter, the first and second color difference signals PBbb, PRbb are respectively time-compressed, and the luminance signal Ybb is time-compressed. Thereafter, the first and second color difference signals PBbb, PRbb time-compressed and the luminance signal Ybb time-compressed are multiplexed according to the time division multiplexing to form the second recorded TCI signal Sr2. In this case, a relationship among a period of the first color difference signal PRbb compressed, a period of the second color difference signal PBbb compressed, and a period of the luminance signal Ybb compressed is set to 1:1:6 in the same manner as in the first recorded TCI signal Sr1.

Next, a frequency band in each of the first, second and third recording modes is described on condition that a frequency band Br of each of the recorded TCI signals Sr1, Sr2 transferred in a head tape system described later is almost 8 MHz. In case of the first recording mode, the luminance signal Y pertaining to the recorded TCI signals Sr1, Sr2 is interposed in a period equal to ¾ of a line period of the normal picture signal Saa or Sbb, as shown in FIGS. 23(D), 23(E). Also, a line period of the HD input signal Sin is almost ½ of the line period of the normal picture signal Saa or Sbb. Therefore, a frequency band By of the luminance signal Y in case of the conversion of the recording TCI signal Sr1 or Sr2 to the HD input signal Sin is calculated to 12 MHz according to a following equation (5).

$$By = Br \times \frac{3}{4} \times 2 \tag{5}$$

Also, frequency bands Bc of the color difference signals PB, PR pertaining to the recorded TCI signals Sr1, Sr2 are respectively calculated to 4 MHz according to a following equation (6) in case of the conversion of the recorded TCI signal Sr1 or Sr2 to the HD input signal Sin.

$$By = Br \times \tfrac{1}{4} \times 2 \qquad (6)$$

Therefore, a ratio By:Bc of the frequency band By of the luminance signal Y to the frequency band Bc of the color difference signal PB or PR is equal to 3:1. Though the ratio By:Bc differs from a ratio 4:1 of the number (373) of samples of a luminance signal pertaining to a MUSE signal to the number (93) of samples of a color signal pertaining to the MUSE signal, the first recording mode is appropriate to recording of the MUSE signal of which a frequency is converted to a base band because of a frequency band (about 12 MHz) of a luminance signal and frequency bands (about 3 MHz) of color difference signals in a dynamic image formed of MUSE signals.

Figure 23I:

Next, in case of the second or third recording mode, because the luminance signal Yaa pertaining to the first recorded TCI signal Sr1 is interposed in a period equal to ⅝ of the line period of the first normal picture signal Saa as shown in FIG. 23(I), a frequency band Bya of the luminance signal Yaa is calculated to 6 MHz according to a following equation (7) in case of the conversion of the first recording TCI signal Sr1 to the first normal picture signal Saa.

$$Bya = Br \times \tfrac{5}{8} \qquad (7)$$

Also, frequency bands Bca of the color difference signals PBaa, PRaa pertaining to the first recorded TCI signal Sr1 are respectively calculated to 1 MHz according to a following equation (8) in case of the conversion of the first recording TCI signal Sr1 to the first normal picture signal Saa.

$$Bca = Br \times \tfrac{1}{8} \qquad (8)$$

The frequency band Bya=6 MHz of the luminance signal Yaa is equivalent to a resolution represented by 480 horizontal scanning lines. Therefore, the resolution is superior to that represented by 420 to 430 horizontal scanning lines which is achieved by performing a conventional high-quality recording method such as a S-VHS method or a high eight method. Also, the frequency band Bca=1 MHz of the color difference signal PBaa or PRaa is sufficiently wide for home use because a processing frequency band of a color signal in a household television receiver is almost 500 KHz.

Figure 25:
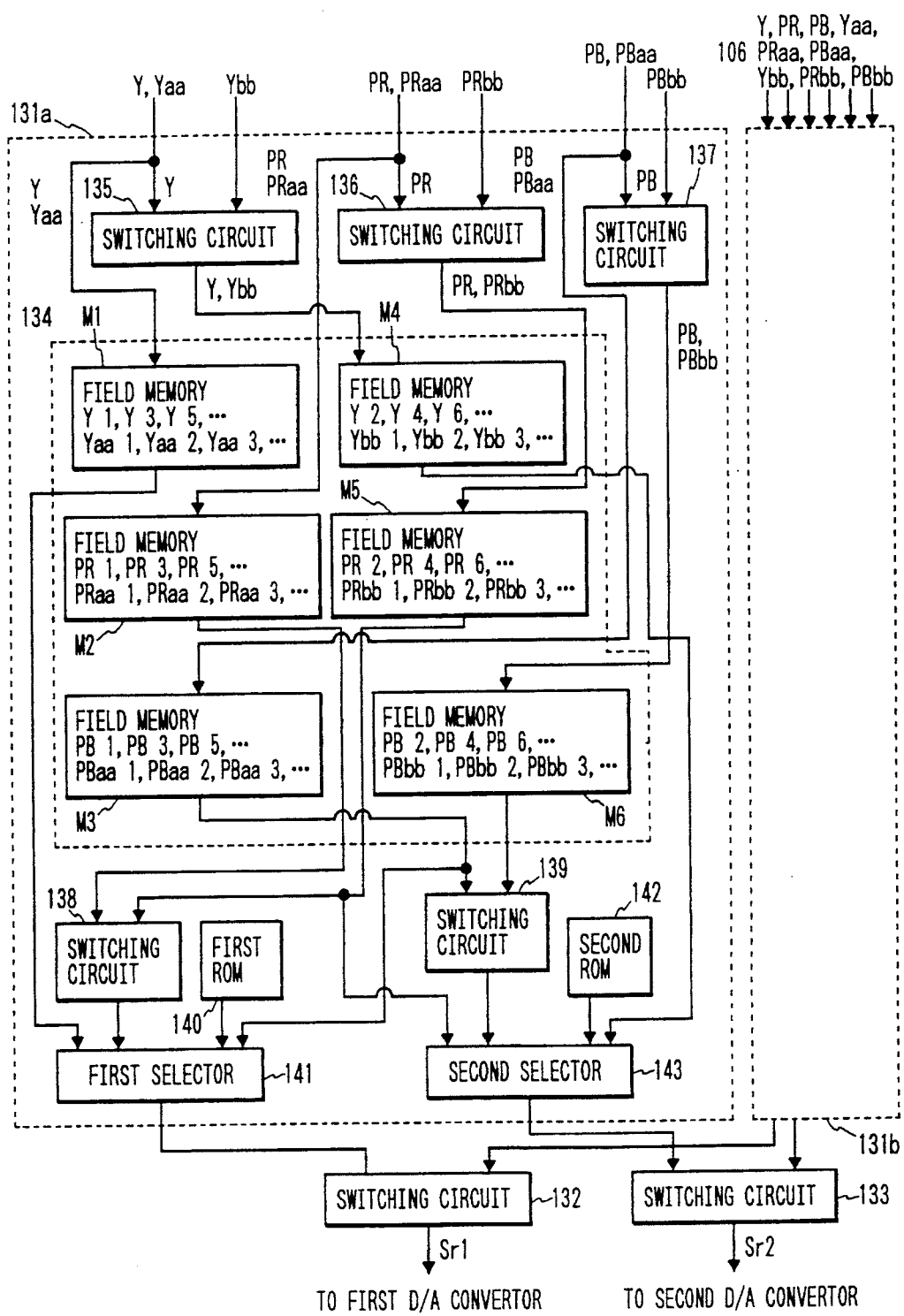
FIG. 25 is a block diagram of a recording processing means shown in FIG. 22.

FIG. 25 is a block diagram of the recording processing means 106.

As shown in FIG. 25, the recording processing means 106 comprises a pair of recording processing units 131a, 131b for alternately writing and reading the HD input signal Sin, the first normal picture signal Saa, or the second normal picture signal Sbb to alternately produce a pair of first and second recorded TCI signals Sr1, Sr2, a switching circuit 132 for alternately receiving the first recorded TCI signal Sr1 from the recording processing units 131a, 131b to successively produce the first recorded TCI signal Sr1, and a switching circuit 133 for alternately receiving the second recorded TCI signal Sr2 from the recording processing units 131a, 131b to successively produce the second recorded TCI signal Sr2.

Each of the processing units 131a, 131b comprises a memory region 134 having six field memories M1 to M6 for storing the luminance signal Y of the HD input signal Sin pertaining to odd-numbered scanning lines or the luminance signal Yaa of the first normal picture signal Saa in the field memory M1, storing the first color difference signal PR of the HD input signal Sin pertaining to odd-numbered scanning lines or the first color difference signal PRaa of the first normal picture signal Saa in the field memory M2, storing the second color difference signal PB of the HD input signal Sin pertaining to odd-numbered scanning lines or the second color difference signal PBaa of the first normal picture signal Saa in the field memory M3, storing the luminance signal Y of the HD input signal Sin pertaining to even-numbered scanning lines or the luminance signal Ybb of the second normal picture signal Sbb in the field memory M4, storing the first color difference signal PR of the HD input signal Sin pertaining to even-numbered scanning lines or the first color difference signal PRbb of the second normal picture signal Sbb in the field memory M5, and storing the second color difference signal PB of the HD input signal Sin pertaining to even-numbered scanning lines or the second color difference signal PBbb of the second normal picture signal Sbb in the field memory M6, a switching circuit 135 for selecting either the luminance signal Y or Ybb to write the selected luminance signal to the field memory M4, a switching circuit 136 for selecting either the first color difference signal PR or PRbb to write the selected signal to the field memory M5, a switching circuit 137 for selecting either the second color difference signal PB or PBbb to write the selected signal to PRbbi, PBbbi transferred from the processing unit 161b are also received, and the luminance line signals Ybbi and the color difference line signals PRbbi, PBbbi transferred From the processing units 161a, 161b are respectively combined to produce a combined luminance signal, a combined first color difference signal and a combined second color difference signal. Thereafter, the combined signals are transferred to the synchronizing signal adding means, and a synchronizing signal pertaining to a normal picture signal is respectively added to the combined signals to produce the luminance signal Ybb, the first color difference signal PRbb and the second color difference signal PBbb. Thereafter, the luminance signal Ybb produced in the reproduction processing means 154 is converted in a digital-to-analogue (D/A) converter 157d and is transferred to a second encoder 160, the first color difference signal PRbb is converted in a digital-to-analogue (D/A) converter 157e and is transferred to the second encoder 160, and the second color difference signal PBbb is converted in an digital-to-analogue (D/A) converter 157f and is transferred to the second encoder 160.

Accordingly, the reproduction of the HD input signal Sin, the first normal picture signal Saa or the second normal picture signal Sbb recorded in the magnetic tape MT can be performed in the reproduction processing means 154 even though the signal Sin, Saa or Sbb is recorded according to any of the first, second and third recording mode.

Also, because the field memories M1 to M6 of the memory region 168 in the reproduction processing means 106 is the same as those of the memory region 134 in the recording processing means 106, the memory region 134 can be utilized as the memory region 168.

Thereafter, the luminance signal Y and the first and second color difference signals PR, PB transferred to the first selecting means 158 are respectively output to transmission paths (not shown) in cases where the reproducing apparatus 151 is operated according to the first reproducing mode corresponding to the first recording mode. Also, the luminance signal Yaa and the first and second color difference signals PRaa, PBaa transferred to the first selecting means 158 are respectively output to a first encoder 159 in cases where the reproducing apparatus 151 is operated according to the second or third reproducing mode corresponding to the second or third recording mode. In the first encoder 159, the luminance signal Yaa and the first and second color difference signals PRaa, PBaa are converted to a composite picture signal equivalent to the first normal picture signal Saa, and the composite picture signal is output to a transmission path (not shown) as the first normal picture signal Saa reproduced in the picture signal reproducing apparatus 151. Also, the luminance signal Ybb and the first and second color difference writing clock. Thereafter, the luminance line signals Y1, Y3,-- written in the field memory M1 are read to the first selector 141, the first color difference line signals PR1, PR3,-- written in the field memory M2 are read to the switching circuit 138, the second color difference line signals PB1, PB3,-- written in the field memory M3 are read to the switching circuit 139 or the first selector 141, the luminance line signals Y2, Y4,-- written in the field memory M4 are read to the second selector 143, the first color difference line signals PR2, PR4,-- written in the field memory M5 are read to the switching circuit 138 or the second selector 143, and the second color difference line signals PB2, PB4,-- written in the field memory M6 are read to the switching circuit 139. The reading operations of the signals Y, PR, PB are respectively performed in synchronization with a reading clock of which a reading frequency is higher than a writing frequency of the reading clock.

In cases where the signals Y, PR, PB are converted in order of scanning line according to the selecting method shown in FIG. 24A, the first color difference line signals PR1, PR3,-- written in the field memory M2 are always selected in the switching circuit 138, and the second color difference line signals PB2, PB4,-- written in the field memory M6 are always selected in the switching circuit 139. In contrast, in cases where the signals Y, PR, PB are converted in order of scanning line according to the selecting method shown in FIG. 24B, a first color difference line signal written in the field memory M2 and a first color difference line signal written in the field memory M5 are alternately selected in the switching circuit 138 each time a line signal is selected, and a second color difference line signal written in the field memory M3 and a second color difference line signal written in the field memory M6 are alternately selected in the switching circuit 139 each time a line signal is selected. In addition, a first color difference line signal written in the field memory M2 is selected in the switching circuit 188 when a second color difference line signal written in the field memory M6 is selected in the switching circuit 139, and a first color difference line signal written in the field memory M5 is selected in the switching circuit 138 when a second color difference line signal written in the field memory M3 is selected in the switching circuit 139.

Thereafter, a line signal selected in the switching circuit 138, a luminance line signal written in the field memory M1 and an output signal stored in the first ROM 140 are transferred to the first selector 141 to combine the signals, and a first combined signal pertaining to the first recording TCI signal Sr1 shown in FIG. 23(D) is transferred to the switching circuit 132. In this case, any line signal written in the field memory M3 is not selected in the first selector 141. Also, a line signal selected in the switching circuit 139, a luminance line signal written in the field memory and an output signal stored in the first ROM 142 are transferred to the second selector 141 to combine the signals, and a second combined signal pertaining to the second recorded TCI signal Sr2 shown in FIG. 23(E) is transferred to the switching circuit 133. In this case, any line signal written in the field memory M5 is not selected in the second selector 143. In the same manner, a third combined signal pertaining to the first recorded TCI signal Sr1 shown in FIG. 23(D) is transferred from the processing unit 131b to the switching circuit 132, and a fourth combined signal pertaining to the second recorded TCI signal Sr2 shown in FIG. 23(E) is transferred from the processing unit 131b to the switching circuit 133. In the switching circuit 132, the first and third combined signals are combined to produce the first recorded TCI signal Sr1. In the switching circuit 133, the second and fourth combined signals are combined to produce the second recorded TCI signal Sr2.

Figure 26A:
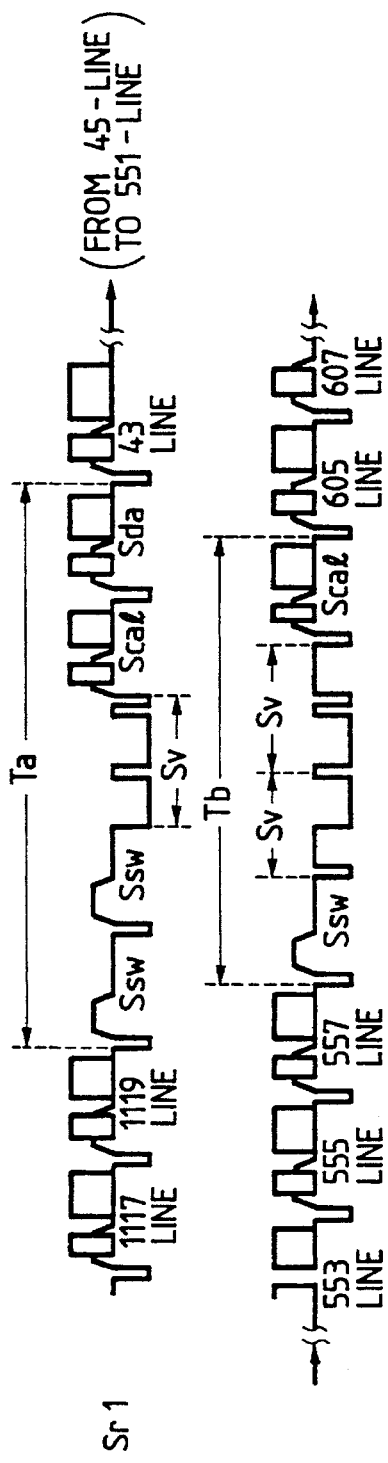
FIG. 26A shows a wave form of a first recorded TCI signal Sr1.
Figure 26B:
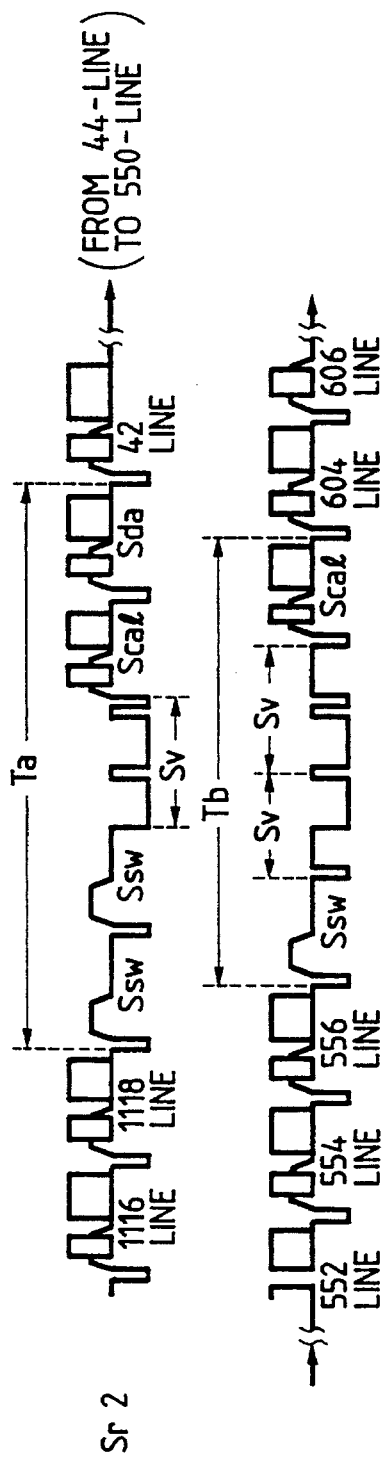
FIG. 26B shows a wave form of a second recorded TCI signal Sr2.

FIG. 26A shows a wave form of the first recorded TCI signal Sr1, and FIG. 26B shows a wave form of the second recorded TCI signal Sr2. Numerals written in FIGS. 26A, 26B denote the numbers of horizontal scanning lines.

As shown in FIGS. 26A, 26B, the output signals transferred from the first and second ROM 140, 142 are respectively interposed in periods Ta, Tb. That is, each of the output signals comprises a plurality of switching signals Ssw, a plurality of vertical synchronizing signals Sv, a plurality of calibrating signals Scal and an information signal Sda. The switching signals Ssw are utilized to make a margin for the change of magnetic heads. Therefore, a magnetic head is changed to another magnetic head during a period of the switching signal Ssw. The calibrating signal Scal is utilized for the calibration of transmission characteristics between an odd-numbered line system represented by the first recorded TCI signal Sr1 and an even-numbered system represented by the second recorded TCI signal Sr2. The information signal Sda specifies a time code or an amplification level. Also, the information signal Sda includes a piece of recording mode information indicating a recording mode determined in the recording mode determining section 104.

Next, operations performed in the recording processing means 106 are described in case of the second recording mode.

Luminance line signals Yaa1, Yaa2,-- of the luminance signal Yaa are directly written in the field memory M1 without passing through the switching circuit 135, first color difference line signals PRaa1, PRaa2,-- of the first color difference signal PRaa are directly written in the field memory M2 without passing through the switching circuit 136, and second color difference line signals PBaa1, PBaa2, -- of the second color difference signal PBaa are directly written in the field memory M3 without passing through the switching circuit 137. Thereafter, the luminance line signals written in the field memories M1 to M3 are respectively read out to the first selector 141 in synchronization with the reading clock, the first color difference line signals written in the field memory M2 are respectively read out to the first selector 141 through the switching circuit 138 in synchronization with the reading clock, and the second color difference line signals written in the field memory M3 are respectively read out to the first selector 141 in synchronization with the reading clock. In the first selector 141, the line signals are combined, and a first combined signal pertaining to the first recorded TCI signal Sr1 shown in FIG. 23(I) is transferred to the switching circuit 132. In the same manner, a second combined signal pertaining to the first recorded TCI signal Sr1 is transferred from the processing unit 131b to the switching circuit 132. In the switching circuit 132, the first and second combined signals are combined to produce the first recorded TCI signal Sr1. In this case, the second selector 143 does not function.

Next, operations performed in the recording processing means 106 are described in case of the third recording mode.

Luminance line signals Yaa1, Yaa2,-- of the luminance signal Yaa, first color difference line signals PRaa1, PRaa2,-- of the first color difference signal PRaa and second color difference line signals PBaa1, PBaa2,-- of the second color difference signal PBaa are written in the field memories M1 to M3 and are read out to produce the first recorded TCI signal Sr1 in the same manner as in the second recording mode. Also, luminance line signals Ybb1, Ybb2,-- of the luminance signal Ybb are written in the field memory M4 after the signals are selected in the switching circuit 135, first color difference line signals PRbb1, PRbb2,-- of the first color difference signal PRbb are written in the field memory M5 after the signals are selected in the switching circuit 136, and second color difference line signals PBbb1, PBbb2,-- of the second color difference signal PBbb are written in the field memory M6 after the signals are selected in the switching circuit 137. Thereafter, an output signal stored in the second ROM 142, the luminance line signals written in the field memory M4 and the first color difference line signals written in the field memory M5 are transferred to the second selector 143 in synchronization with the reading clock. Also, the second color difference line signals written in the field memory M6 are transferred to the second selector 143 through the switching circuit 139 in synchronization with the reading clock. In the second selector 143, the line signals and the output signal are combined to produce a first combined signal pertaining to the second recorded TCI signal Sr2, and the first combined signal is transferred to the switching circuit 133. In the same manner, a second combined signal pertaining to the second recorded TCI signal Sr2 is transferred from the processing unit 131b to the switching circuit 133. In the switching circuit 133, the first and second combined signals are combined to produce the second recorded TCI signal Sr2.

Thereafter, as shown in FIG. 22, the first recorded TCI signal Sr1 produced in the recording processing means 106 according to the first, second or third recording mode is converted into an analog signal in a first digital-to-analog (D/A) 110a and is modulated according to a frequency modulation (FM) in a first modulator 111a. Thereafter, the first recorded TCI signal Sr1 modulated is recorded on a magnetic tape MT through a pair of first magnetic heads 112a, 112b. Also, the second recorded TCI signal Sr2 produced in the recording processing means 106 according to the first, second or third recording mode is converted into an analog signal in a second digital-to-analog (D/A) 110b and is modulated according to the frequency modulation (FM) in a second modulator 111b. Thereafter, the second recorded TCI signal Sr2 modulated is recorded on the magnetic tape MT through a pair of second magnetic heads 113a, 113b.

In case of the fourth recording mode, the second normal picture signal Sbb is transferred to the conventional recording means 109 through the second selecting means 107. The conventional recording means 109 functions according to a VHS mode or an 8 mm mode. That is, a luminance signal Ybb of the second normal picture signal Sbb is emphasized and modulated according to a frequency modulation (FM). Also, a pair of color signals PRbb, PBbb are converted at a low frequency band. Thereafter, the luminance signal Ybb modulated and the color signals PRbb, PBbb are regulated in frequency and multiplexed to produce a recording signal Sr3. The recording signal Sr3 is recorded on the magnetic tape MT through a pair of third magnetic heads 114a, 114b.

An arrangement of the magnetic heads on a rotational drum is described with reference to FIG. 27.

As shown in FIG. 27, the first magnetic heads 112a, 112b, the second magnetic heads 113a, 113b and the third magnetic heads 114a, 114b are arranged at the periphery of a rotational drum 115 at the same height. In addition, a pair of fourth magnetic heads 116a, 116b utilized according to the first, second, third or fourth recording mode to record an audio signal modulated according to a frequency modulation or a pulse code modulation (PCM) are arranged at the periphery of the rotational drum 115 at the same height. The first magnetic heads 112a, 112b are arranged at opposite sides each other, the second magnetic heads 113a, 113b are arranged at opposite sides each other, the third magnetic heads 114a, 114b are arranged at opposite sides each other, and the fourth magnetic heads 116a, 116b are arranged at opposite sides each other. The magnetic heads 112a, 113a, 114a have the same azimuth direction D1, and the magnetic heads 112b 113b, 114b have the same other azimuth direction D2 differing from the azimuth direction D1.

A pattern of the first and second recorded TCI signals Sr1, Sr2 recorded on the magnetic tape MT in case of the first recording mode is described with reference to FIG. 28. Numerals shown in FIG. 28 denote the numbers of the horizontal scanning lines.

Figure 28:
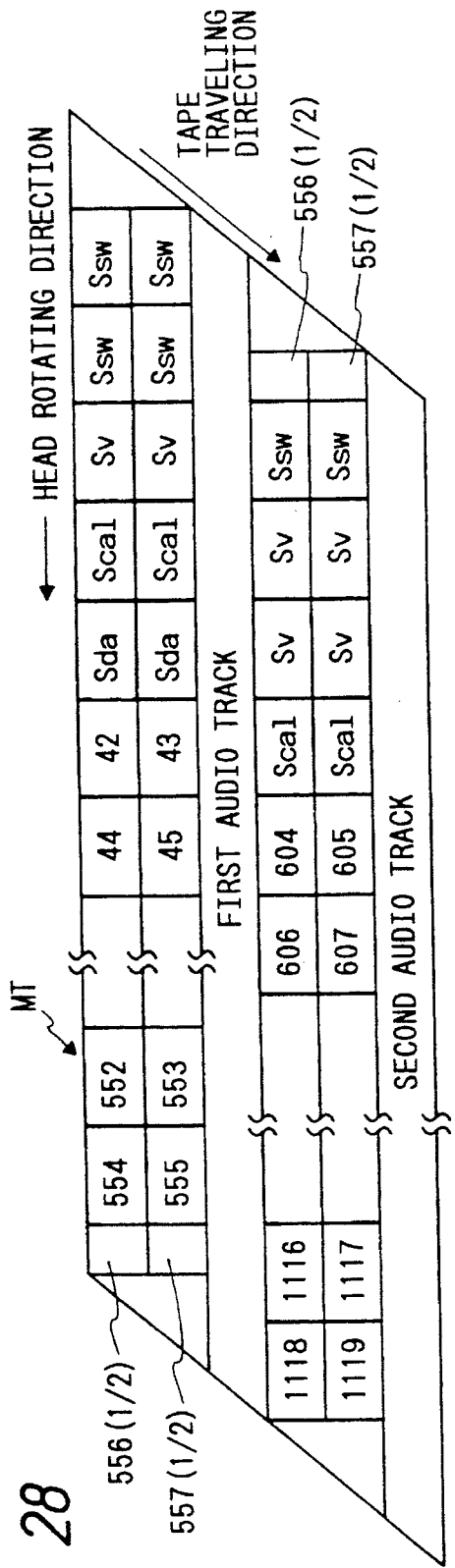
FIG. 28 shows a pattern of the first and second recorded TCI signals Sr1, Sr2 recorded on a magnetic tape MT in case of a first recording mode.

As shown in FIG. 28, an audio signal is recorded in a first audio track with the fourth magnetic head 116b preceding the magnetic heads 113a, 112b and is recorded in a first audio track with the fourth magnetic head 116a preceding the magnetic heads 113b, 112a. Thereafter, the second recording TCI signal Scr2 pertaining to even-numbered lines is recorded in a first even-numbered track of the magnetic tape MT with the second magnetic head 113a and is recorded in a second even-numbered track of the magnetic tape MT with the second magnetic head 113b. That is, the switching signals Ssw, the vertical synchronizing signal Sv, the calibrating signal Scal, the information signal Sda, and line signals ranging from a 42-line signal to a half of a 556-line signal are recorded in the first even-numbered track, and the switching signal Ssw, the vertical synchronizing signals Sv, the calibrating signal Scal, and line signals ranging from the other half of the 556-line signal to a 1118-line signal are recorded in the second even-numbered track. In contrast, the first recorded TCI signal Scr2 pertaining to odd-numbered lines is recorded in a first odd-numbered track of the magnetic tape MT with the first magnetic head 112b and is recorded in a second odd-numbered track of the magnetic tape MT with the first magnetic head 112a. That is, the switching signals Ssw, the vertical synchronizing signal Sv, the calibrating signal Scal, the information signal Sda, and line signals ranging from a 43-line signal to a half of a 557-line signal are recorded in the first odd-numbered track, and the switching signal Ssw, the vertical synchronizing signals Sv, the calibrating signal Scal, and line signals ranging from the other half of the 557-line signal to a 1119-line signal are recorded in the second odd-numbered track. The recordings with the magnetic heads 113a, 112b arranged adjacent to each other are simultaneously performed, and the recordings with the magnetic heads 113b, 112a arranged adjacent to each other are simultaneously performed.

Accordingly, the audio signal and the first and second recorded TCI signals Sr1, Sr2 equivalent to a frame of picture signal can be recorded in the magnetic tape MT.

Figure 29:
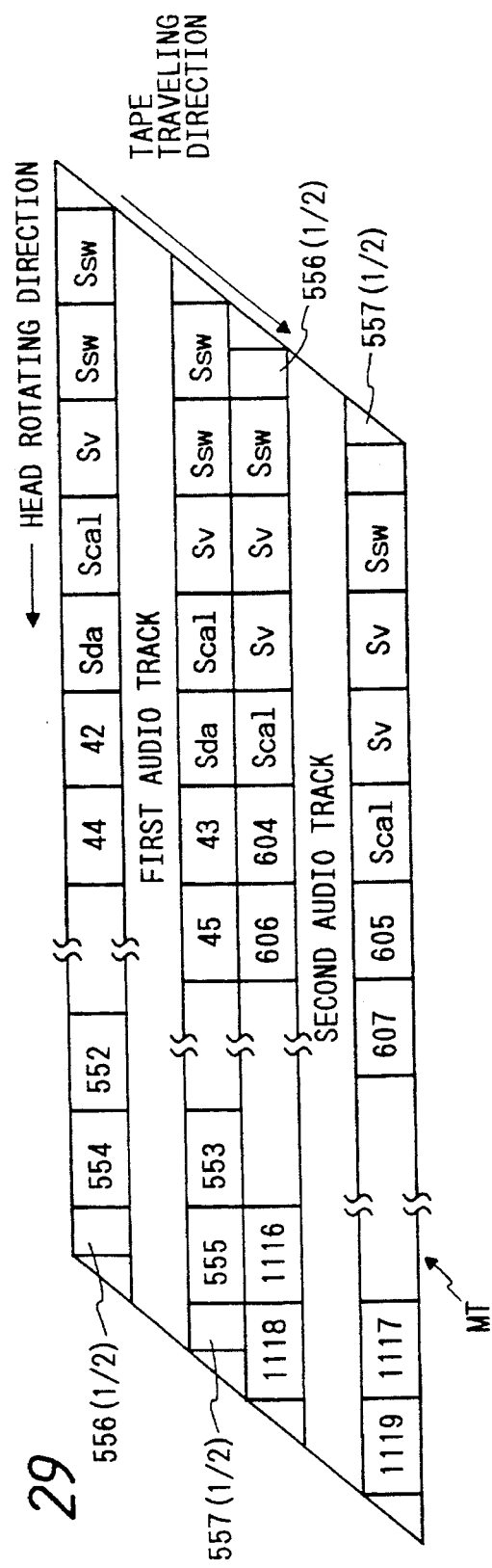
FIG. 29 shows another pattern of the first and second recorded TCI signals Sr1, Sr2 recorded on a magnetic tape MT in case of a first recording mode according to a modification of the second embodiment.

The pattern of the first and second recorded TCI signals Sr1, Sr2 recorded on the magnetic tape MT is not limited to that shown in FIG. 28. That is, in cases where the positional relationship in the heights of the magnetic heads attached to the rotational drum 115 is suitably adjusted, as shown in FIG. 29, a pattern of the first and second recorded TCI signals Sr1, Sr2 recorded on the magnetic tape MT can be obtained.

In case of the second recording mode, a running speed of the magnetic tape MT is set to a low speed equal to ⅓ of a standard speed at which the magnetic tape MT is run in case of the first recording mode, and the first recorded TCI signal Sr1 is recorded on the magnetic tape MT with the first magnetic heads 112a, 112b. Also, an audio signal is recorded on a deeper layer of the magnetic tape MT with the fourth magnetic heads 116a, 116b preceding the first magnetic heads 112a, 112b.

In the second recording mode, the first magnetic heads 112a, 112b are utilized. However, it is applicable that the second magnetic heads 113a, 113b be utilized in place of the first magnetic heads 112a, 112b.

In case of the third recording mode, the first and second normal picture signals Saa, Sbb pertaining to the first and second programs are recorded. In detail, the first recorded TCI signal Sr1 pertaining to the first program is recorded on the first and second odd-numbered tracks of the magnetic tape MT with the first magnetic heads 112a, 112b at the standard running speed of the magnetic tape MT which is the same as in the first recording mode, and the second recorded TCI signal Sr2 pertaining to the second program is recorded on the first and second even-numbered tracks of the magnetic tape MT with the second magnetic heads 113a, 113b at the standard running speed of the magnetic tape MT. Also, an audio signal is recorded on a deeper layer of the magnetic tape MT with the fourth magnetic heads 116a, 116b preceding the first and second magnetic heads 112a, 112b, 113a, 113b. Therefore, the first and second programs can be recorded on the magnetic tape MT at a high quality.

In case of the fourth recording mode, the recording signal Sr3 produced in the conventional recording means 109 is recorded on the magnetic tape MT with the third magnetic heads 114a, 114b of which head widths are respectively 3 times that of the first or second magnetic head.

Accordingly, in cases where the HD input signal Sin is recorded on the magnetic tape MT, the first and second color difference line signals PRaai, PBaai are deleted on every other scanning line to limit a frequency band occupied by the first and second color difference line signals PRaai, PBaai within a prescribed frequency band. In contrast, in cases where the first normal picture signal Saa and/or the second normal picture signal Sbb are recorded on the magnetic tape MT, any of the color difference line signals PRaai, PBaai, PRbbi, PBbbi is not deleted because the number of horizontal scanning lines in the first normal picture signal Saa and/or the second normal picture signal Sbb is almost half of that in the HD input signal Sin. Therefore, even though any of the HD input signal Sin, the first normal picture signal Saa and the second normal picture signal Sbb is processed in the picture signal recording apparatus 101, the signal Sin, Saa or Sbb can be recorded on the magnetic tape MT without optically degrading a vertical resolution of the first and second color difference signals PR and PB, PRaa and PBaa, or PRbb and PBbb within the prescribed frequency band limited.

Also, because a first time-compressed ratio (6/1) of the color difference signal PRaa, PBaa, PRbb or PBbb to the luminance signal Yaa or Ybb in the recording TCI signal Sr1 or Sr2 shown in FIG. 23(I) is larger than a second time-compressed ratio (3/1) of the color difference signal PR or PB to the luminance signal Y in the recording TCI signal Sr1 or Sr2 shown in FIG. 23(D) or 23(E), a frequency band ratio of the color difference signal to the luminance signal can be set to an appropriate ratio for domestic use in comparison that the first time-compressed ratio is the same as the second time-compressed ratio. Therefore, a high quality of picture signal can be recorded on the magnetic tape MT regardless of whether the HD input signal or the first or second normal picture signal is input to the picture signal recording apparatus 101.

Next, an operation performed in the recording mode determining section 104 is described with reference to FIGS. 30–34.

The picture signal recording apparatus 101 is operated according to a recording mode selected from among the first recording mode in which the HD input signal Sin is recorded on a metal tape at a standard recording speed, the second recording mode in which an NTSC signal represented by the first normal picture signal Saa is recorded on a metal tape at a low recording speed equal to ⅓ of the standard recording speed to store a program, and the third recording mode in which NTSC signals represented by the first and second normal picture signals Saa, Sbb are recorded on a metal tape at the standard recording speed to store two programs. In the recording mode determining section 104, the recording mode is determined by detecting the luminance signal Y of the HD input signal Sin. In cases where the luminance signal Y is detected, the first recording mode is adopted to select the HD input signal Sin in preference to the first normal picture signal Saa in the first selecting means 102. Also, in cases where the luminance signal Y is not detected, the second or third recording mode is adopted to select the first normal picture signal Saa in the first selecting means 102 and select the second normal picture signal Sbb in the second selecting means 107.

Figure 30:
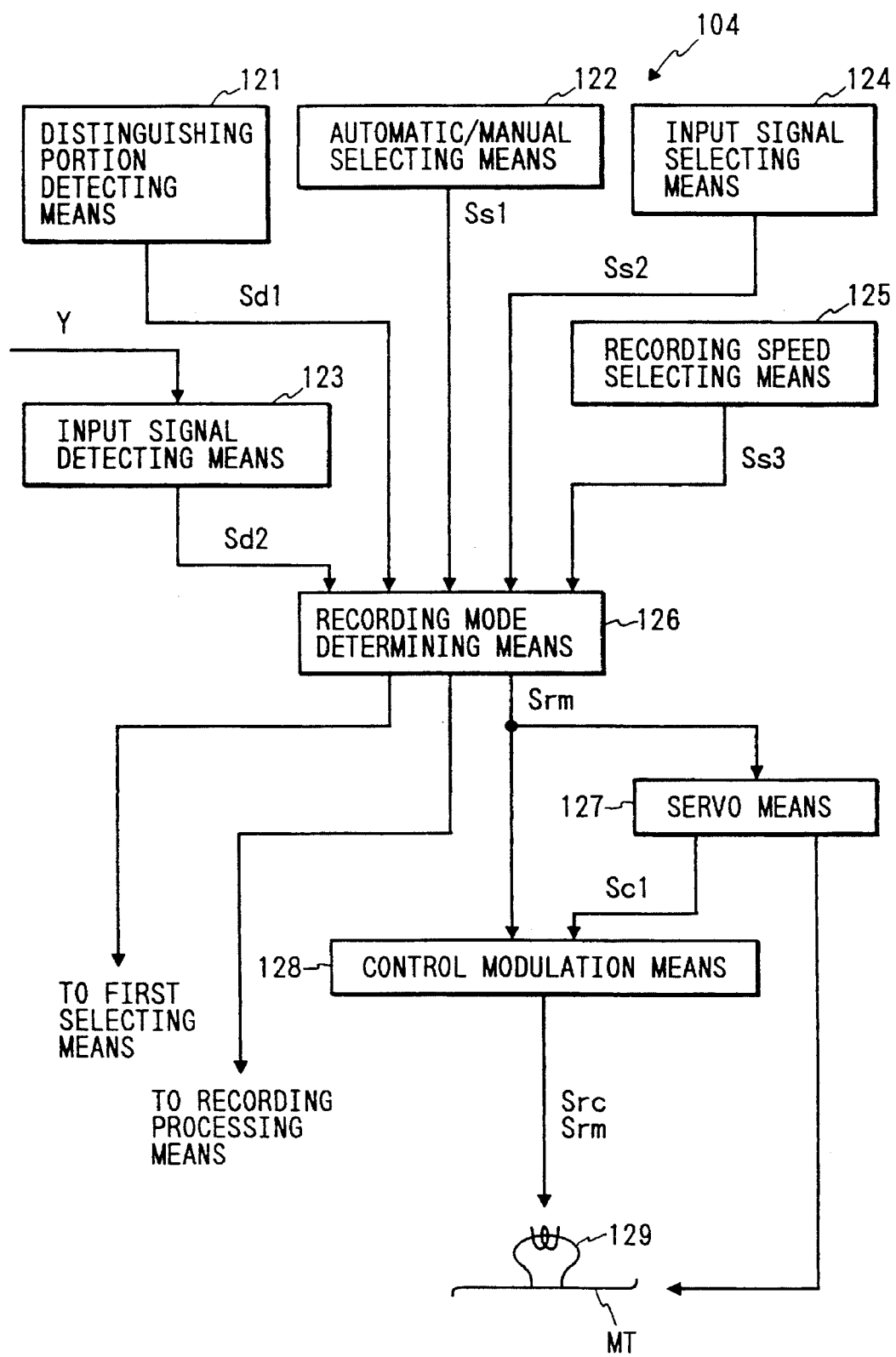
FIG. 30 is a block diagram of a recording mode determining section shown in FIG. 22.
Figure 31:
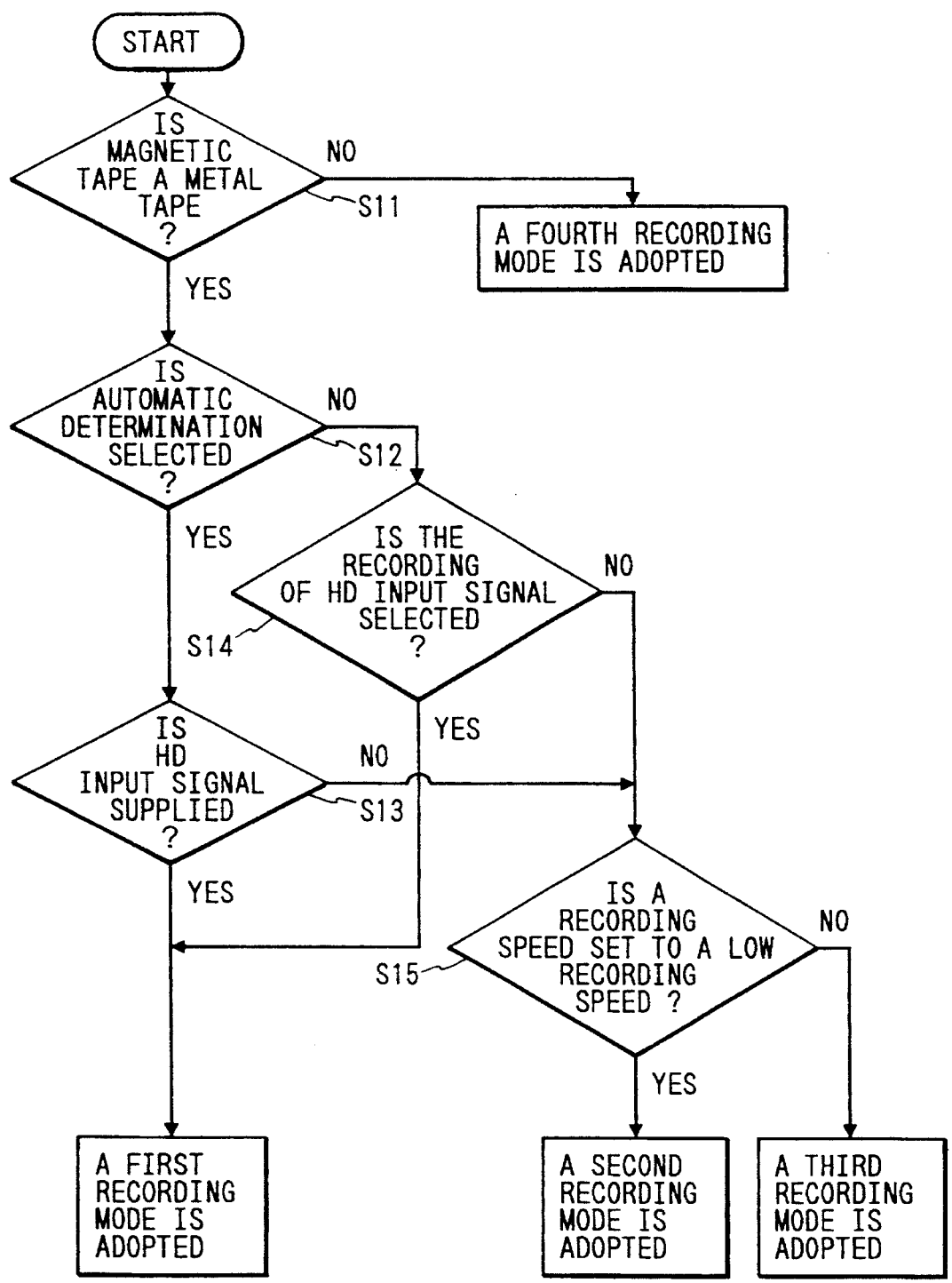
FIG. 31 is a flow chart showing an operation performed in the recording mode determining section to determine a recording mode selected from among first to third recording modes.

FIG. 30 is a block diagram of the recording mode determining section 104 shown in FIG. 22. FIG. 31 is a flow chart showing an operation performed in the recording mode determining section 104 to determine a recording mode selected from among the first to third recording modes.

As shown in FIG. 30, the recording mode determining section 104 comprises a distinguishing portion detecting means 121 for detecting a distinguishing portion attached to a tape cassette of the magnetic tape MT to distinguish a type of the magnetic tape MT, an automatic/manual selecting means 122 for selecting either an automatic selection of a recording mode or a manual selection of a recording mode, an input signal detecting means 123 for detecting the luminance signal Y of the HD input signal Sin transferred through a luminance signal line is in cases where the automatic selection is selected in the automatic/manual selecting means 122, an input signal selecting means 124 for selecting either the recording of the HD input signal Sin or the recording of the NTSC signal represented by the first or second picture signal Saa or Sbb according to an instruction of an operator in cases where the manual selection is selected in the automatic/manual selecting means 122, a recording speed selecting means 125 for selecting either the normal speed or the low recording speed as a running speed of the magnetic tape MT, a recording mode determining means 126 for determining a type of the magnetic tape MT according to a detecting result of the distinguishing portion detecting means 121, distinguishing the selection performed in the automatic/manual selecting means 122, judging whether or not the HD input signal Sin is supplied to the picture signal recording apparatus 101 according to a detecting result of the input signal detecting means 123, judging whether the recording of the HD input signal Sin or the recording of the NTSC signal is selected in the input signal selecting means 124, and distinguishing either the standard or low recording speed selected in the recording speed selecting means 125, to determine a recording mode from among the first to third recording modes, a servo means 127 for controlling a running speed of the magnetic tape MT in a recording operation according to the selection performed in the recording speed selecting means 125 and generating a frame period of control signal to control a running speed of the magnetic tape MT in a reproducing operation, a control modulation means 128 for modulating the control signal generated in the servo means 127 to produce a recording control signal which is obtained by changing a duty ratio of the control signal to multiplex the recording mode determined in the recording mode determining means 126 with the running speed indicated by the control signal, and a fifth magnetic head 129 through which the recording control signal obtained in the control modulation means 128 is recorded on a control track of the magnetic tape MT to record the running speed of the magnetic tape MT and the recording mode multiplexed.

In the above configuration of the recording mode determining section 104, as shown in FIG. 31, when an operator instructs the recording mode determining section 104 to determine a recording mode selected from among the first to third recording modes, a type of the magnetic tape MT is distinguished in the recording mode determining means 126 in a step S11. In detail, a distinguishing portion attached to a tape cassette of the magnetic tape MT informs of the type of the magnetic tape MT. For example, the distinguishing portion denotes the position of a detecting hole arranged at a bottom surface of the tape cassette, and the position of the detecting hole is determined in dependence on a type of the magnetic tape MT. Therefore, the distinguishing portion is detected in the distinguishing portion detecting means 121, and a distinguishing portion detecting signal Sd1 is transferred to the recording mode determining means 126 to inform the type of the magnetic tape MT. Thereafter, the type of the magnetic tape MT is distinguished according to the distinguishing portion detecting signal Sd1. In cases where the type of the magnetic tape MT is judged in the recording mode determining means 126 to be a metal tape belonging to a super high performance recording medium, the procedure proceeds to a step S12. In contrast, in cases where the type of the magnetic tape MT is judged to be a S-VHS type of tape belonging to a high performance recording medium or a VHS type of tape belonging to a normal recording medium, the fourth recording mode is adopted in a conventional recording mode determining means (not shown), and the picture signal recording apparatus 101 is operated according to the fourth recording mode.

In the step S12, it is judged in the recording mode determining means 126 whether an automatic determination of a recording mode or a manual determination of a recording mode is selected in the automatic/manual selecting means 122. In detail, when an operator selects either an automatic determination of a recording mode or a manual determination of a recording mode in the automatic/manual selecting means 122, a first selecting signal Ss1 is transferred to the recording mode determining means 126 and the input signal selecting means 124. Thereafter, the selection performed in the automatic/manual selecting means 122 is judged according to the first selecting signal Ss1. In cases where the automatic determination is selected in the automatic/manual selecting means 122, the procedure proceeds to a step S13. In contrast, in cases where the manual determination is selected in the automatic/manual selecting means 122, the procedure proceeds to a step S14.

In the step S13, it is judged in the recording mode determining means 126 whether the HD input signal Sin or the NTSC signal is supplied to the picture signal recording apparatus 101. In detail, it is detected in the input signal detecting means 123 whether or not the luminance signal Y of the HD input signal Sin is transferred to the first selecting means 102 through the luminance signal line Ls. For example, in cases where an integrated value of amplitudes of signals transferred through the luminance signal line Ls is larger than a prescribed threshold or in cases where a synchronizing signal transferred through the luminance signal line Ls is detected, a detecting signal Sd2 is transferred from the input signal detecting means 123 to the recording mode determining means 126 to inform the detection of the HD input signal Sin. Thereafter, it is judged in the recording mode determining means 126 that the HD input signal Sin is detected in the input signal detecting means 123. In cases where it is judged that the HD input signal Sin is detected, the first recording mode is adopted in the recording mode determining means 126, and a recording mode signal Srm indicating the first recording mode adopted in the determining means 126 is transferred from the determining means 126 to the servo means 127 and the control modulation means 128 to operate the picture signal recording apparatus 101 according to the first recording mode. In contrast, in cases where it is judged that the HD input signal Sin is not detected, the procedure proceeds to a step S15.

In the input signal detecting means 123, the luminance signal Y is detected. However, it is applicable that the first or second color difference signal PR or PB be detected in place of the luminance signal Y. Also, it is applicable that the detection of the HD input signal Sin be judged in cases where the luminance signal Y and the first and second color difference signals PR, PB are detected together. Also, a broadcast utilizing the HD signal is performed by transmitting a MUSE signal through a broadcasting satellite in a MUSE signal mode, and a receiving detection signal indicating whether or not the MUSE signal is received in a broadcasting satellite (BS) tuner of the picture signal recording apparatus 101 is output. Therefore, it is applicable that the receiving detection signal be transferred to the input signal detecting means 123 to detect the HD input signal Sin. In this case, even though the HD input signal Sin is not supplied to the picture signal recording apparatus 101, the detecting signal Sd2 indicating the detection of the HD input signal Sin is transferred to the recording mode determining means 126 in cases where the receiving detection signal indicating the detection of the HD input signal Sin is transferred to the input signal detecting means 123.

In the step S14, it is judged whether or not the recording of the HD input signal Sin on the magnetic tape MT is selected. In detail, when an operator selects either the recording of the HD input signal Sin or the recording of the NTSC signal in the input signal selecting means 124, a second selecting signal Ss2 is transferred from the selecting means 124 to the recording mode determining means 126 to inform of a type of signal recorded on the magnetic tape MT. Thereafter, the operator's selection is judged in the recording mode determining means 126 according to the second selecting signal Ss2. In cases where the second selecting signal Ss2 indicates the recording of the HD input signal Sin, it is judged in the determining means 126 that the recording of the HD input signal Sin is selected by the operator, and the picture signal recording apparatus 101 is operated according to the first recording mode which is substantially selected by the operator. In contrast, in cases where the second selecting signal Ss2 indicates the recording of the NTSC signal, it is judged in the determining means 126 that the recording of the NTSC signal is selected by the operator, and the procedure proceeds to the step S15.

In the input signal selecting means 124, either the recording of the HD input signal Sin or the recording of the NTSC signal is selected. However, it is applicable that a signal be selected from among the HD input signal Sin, the NTSC signal and an extended definition television (EDTV) signal to record the selected signal on the magnetic tape MT.

In the step S15, it is judged whether a recording speed is set to the normal recording speed or the low recording speed. In detail, either the normal recording speed or the low recording speed is selected in the recording speed selecting means 125, and a third selecting signal Ss3 is transferred from the selecting means 125 to the recording mode determining means 126 to inform of the recording speed selected. In the determining means 126, the recording speed selected in the recording speed selecting means 125 is distinguished. In cases where the low recording mode is selected, the second recording mode is adopted in the determining means 126, and a recording mode signal Srm indicating the second recording mode adopted in the distinguishing means 126 is transferred from the determining means 126 to the servo means 127 and the control modulation means 128 to operate the picture signal recording apparatus 101 according to the second recording mode. In contrast, in cases where the standard recording mode is selected, the third recording mode is adopted in the determining means 126, and a recording mode signal Srm indicating the third recording mode adopted in the determining means 126 is transferred from the determining means 126 to the servo means 127 and the control modulation means 128 to operate the picture signal recording apparatus 101 according to the third recording mode.

Accordingly, a recording mode selected from among the first to third recording modes can be reliably determined in the recording mode determining means 126.

Thereafter, in the servo means 127, a running speed of the magnetic tape MT is controlled according to the recording mode signal Srm in which a piece of recording speed information is included. Also, a control signal Sc1 indicating a frame period of an input signal Sin, Saa or Sbb recorded on the magnetic tape MT is generated according to the recording mode signal Srm and is transferred to the control modulation means 128.

In the control modulation means 128, a duty ratio of the control signal Sc1 is modulated according to the recording mode signal Srm to produce a recording control signal Src of which a duty ratio differs from that of the control signal Sc1. The recording control signal Src and the recording mode signal Srm are recorded on a control track (not shown) of the magnetic tape MT through the fifth magnetic head 129. The control track is formed in a longitudinal direction of the magnetic tape MT.

An object in the modulation of the control signal Sc1 is described with reference to FIGS. 32, 33.

The control signal Sc1 is utilized as a reference signal for a capstan servo in a reproduction period to control the running speed of the magnetic tape MT. In this case, the recording speed information included in the control signal Sc1 is indicated by a leading edge of the control signal Sc1, and a trailing edge of the control signal Sc1 has no relation with the recording speed information. In other words, even though the duty ratio of the control signal Sc1 is changed according to a modulation, the recording speed information is not changed. Therefore, the duty ratio of the control signal Sc1 is changed to record a piece of prescribed information on the magnetic tape MT as a conventional art.

Figures 33A, 33B:
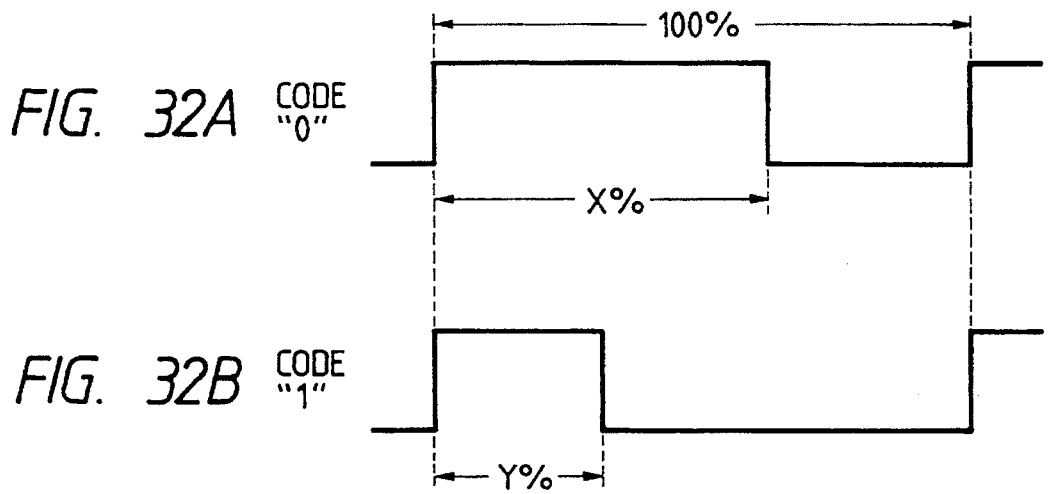
FIG. 33A shows a relationship between a recording mode determined in a recording mode determining means shown in FIG. 30 and a code indicated by the recording control signal Src.
FIG. 33B shows another relationship between a recording mode determined in the recording mode determining means shown in FIG. 30 and a code indicated by the recording control signal Src.

FIG. 32A shows a wave form of the recording control signal Src in which a high level period is set to X% to designate a code "0". FIG. 32B shows a wave form of the recording control signal Src in which a high level period is set to Y% to designate a code "1". FIG. 33A shows a relationship between a recording mode determined in the recording mode determining means 126 and a code indicated by the recording control signal Src. FIG. 33B shows another relationship between a recording mode determined in the recording mode determining means 126 and a code indicated by the recording control signal Src.

As shown in FIGS. 32A, 33A, in cases where the control signal Sc1 is modulated according to the recording mode signal Srm indicating the first or second recording mode, the recording control signal Src in which a high level period is set to X% is produced to designate a code "0". Therefore, the recording control signal Src recorded on the magnetic tape MT in case of the first recording mode is the same as that in case of the second recording mode. A distinguishing method of a recording mode between the first and second recording modes in a reproducing operation is as follows. Because the recording speed of the recording control signal Src in case of the first recording mode differs from that in case of the second recording mode, a density of the recording control signal Src reproduced from the magnetic tape MT in case of the first recording mode differs from that in case of the second recording mode. Therefore, in cases where a density of the recording control signal Src is detected in a reproducing operation, the first and second recording modes can be distinguished.

Also, as shown in FIGS. 32B, 33A, in cases where the control signal Sc1 is modulated according to the recording mode signal Srm indicating the third recording mode, the recording control signal Src in which a high level period is set to Y% is produced to designate a code "1". In this case, the value X is larger than the value Y. As an example, a relationship of X=60 and Y=27.5 is utilized. Therefore, in cases where the recording control signal Src indicating a code "1" is recorded in the control track of the magnetic tape MT, the first and second normal picture signals Saa, Sbb can be recorded according to the third recording mode under control of the recording control signal Src recorded.

Accordingly, three types of recording modes can be distinguished by a single bit of the recording control signal Src, and the number of bits required in the apparatus 101 can be reduced.

Also, in cases where an EDTV signal is supplied to the apparatus 101 in addition to the HD input signal Sin to record the EDTV signal according to a fifth recording mode, as shown in FIG. 33B, a code utilized to distinguish a recording mode from among the first, second, third and fifth recording modes is indicated by two bits. Also, in cases where one or more other recording modes are added, it is applicable that a code be indicated by three or more bits.

Next, a determining operation performed in the recording mode determining section 104 on condition that the third recording mode is not utilized.

Figure 34:
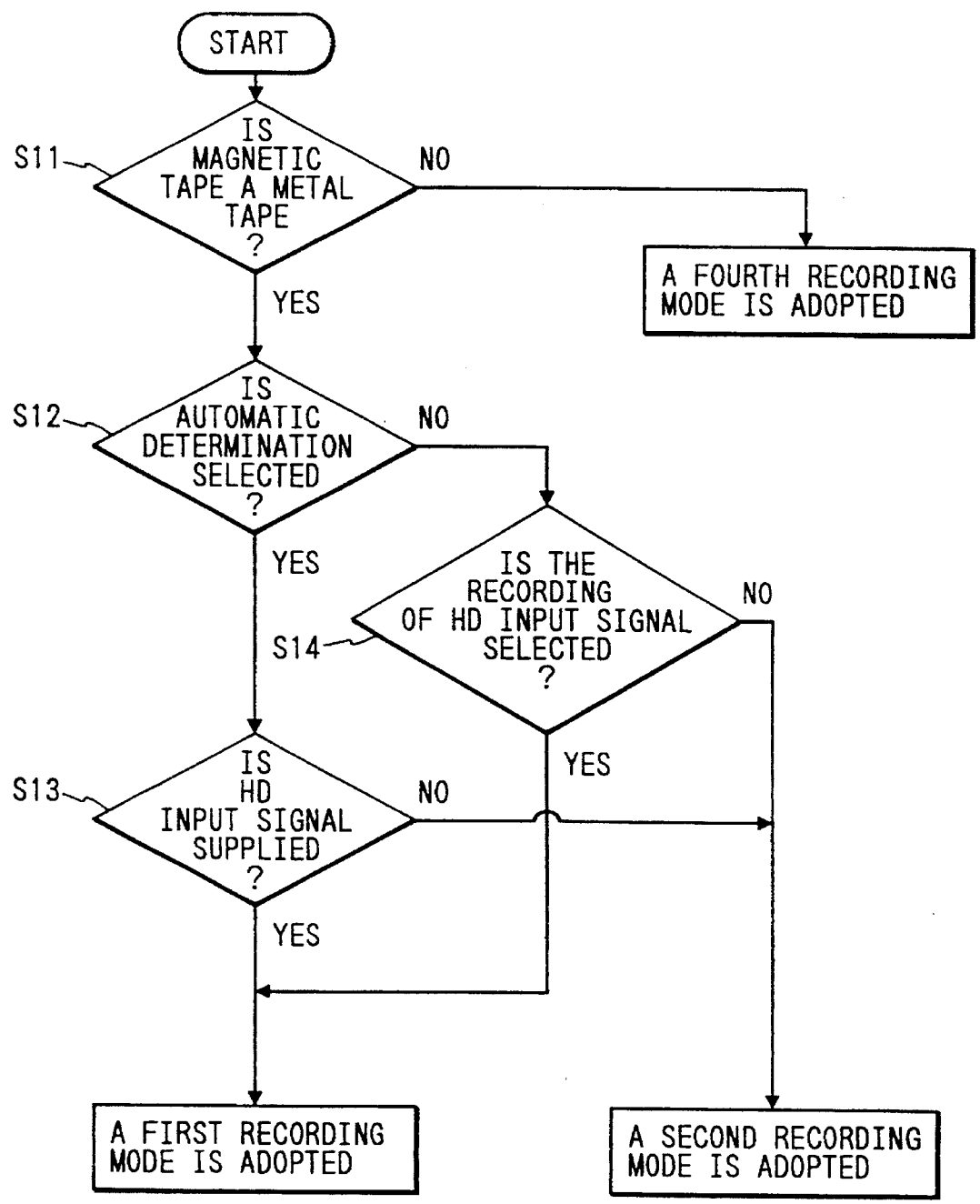
FIG. 34 is a flow chart showing an operation performed in the recording mode determining section shown in FIG. 30 to adopt either the first or second recording mode.

FIG. 34 is a flow chart showing an operation performed in the recording mode determining section 104 to adopt the first or second recording mode.

As shown in FIG. 34, the procedure proceeds to the steps S11, S12, S18 and S14 in the same manner as the procedure shown in FIG. 31, and the first recording mode is adopted in the steps S13, S14 in the same manner. Also, in cases where it is judged in the step S13 that the HD input signal Sin is not detected, the second recording mode is adopted in the determining means 126, and the picture signal recording apparatus 101 is operated according to the second recording mode. Also, in cases where it is judged in the step S14 that the recording of the NTSC signal is selected, the second recording mode is adopted in the determining means 126, and the picture signal recording apparatus 101 is operated according to the second recording mode. Thereafter, a recording mode signal Srm indicating the second recording mode adopted in the determining means 126 is transferred to the servo means 127 and the control modulation means 128, and a recording control signal Src and the recording mode signal Srm is recorded in the same manner.

Accordingly, because the input of the HD input signal Sin to the picture signal recording apparatus 101 is detected in the input signal detecting means 123, the HD input signal Sin is necessarily recorded on the magnetic tape MT regardless of whether the first or second normal picture signal Saa or Sbb is input to the recording apparatus 101. In other words, the HD input signal Sin utilized to record a program at a high quality can be recorded prior to the first or second normal picture signal Saa or Sbb utilized to record a program at a normal quality when the HD input signal Sin and the first or second normal picture signal Saa or Sbb are simultaneously input to the recording apparatus 101. Therefore, in cases where a program pertaining to the HD input signal Sin is the same as that pertaining to the first or second normal picture signal Saa or Sbb, the HD input signal Sin can be selected prior to the first or second normal picture signal Saa or Sbb to record the program at a high quality.

Also, because a recording mode adopted in the picture signal recording apparatus 101 is determined in the recording mode determining section 104, a picture signal selected can be recorded at an appropriate recording speed corresponding to a frequency band of the picture signal. In particular, in cases where the first normal picture signal Saa is to be recorded at the low recording speed according to the second recording mode, there is no probability that the first normal picture signal Saa is erroneously recorded at the standard recording speed 3 times higher than the low recording speed. Therefore, a utilization efficiency of the magnetic tape MT can be enhanced.

Also, because the recording mode signal Srm indicating a recording mode and a recording speed is recorded on the control track of the magnetic tape MT through the fifth magnetic head 129, the recording mode and the recording speed selected in the recording apparatus 101 can be detected in a reproducing operation.

Also, because a recording mode selected in the recording apparatus 101 is recorded on the control track of the magnetic tape MT with the recording control signal Src which is mainly utilized to control a running speed of the magnetic tape MT, an additional mode recording area for the recording of the recording mode selected is not required. Therefore, a utilization efficiency of the magnetic tape MT can be enhanced.

Also, because the input signal selecting means 124 is provided in the determining section 104 to manually select either the recording of the HD input signal Sin or the recording of the first or second picture signal Saa or Sbb, the first or second picture signal Saa or Sbb can be recorded on the magnetic tape MT according to an instruction of an operator when the HD input signal Sin and the first or second picture signal Saa or Sbb are input to the recording apparatus 101. Therefore, even though a recording capacity of the magnetic tape MT is small, the first or second picture signal Saa or Sbb can be selectively recorded for a long time because the first or second picture signal Saa or Sbb is recorded at the low recording speed.

Also, because the recording apparatus 101 can be operated according to the third recording mode, two types of normal picture signals pertaining to two different programs can be simultaneously recorded on the magnetic tape MT at the standard recording speed.

In the above embodiment, the relationship among the period P3 of the first color difference signal PRaa compressed, the period P4 of the second color difference signal PBaa compressed, and the period P5 of the luminance signal Yaa compressed is set to P3:P4:P5=1:1:6. However, the relationship is not limited to P3:P4:P5=1:1:6 in the present invention. For example, in cases where a picture signal pertaining to computer graphics is recorded on the magnetic tape MT, it is preferred that the relationship be set to P3:P4:P5=1.6:1.6:4.8 because the color difference signals PR, PB of the picture signal ranges in a wide frequency band. In this case, it is preferred that frequency bands of the first color difference signal PR, the second color difference signal PB and the luminance signal Y be set to 1.6 MHz, 1.6 MHz and 4.8 MHz to balance the frequency bands of the luminance signal Y and the color difference signals PR, PB.

Next, a picture signal reproducing apparatus for reproducing the HD input signal Sin, the first normal picture signal Saa or the second normal picture signal Sbb recorded on the magnetic tape MT is described.

Figure 35:
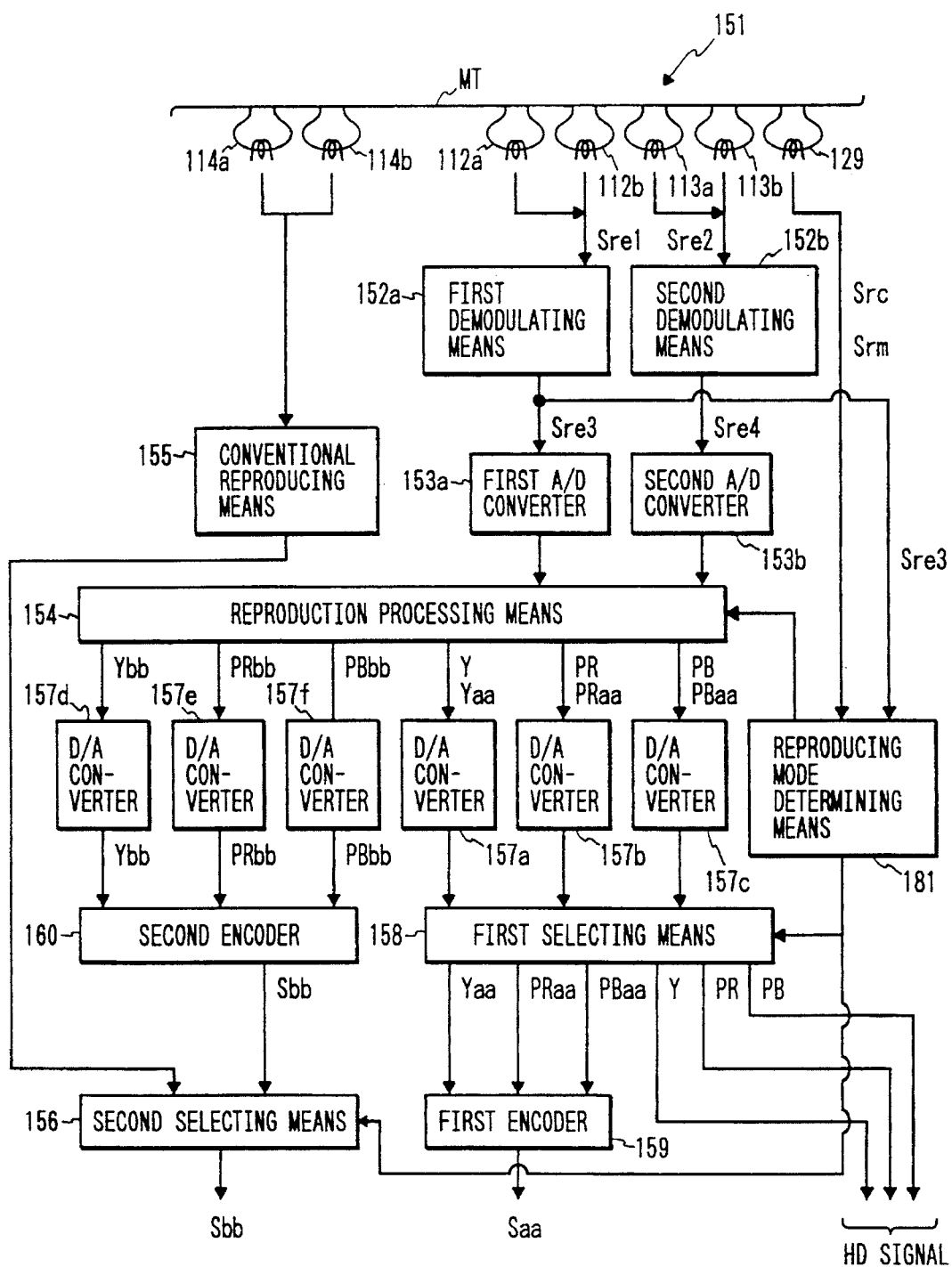
FIG. 35 is a block diagram of a picture signal reproducing apparatus according to the second embodiment of the present invention.

FIG. 35 is a block diagram of a picture signal reproducing apparatus.

As shown in FIG. 35, in cases where the HD input signal Sin, the first normal picture signal Saa or the second normal picture signal Sbb recorded on the magnetic tape MT according to the first, second or third recording mode is reproduced in a picture signal reproducing apparatus 151, the HD input signal Sin, the first normal picture signal Saa or the second normal picture signal Sbb recorded is read out from the magnetic tape MT with the first magnetic heads 112a, 112b and the second magnetic heads 113a, 113b to produce a pair of reproduced signals Sre1, Sre2. Thereafter, the reproduced signals Sre1, Sre2 are demodulated according to a frequency modulation (FM) in a first demodulating means 152a and a second demodulating means 152b to produce first and second reproduced TCI signals Sre3, Sre4. Thereafter, the first and second reproduced TCI signals Sre3, Sre4 are digitized in a first analogue-to-digital (A/D) converter 153a and a second analogue-to-digital (A/D) converter 153b and are transferred to a reproduction processing means 154 which is complementary to the recording processing means 106. The first reproduced TCI signal Sre3 digitized is equivalent to the first recording TCI signal Sr1, and the second reproduced TCI signal Sre4 digitized is equivalent to the second recording TCI signal Sr2. Also, the first reproduced TCI signal Sre3 is transferred to a reproducing mode determining section 181 to determine a reproducing mode of the HD input signal Sin by distinguishing the recording mode, the first normal picture signal Saa or the second normal picture signal Sbb recorded on the magnetic tape MT according to the first to third recording mode. That is, a first reproducing mode is adopted in the determining section 181 in case of the recording of the HD input signal Sin according to the first recording mode, a second reproducing mode is adopted in the determining section 181 in case of the recording of the first normal picture signal Saa according to the second recording mode, and a third reproducing mode is adopted in the determining section 181 in case of the recording of the first and second normal picture signals Saa, Sbb according to the third recording mode.

In contrast, in cases where the second normal picture signal Sbb recorded on the magnetic tape MT according to the fourth recording mode is reproduced in the picture signal reproducing apparatus 151, the second normal picture signal Sbb recorded is read to a conventional reproducing means 155 with the third magnetic heads 114a, 114b. In the conventional reproducing means 155, the second normal picture signal Sbb reproduced is divided into a frequency-modulated luminance signal and a pair of low band converted color signals. The frequency-modulated luminance signal ranges within a relatively high frequency band and is processed according to a frequency modulation (FM) and a deemphasis to produce a reproduced luminance signal. The low band converted color signals range within a relatively low frequency band and are processed according to a high frequency conversion to produce a pair of reproduced color signals. The reproduced luminance signal and the reproduced color signals are added to reproduce the second normal picture signal Sbb, and the second normal picture signal Sbb reproduced is transferred to a transmission path (not shown) through a second selecting means 156.

Next, a reproduction processing of the first and second reproduced TCI signals Sre3, Sre4 performed in the reproduction processing means 154 is described in detail with reference to FIG. 36.

Figure 36:
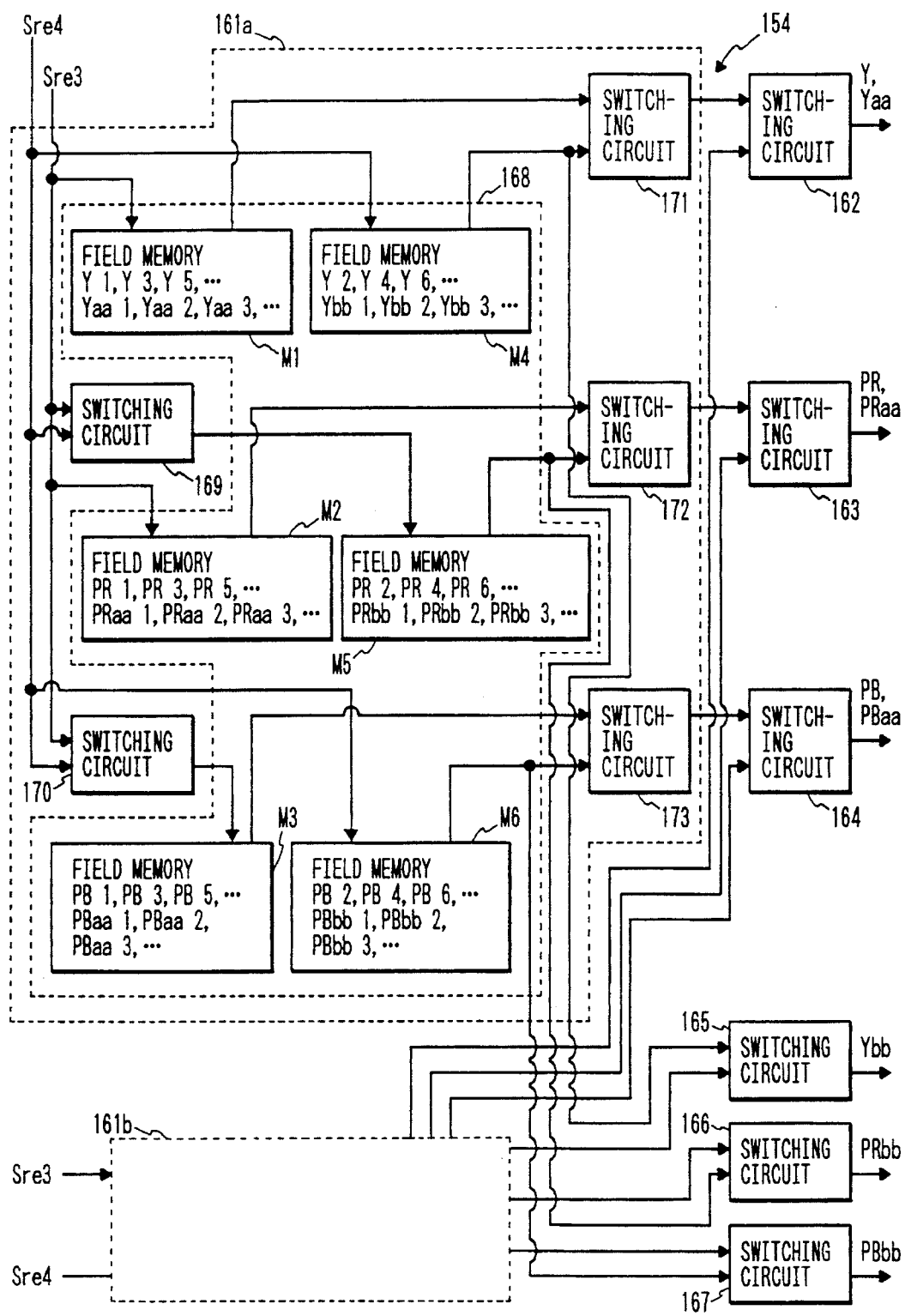
FIG. 36 is a block diagram of a reproduction processing means shown in FIG. 35.

FIG. 36 is a block diagram of the reproduction processing means 154.

As shown in FIG. 36, the reproduction processing means 154 comprises a pair of reproduction processing units 161a, 161b for alternately writing and reading the first and second reproduced TCI signals Sre3, Sre4 digitized to alternately reproduce the HD input signal Sin, the first normal picture signal Saa, or the second normal picture signal Sbb, a switching circuit 162 for alternately receiving the luminance signal Y or Yaa of the HD input signal Sin or the first normal picture signal Saa from the reproduction processing units 161a, 161b to successively produce the luminance signal Y or Yaa, a switching circuit 163 for alternately receiving the first color difference signal PR or PRaa of the HD input signal Sin or the first normal picture signal Saa from the reproduction processing units 161a, 161b to successively produce the first color difference signal PR or PRaa, a switching circuit 164 for alternately receiving the second color difference signal PB or PBaa of the HD input signal Sin or the first normal picture signal Saa from the reproduction processing units 161a, 161b to successively produce the second color difference signal PB or PBaa, a switching circuit 165 for alternately receiving the luminance signal Ybb of the second normal picture signal Sbb from the reproduction processing units 161a, 161b to successively produce the luminance signal Ybb, a switching circuit 166 for alternately receiving the first color difference signal PRbb of the second normal picture signal Sbb from the reproduction processing units 161a, 161b to successively produce the first color difference signal PRbb, and a switching circuit 167 for alternately receiving the second color difference signal PBbb of the second normal picture signal Sbb from the reproduction processing units 161a, 161b to successively produce the second color difference signal PBbb.

Each of the processing units 161a, 161b comprises a memory region 168 having six field memories M1 to M6 for storing either the luminance line signals Yk (k is an odd number) pertaining to odd-numbered scanning lines or the luminance line signals Yaai (i=1,2,--) of the first reproduced TCI signal Sre3 in the field memory M1, storing either the first color difference line signals PRk pertaining to odd-numbered scanning lines or the first color difference signal PRaai (i=1,2,--) of the first reproduced TCI signal Sre3 in the field memory M2, storing either the second color difference line signals PBk pertaining to odd-numbered scanning lines or the second color difference signal PBaai (i=1,2,--) of the first reproduced TCI signal Sre3 in the field memory M3, storing either the luminance line signals Yj (j is an even number) pertaining to even-numbered scanning lines or the luminance line signals Ybbi (i=1,2,--) of the second reproduced TCI signal Sre4 in the field memory M4, storing either the first color difference line signals PRj pertaining to even-numbered scanning lines or the first color difference signal PRbbi (i=1,2,--) of the second reproduced TCI signal Sre4 in the field memory M5, and storing either the second color difference line signals PBj pertaining to even-numbered scanning lines or the second color difference signal PBbbi (i=1,2,--) of the second reproduced TCI signal Sre4 in the field memory M6, a switching circuit 169 for selecting either the first color difference line signals PRj or PRbbi to write the selected line signals to the field memory M5, a switching circuit 170 for selecting either the second color difference line signals PBk or PBaai to write the selected line signals to the field memory M3, a switching circuit 171 for selecting either the luminance line signals Yk or Yaai read from the field memory M1 or the luminance line signals Yj or Ybbi read from the field memory M4, a switching circuit 172 for selecting either the first color difference line signals PRk or PRaai read from the field memory M2 or the first color difference line signals PRj or PRbbi read from the field memory M5, and a switching circuit 173 for selecting either the second color difference line signals PBk or PBaai read from the field memory M3 or the second color difference line signals PBj or PBbbi read from the field memory M6.

Writing and reading operations in the processing unit 161a are performed independent of those in the processing unit 161b. That is, though a period of two scanning lines in the HD input signal Sin is shorter than that of a scanning line in the normal picture signal Saa or Sbb, an additional memory capacity is provided to each of the field memories M1 to M6 to avoid an adverse influence resulting from the difference between the periods. Also, the writing operation of the reproduced TCI signals Sre3, Sre4 is performed in synchronization with a writing clock which is generated according to a horizontal synchronizing signal separated from the reproduced TCI signals Sre3, Sre4, and the reading operation of the line signals is performed in synchronization with a reading clock of which a cycle is the same as that of the writing clock. That is, a frequency component of the writing clock is the same as that of the reading clock.

In the above configuration of the reproduction processing means 154, the reproduction of the HD input signal Sin recorded in the magnetic tape MT according to the first recording mode is initially described.

The luminance line signals Yk pertaining to odd-numbered scanning lines of the first reproduced TCI signal Sre3 are written in the field memory M1, and the luminance line signals Yj pertaining to even-numbered scanning lines of the second reproduced TCI signal Sre4 are written in the field memory M4. Also, the first color difference line signals PRk pertaining to odd-numbered scanning lines of the first reproduced TCI signal Sre3 are written in the field memory M2 and are written as even-numbered first color difference line signals PRj (PR2, PR4,--) in the field memory M5 through the switching circuit 169. Also, the second color difference line signals PBj pertaining to even-numbered scanning lines of the second reproduced TCI signal Sre4 are written in the field memory M6 and are written as odd-numbered second color difference line signals PBk (PB1, PB3,--) in the field memory M3 through the switching circuit 170.

Figure 37:
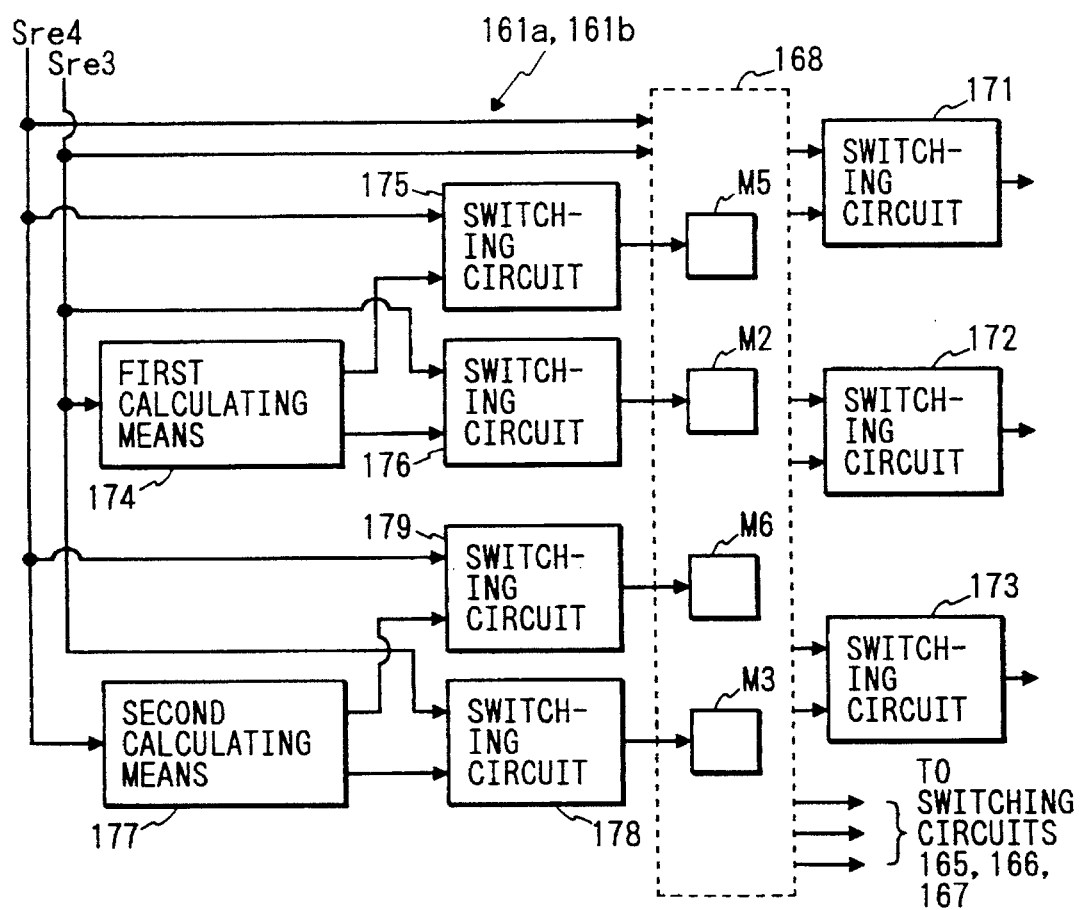
FIG. 37 is another block diagram of a reproduction processing means shown in FIG. 35 according to a modification of the second embodiment.

In this case, it is applicable that the even-numbered first color difference line signal PRj written in the field memory M5 be determined as an average of the line signals $PR_{j-1}$, $PR_{j+1}$. Also, it is applicable that the odd-numbered second color difference line signal PBk written in the field memory M3 be determined as an average of the line signals $PB_{k-1}$, $PB_{k+1}$. That is, as shown in FIG. 37, the first color difference line signals $PR_{j-1}$, $PR_{j+1}$ of the first reproduced TCI signal Sre3 are transferred to a first calculating means 174 to calculate the average of the line signals $PR_{j-1}$, $PR_{j+1}$, and the average is written as the even-numbered first color difference line signal PRj in the field memory M5 through a switching circuit 175. The first color difference line signals PRi pertaining to odd-numbered scanning lines of the first reproduced TCI signal Sre3 are written in the field memory M2 through a switching circuit 176. Also, the second color difference line signals $PB_{K-1}$, $PB_{k+1}$ of the second reproduced TCI signal Sre4 are transferred to a second calculating means 177 to calculate the average of the line signals $PB_{k-1}$, $PB_{k+1}$, and the average is written as the odd-numbered second color difference line signal $PB_k$ in the field memory M3 through a switching circuit 178. The second color difference line signals PBi pertaining to even-numbered scanning lines of the second reproduced TCI signal Sre4 are written in the field memory M6 through a switching circuit 179.

Thereafter, the luminance line signals Yk pertaining to odd-numbered scanning lines written in the field memory M1 and the luminance line signals Yj pertaining to even-numbered scanning lines written in the field memory M4 are transferred to the switching circuit 171 and are alternately selected to produce a series of luminance line signals Yi (Y1, Y2, Y3,--). The series of luminance line signals Yi is transferred to the switching circuit 162. In the switching circuit 162, another series of luminance line signals Yi transferred from the processing unit 161b is also received, and the luminance line signals Yi are combined to produce a combined luminance signal. Thereafter, the combined luminance signal is transferred to a synchronizing signal adding means (not shown). In the synchronizing signal adding means, a synchronizing signal pertaining to an HD signal is added to the combined luminance signal to produce a luminance signal Y. Also, the first color difference line signals PRk pertaining to odd-numbered scanning lines written in the field memory M2 and the even-numbered first color difference line signal PRj written in the field memory M5 are transferred to the switching circuit 172 and are alternately selected to produce a series of first color difference line signals PRi (PR1, PR2, PR3,--). The series of first color difference line signals PRi is transferred to the switching circuit 163. In the switching circuit 163, another series of first color difference line signals PRi transferred from the processing unit 161b is also received, and the first color difference line signals PRi are combined to produce a combined first color difference signal. Thereafter, the combined first color difference signal is transferred to the synchronizing signal adding means. In the synchronizing signal adding means, a synchronizing signal pertaining to an HD signal is added to the combined first color difference signal to produce a second color difference signal PR.

Also, the second color difference line signals PBj pertaining to even-numbered scanning lines written in the field memory M6 and the odd-numbered second color difference line signal PBk written in the field memory M3 are transferred to the switching circuit 178 and are alternately selected to produce a series of second color difference line signals PBi (PB1, PB2, PB3,--). The series of second color difference line signals PBi is transferred to the switching circuit 164. In the switching circuit 164, another series of second color difference line signals PBi transferred from the processing unit 161b is also received, and the second color difference line signals PBi are combined to produce a combined second color difference signal. Thereafter, the combined second color difference signal is transferred to the synchronizing signal adding means. In the synchronizing signal adding means, a synchronizing signal pertaining to an HD signal is added to the combined second color difference signal to produce a second color difference signal PB.

Thereafter, the luminance signal Y produced in the reproduction processing means 154 is converted in a digital-to-analogue (D/A) converter 157a and is transferred to a first selecting means 158, the first color difference signal PR is converted in a digital-to-analogue (D/A) converter 157b and is transferred to the first selecting means 158, and the second color difference signal PB is converted in a digital-to-analogue (D/A) converter 157c and is transferred to the first selecting means 158.

Figure 38:
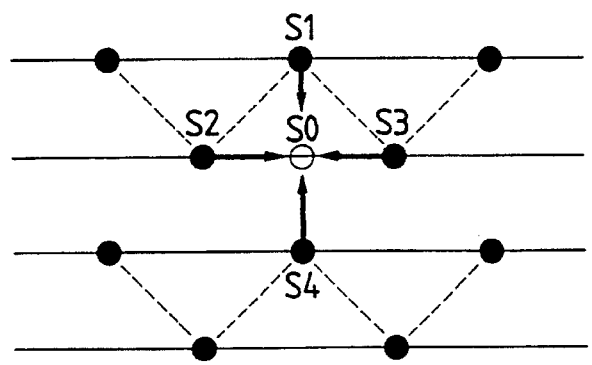
FIG. 38 is a conceptual view showing an action of calculating means shown in FIG. 37 in cases where the color difference signals PR, PB are produced according to a modified method shown in FIG. 24B.

In cases where the HD input signal Sin is reproduced by processing the recorded TCI signals Sr1, Sr2 of which the first and second color difference line signals PRi, PBi are generated according to the modified method shown in FIG. 24B, each of pixels placed in a horizontal scanning line is alternately selected as a sampling point S1 and a sampling point S2. Therefore, as shown in FIG. 38, there is a sampling point S0 not selected to generate a color difference line signal PRi or PBi. The sampling point S0 is surrounded by sampling points S1, S2, S3 and S4 selected to generate a color difference line signal PRi or PBi. In this case, a piece of picture information IS0 indicated by the sampling point S0 is calculated by utilizing pieces of picture information IS1, IS2, IS3 and IS4 according to an equation;

$$IS0=(IS1+IS2+IS3+IS4)/4.$$

The averaging calculation for generating a first color difference line signal PRi is performed in the calculating means 174 shown in FIG. 37, and the averaging calculation for generating a second color difference line signal PBi is performed in the calculating means 177 shown in FIG. 37.

Next, the reproduction of the first normal picture signal Saa recorded in the magnetic tape MT according to the second recording mode is described with reference to FIG. 36.

The luminance line signals Yaai pertaining to the first reproduced TCI signal Src3 are written in the field memory M1, the first color difference line signals PRaai pertaining to the first reproduced TCI signal Sre3 are written in the field memory M2, and the second color difference line signals PBaai pertaining to the first reproduced TCI signal Sre3 are written in the field memory M3 through the switching circuit 170. Thereafter, the luminance line signals Yaai written in the field memory M1 are read to the switching circuit 162 through the switching circuit 171, the first color difference line signals PRaai written in the field memory M2 are read to the switching circuit 163 through the switching circuit 172, and the second color difference line signals PBaai written in the field memory M3 are read to the switching circuit 164 through the switching circuit 173. In the switching circuit 162, other luminance line signals Yaai transferred from the processing unit 161b are also received, and the luminance line signals Yaai and the other luminance line signals Yaai are combined to produce a combined luminance signal. Thereafter, the combined luminance signal is transferred to the synchronizing signal adding means, and a synchronizing signal pertaining to a normal picture signal is added to the combined luminance signal to produce the luminance signal Yaa. In the switching circuit 163, other first color difference line signals PRaai transferred from the processing unit 161b are also received, and the first color difference line signals PRaai and the other first color difference line signals PRaai are combined to produce a combined first color difference signal. Thereafter, the combined first color difference signal is transferred to the synchronizing signal adding means, and a synchronizing signal pertaining to a normal picture signal is added to the combined first color difference signal to produce the first color difference signal PRaa. In the switching circuit 164, other second color difference line signals PBaai transferred from the processing unit 161*b* are also received, and the second color difference line signals PBaai and the other second color difference line signals PBaai are combined to produce a combined second color difference signal. Thereafter, the combined second color difference signal is transferred to the synchronizing signal adding means, and a synchronizing signal pertaining to a normal picture signal is added to the combined second color difference signal to produce the second color difference signal PBaa.

Thereafter, the luminance signal Yaa produced in the reproduction processing means 154 is converted in the D/A converter 157*a* and is transferred to the first selecting means 158, the first color difference signal PRaa is converted in the D/A converter 157*b* and is transferred to the first selecting means 158, and the second color difference signal PBaa is converted in the D/A converter 157*c* and is transferred to the first selecting means 158.

Next, the reproduction of the first and second normal picture signals Saa, Sbb recorded in the magnetic tape MT according to the third recording mode is described with reference to FIG. 36.

The luminance signal Yaa and the first and second color difference signals PRaa, PBaa pertaining to the first normal picture signal Saa are reproduced from the first reproduced TCI signal Sre3 digitized in the same manner. Also, the luminance line signals Ybbi pertaining to the second reproduced TCI signal Sre4 are written in the field memory M4, the first color difference line signals PRbbi pertaining to the second reproduced TCI signal Sre4 are written in the field memory M5 through the switching circuit 169, and the second color difference line signals PBbbi pertaining to the second reproduced TCI signal Sre4 are written in the field memory M6. Thereafter, the luminance line signals Ybbi written in the field memory M4 are read to the switching circuit 165, the first color difference line signals PRbbi written in the field memory M5 are read to the switching circuit 166, and the second color difference line signals PBbbi written in the field memory M6 are read to the switching circuit 167. In the switching circuits 165, 166, 167, other luminance line signals Ybbi and the first and second color difference line signals PRbbi, PBbbi transferred from the processing unit 161*b* are also received, and the luminance line signals Ybbi and the color difference line signals PRbbi, PBbbi transferred from the processing units 161*a*, 161*b* are respectively combined to produce a combined luminance signal, a combined first color difference signal and a combined second color difference signal. Thereafter, the combined signals are transferred to the synchronizing signal adding means, and a synchronizing signal pertaining to a normal picture signal is respectively added to the combined signals to produce the luminance signal Ybb, the first color difference signal PRbb and the second color difference signal PBbb. Thereafter, the luminance signal Ybb produced in the reproduction processing means 154 is converted in a digital-to-analogue (D/A) converter 159*a* and is transferred to a second encoder 160, the first color difference signal PRbb is converted in a digital-to-analogue (D/A) converter 159*b* and is transferred to the second encoder 160, and the second color difference signal PBbb is converted in an digital-to-analogue (D/A) converter 159*c* and is transferred to the second encoder 160.

Accordingly, the reproduction of the HD input signal Sin, the first normal picture signal Saa or the second normal picture signal Sbb recorded in the magnetic tape MT can be performed in the reproduction processing means 154 even though the signal Sin, Saa or Sbb is recorded according to any of the first, second and third recording mode.

Also, because the field memories M1 to M6 of the memory region 168 in the reproduction processing means 106 is the same as those of the memory region 134 in the recording processing means 106, the memory region 134 can be utilized as the memory region 168.

Thereafter, the luminance signal Y and the first and second color difference signals PR, PB transferred to the first selecting means 158 are respectively output to transmission paths (not shown) in cases where the reproducing apparatus 151 is operated according to the first reproducing mode corresponding to the first recording mode. Also, the luminance signal Yaa and the first and second color difference signals PRaa, PBaa transferred to the first selecting means 158 are respectively output to a first encoder 174 in cases where the reproducing apparatus 151 is operated according to the second or third reproducing mode corresponding to the second or third recording mode. In the first encoder 174, the luminance signal Yaa and the first and second color difference signals PRaa, PBaa are converted to a composite picture signal equivalent to the first normal picture signal Saa, and the composite picture signal is output to a transmission path (not shown) as the first normal picture signal Saa reproduced in the picture signal reproducing apparatus 151. Also, the luminance signal Ybb and the first and second color difference signals PRbb, PBbb are converted to a composite picture signal equivalent to the second normal picture signal Sbb in the second encoder 160, and the composite picture signal is output to a transmission path (not shown) through the second selecting means 156 as the second normal picture signal Sbb reproduced in the picture signal reproducing apparatus 151.

Next, an operation in the reproducing mode determining section 181 is described with reference to FIG. 39.

Figure 39:
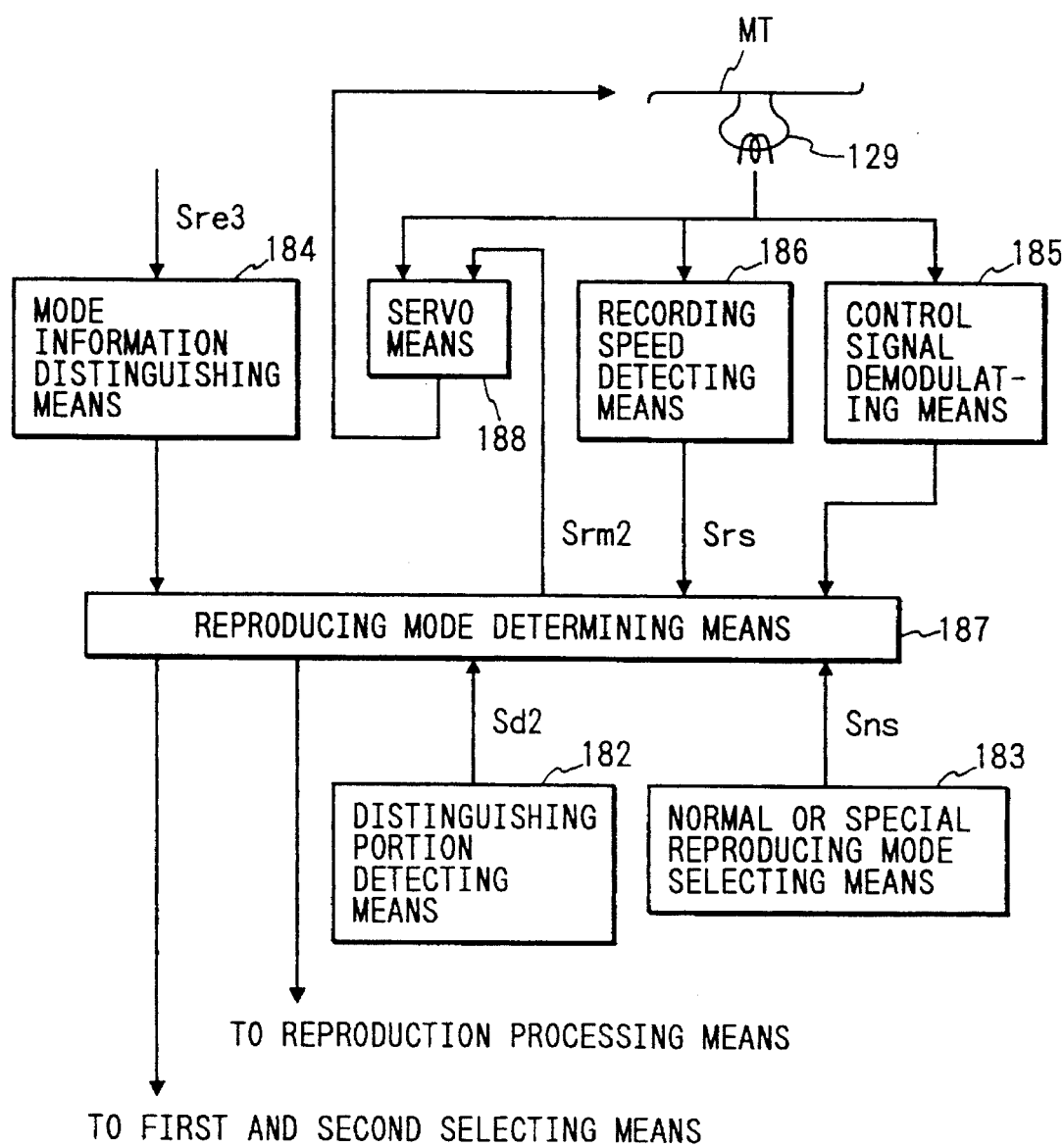
FIG. 39 is a block diagram of a reproducing mode determining section shown in FIG. 35.

As shown in FIG. 39, the reproducing mode determining section 181 comprises a distinguishing portion detecting means 182 for detecting a distinguishing portion attached to a tape cassette of the magnetic tape MT to distinguish a type of the magnetic tape MT, a normal or special reproducing mode selecting means 183 for selecting either a normal reproducing mode or a special reproducing mode such as a search reproducing mode according to an instruction of an operator, a mode information distinguishing means 184 for detecting the information signal Sda of the first reproduced TCI signal Sre3 to distinguish a recording mode indicated by a piece of recording mode information included in the information signal Sda in cases where the normal reproducing operation is selected in the normal or special reproducing mode selecting means 183, a control signal demodulating means 185 for demodulating a piece of recording mode information of the recording mode signal Srm multiplexed in the control signal Src which is recorded on the control track of the magnetic tape MT, a recording speed detecting means 186 for detecting a density of the control signal Src to distinguish between the first and second recording modes, a reproducing mode determining means 187 for determining a conventional reproducing mode corresponding to the fourth recording mode in cases where the distinguishing portion detected in the distinguishing portion detecting means 182 does not indicate a metal tape, determining a reproducing mode selected from among the first to third reproducing modes according to the recording mode information detected in the mode information distinguishing means 184 in cases where the distinguishing portion detected in the distinguishing portion detecting means 182 indicates a metal tape in the normal reproducing operation selected in the normal or special reproducing mode selecting means 183, and determining a reproducing mode selected from among the first to third reproducing modes according to the recording mode information detected in the control signal demodulating means 185 in cases where the distinguishing portion indicates a metal tape in the special reproducing operation selected in the normal or special reproducing mode selecting means 183, and a servo means 188 for controlling a running speed of the magnetic tape MT according to the reproducing mode determined in the reproducing mode determining means 187.

In the above configuration of the reproducing mode determining section 181, when an operator instructs the reproducing mode determining section 181 to determine a reproducing mode selected from among the first to third reproducing modes and the conventional reproducing mode, a type of the magnetic tape MT is distinguished in the reproducing mode determining means 187. In detail, a distinguishing portion attached to a tape cassette of the magnetic tape MT informing of the type of the magnetic tape MT is detected in the distinguishing portion detecting means 182 in the same manner as in the detecting means 121, and a distinguishing portion detecting signal Sd2 is transferred to the reproducing mode determining means 187 to inform the type of the magnetic tape MT. Thereafter, the type of the magnetic tape MT is distinguished according to the distinguishing portion detecting signal Sd2.

In cases where the type of the magnetic tape MT is judged in the reproducing mode determining means 187 to be a metal tape belonging to a super high performance recording medium, a reproducing mode selected from among the first to third reproducing modes is determined in the determining means 187. That is, a normal or specific reproducing mode selecting signal Sns produced in the normal or specific reproducing mode selecting means is received in the determining means 187. In cases where an operator selects the normal reproducing mode in the selecting means 183, the information signal Sda of the first reproduced TCI signal Sre3 detected in the mode information distinguishing means 184 is received in the determining means 187 to determine a recording mode indicated by a piece of recording mode information included in the information signal Sda. In cases where the first or second recording mode is indicated by the recording mode information, the distinction between the first and second recording modes is not impossible because the bit number of the recording mode signal Srm is reduced to 1 as shown in FIG. 33A. In this case, a density of the control signal Src recorded on the magnetic tape MT is detected in the recording speed detecting means 186 through the fifth magnetic head 129 to check a recording speed of the control signal Src, and a recording speed signal Srs is supplied to the determining means 187 to distinguish between the first and second recording modes. Therefore, the first, second or third reproducing mode corresponding to the first, second or third recording mode is specified in the determining means 187.

Also, in cases where the operator selects the special reproducing mode in the selecting means 183, the information signal Sda of the first reproduced TCI signal Sre3 reproduced through the first magnetic heads 112a, 112b is not necessarily detected in the mode information distinguishing means 184 because the line signals of the first reproduced TCI signal Sre3 are intermittently reproduced. In other words, a reproducing mode cannot be specified according to an output signal transferred from the mode information distinguishing means 184. Therefore, a piece of recording mode information of the recording mode signal Srm multiplexed in the control signal Src which is recorded on the control track of the magnetic tape MT is demodulated in the control signal demodulating means 185, and the demodulated recording mode information is supplied to the determining means 187. Thereafter, the first, second or third reproducing mode corresponding to the first, second or third recording mode is specified in the determining means 187 in the same manner.

In contrast, in cases where the type of the magnetic tape MT is judged in the reproducing mode determining means 187 to be a S-VHS type of tape belonging to a high performance recording medium or a VHS type of tape belonging to a normal recording medium, the conventional reproducing mode corresponding to the fourth recording mode is adopted.

Thereafter, a reproducing mode signal Srm2 indicating the first, second, third or conventional reproducing mode is supplied from the determining means 187 to the servo means 188, the first selecting means 156 and the first selecting means 158. Thereafter, a running speed of the magnetic tape MT in the reproducing operation is controlled by the servo means 188, the line signals corresponding to the HD input signal Sin or the first normal picture signal Saa is selected in the second selecting means 158 under control of the reproducing mode signal Srm2, and the second normal picture signal Sbb is selected in the first selecting means 156 under control of the reproducing mode signal Srm2.

Accordingly, because a recording mode recorded on the magnetic tape MT is detected in the reproducing mode determining section 181, a reproducing mode corresponding to the recording mode can be rapidly determined in the reproducing mode determining section 181.

Also, because a piece of recording mode information included in the first reproduced TCI signal Sre3 is distinguished in case of the normal reproducing mode, the recording mode information can be detected each time the first reproduced TCI signal Sre3 equivalent to a frame of picture signal is reproduced even though the recording mode information is indicated by a plurality of bits. In addition, because a piece of recording mode information included in the recording control signal Src reproduced is distinguished in case of the search reproducing mode in which the line signals of the first reproduced TCI signal Sre3 are intermittently reproduced, the recording mode information can be rapidly distinguished.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed:

1. A picture signal recording apparatus for recording a normal picture signal and a high-definition picture signal in which the number of scanning lines is higher than that in the normal picture signal, comprising:

selecting means for selecting either the high-definition picture signal or the normal picture signal, the high-definition picture signal and the normal picture signal being respectively composed of a luminance signal, a first color difference signal and a second color difference signal;

recording processing means for time-compressing a plurality of first color difference line signals of the first color difference signal pertaining to the normal picture signal on every scanning line in cases where the normal picture signal is selected in the selecting means, time-compressing a plurality of second color difference line signals of the second color difference signal pertaining to the normal picture signal in cases where the normal picture signal is selected in the selecting means, time-compressing a plurality of luminance line signals of the luminance signal pertaining to the normal picture signal in a first ratio in time compression degree of the first or second color difference line signals to the luminance line signals pertaining to the normal picture signal on every scanning line in cases where the normal picture signal is selected in the selecting means, multiplexing in time division the luminance line signals time-compressed, the first color difference line signals time-compressed and the second color difference line signals time-compressed on every scanning line to produce a recorded TCI signal pertaining to the normal picture signal, alternately deleting a first color difference line signal of the first color difference signal pertaining to the high-definition picture signal and a second color difference line signal of the second color difference signal pertaining to the high-definition picture signal on every scanning line to produce a plurality of thinned first color difference line signals and a plurality of thinned second color difference line signals from a plurality of first color difference line signals of the first color difference signal pertaining to the high-definition picture signal and a plurality of second color difference line signals of the second color difference signal pertaining to the high-definition picture signal in cases where the high-definition picture signal is selected in the selecting means, time-compressing the thinned first color difference line signals and the thinned second color difference line signals on every scanning line, time-compressing a plurality of luminance line signals of the luminance signal pertaining to the high-definition picture signal on every scanning line in cases where the high-definition picture signal is selected in the selecting means on condition that the first ratio is larger than a second ratio in time compression degree of the thinned first or second color difference line signals to the luminance line signals pertaining to the high-definition picture signal, multiplexing in time division half of the luminance line signals time-compressed and the thinned first color difference line signals time-compressed on every scanning line to produce a first recorded TCI signal pertaining to the high-definition picture signal, and multiplexing in time division remaining half of the luminance line signals time-compressed and the thinned second color difference line signals time-compressed on every scanning line to produce a second recorded TCI signal pertaining to the high-definition picture signal; and magnetic head means for recording the recorded TCI signal pertaining to the normal picture signal on a recording medium in cases where the normal picture signal is selected in the selecting means, and recording the first and second recorded TCI signals pertaining to the high-definition picture signal on the recording medium in cases where the high-definition picture signal is selected in the selecting means.

2. A picture signal recording apparatus according to claim 1 in which the first ratio is 6:1 and the second ratio is 3:1.

3. A picture signal recording apparatus according to claim 1, additionally including:

a recording mode determining unit for determining a recording mode in dependence on whether the high-definition picture signal is input to the selecting means, the high-definition picture signal being selected in preference to the normal picture signal in cases where the high-definition picture signal is input to the selecting means.

4. A picture signal recording apparatus according to claim 3 in which the recording mode determining unit comprises:

picture signal detecting means for detecting the high-definition picture signal input to the selecting means; and recording mode determining means for determining a recording mode to select the high-definition picture signal according to the recording mode in the selecting means in cases where the high-definition picture signal is detected in the picture signal detecting means and select the normal picture signal according to the recording mode in the selecting means in cases where the high-definition picture signal is not detected in the picture signal detecting means.

5. A picture signal recording apparatus according to claim 3 in which the recording mode determining unit comprises:

picture signal detecting means for detecting the high-definition picture signal input to the selecting means;

recording speed selecting means for selecting either a standard recording speed or a low recording speed which is lower than the standard recording speed, the recording medium being run at the standard recording speed or the low recording speed selected in the recording speed selecting means; and recording mode determining means for determining a recording mode to select the high-definition picture signal according to the recording mode in the selecting means for the purpose of the recording of the high-definition picture signal on the recording medium at the standard recording speed in cases where the high-definition picture signal is detected in the picture signal detecting means and select the normal picture signal according to the recording mode in the selecting means for the purpose of the recording of the normal picture signal on the recording medium at the standard or low recording speed in cases where the high-definition picture signal is not detected in the picture signal detecting means, the normal picture signal selected in the selecting means being recorded on the recording medium at the standard recording speed in cases where the standard recording speed is selected in the recording speed selecting means, and the normal picture signal selected in the selecting means being recorded on the recording medium at the low recording speed in cases where the low recording speed is selected in the recording speed selecting means.

6. A picture signal recording apparatus according to claim 5, the recording mode determining unit additionally including:

second magnetic head means for recording the recording mode determined in the recording mode determining means on the recording medium.

7. A picture signal recording apparatus according to claim 5, the recording mode determining unit additionally including:

servo means for controlling a running speed of the recording medium according to the selection of the recording speed selecting means and generating a control signal to control a running speed of the recording medium in a reproducing operation;

control modulating means for modulating the control signal generated in the servo means to multiplex the recording mode determined in the recording mode determining means with the running speed indicated by the control signal; and second magnetic head means for recording the control signal modulated in the control modulating means on the recording medium to reproduce either the high-definition picture signal or the normal picture signal recorded on the recording medium with the magnetic head means in the reproducing operation according to the recording mode determined in the recording mode determining means and the recording speed of the recording medium selected in the recording speed selecting means.

8. A picture signal recording apparatus according to claim 3 in which the recording mode determining unit comprises:

automatic/manual selecting means for selecting either an automatic determination of the recording mode or a manual determination of the recording mode;

input signal selecting means for selecting either the high-definition picture signal input to the selecting means or the normal picture signal input to the selecting means on condition that the manual determination is selected in the automatic/manual selecting means;

recording speed selecting means for selecting either a standard recording speed or a low recording speed which is lower than the standard recording speed, the recording medium being run at the standard recording speed or the low recording speed selected in the recording speed selecting means;

picture signal detecting means for detecting the high-definition picture signal input to the selecting means on condition that the automatic determination is selected in the automatic/manual selecting means;

recording mode determining means for determining a recording mode to select the high-definition picture signal in the selecting means according to the recording mode for the purpose of the recording of the high-definition picture signal on the recording medium at the standard recording speed in cases where the high-definition picture signal is detected in the picture signal detecting means, select the normal picture signal in the selecting means according to the recording mode for the purpose of the recording of the normal picture signal on the recording medium at the low recording speed selected in the recording speed selecting means in cases where the high-definition picture signal is not detected in the picture signal detecting means, select the high-definition picture signal in the selecting means according to the recording mode for the purpose of the recording of the high-definition picture signal on the recording medium at the standard recording speed in cases where the high-definition picture signal is selected in the input signal selecting means, and select the normal picture signal in the selecting means according to the recording mode for the purpose of the recording of the normal picture signal on the recording medium at the low recording speed in cases where the normal picture signal is selected in the input signal selecting means.

9. A picture signal recording apparatus for recording a first normal picture signal, a second normal picture signal and a high-definition picture signal in which the number of scanning lines is higher than that in the first or second normal picture signal, comprising:

picture signal detecting means for detecting the high-definition picture signal;

recording speed selecting means for selecting either a standard recording speed or a low recording speed which is lower than the standard recording speed, a recording medium being run at the standard recording speed or the low recording speed selected in the recording speed selecting means;

recording mode determining means for determining by adopting a first recording mode in cases where the high-definition picture signal is detected in the picture signal detecting means, adopting a second recording mode in cases where the high-definition picture signal is not detected in the picture signal detecting means on condition that the low recording speed is selected in the recording speed selecting means, and adopting a third recording mode in cases where the high-definition picture signal is not detected in the picture signal detecting means on condition that the standard recording speed is selected in the recording speed selecting means;

selecting means for selecting the high-definition picture signal input to the selecting means in cases where the first recording mode is adopted in the recording mode determining means, selecting the first normal picture signal input to the selecting means in cases where the second recording mode is adopted in the recording mode determining means, and selecting the first and second normal picture signals input to the selecting means in cases where the third recording mode is adopted in the recording mode determining means;

recording processing means for alternately deleting a first color difference signal and a second color difference signal pertaining to the high-definition picture signal on every scanning line to produce a thinned first color difference signal and a thinned second color difference signal in cases where the high-definition picture signal is selected in the selecting means, time-compressing the thinned first and second color difference signals on every scanning line, time-compressing a luminance signal pertaining to the high-definition picture signal on every scanning line in cases where the high-definition picture signal is selected in the selecting means, multiplexing in time division half of the luminance signal time-compressed and the thinned first color difference signal time-compressed on every scanning line to produce a first recorded TCI signal pertaining to the high-definition picture signal, multiplexing in time division remaining half of the luminance signal time-compressed and the thinned second color difference signal time-compressed on every scanning line to produce a second recorded TCI signal pertaining to the high-definition picture signal, time-compressing a luminance signal and first and second color difference signals pertaining to the first normal picture signal on every scanning line in cases where the first normal picture signal is selected in the selecting means, multiplexing in time division the luminance signal time-compressed and the first and second color difference signals time-compressed on every scanning line to produce a first recorded TCI signal pertaining to the first normal picture signal, time-compressing a luminance signal and first and second color difference signals pertaining to the second normal picture signal on every scanning line in cases where the second normal picture signal is selected in the selecting means, and multiplexing in time division the luminance signal time-compressed and the first and second color difference signals time-compressed on every scanning line to produce a second recorded TCI signal pertaining to the second normal picture signal; and magnetic head means for recording the first and second recorded TCI signals pertaining to the high-definition picture signal on the recording medium at the standard recording speed selected in the recording speed selecting means, recording the first recorded TCI signal pertaining to the first normal picture signal on the recording medium at the low recording speed selected in the recording speed selecting means, and recording the first and second recorded TCI signals pertaining to the first and second normal picture signals on the recording medium at the standard recording speed selected in the recording speed selecting means.

10. A picture signal reproducing apparatus for reproducing a normal picture signal and a high-definition picture signal in which the number of scanning lines is higher than that in the normal picture signal, comprising:

recording medium means for recording a reproduced TCI signal pertaining to the normal picture signal, first and second reproduced TCI signals pertaining to the high-definition picture signal, a first control signal in which a recording speed of the high-definition picture signal and a recording mode of the high-definition picture signal is multiplexed, and a second control signal in which a recording speed of the normal picture signal and a recording mode of the normal picture signal is multiplexed, the reproduced TCI signal pertaining to the normal picture signal being composed of a luminance signal, the first and second color difference signals multiplexed with each other on every scanning line and a recording mode signal indicating the recording mode of the normal picture signal, the first reproduced TCI signal pertaining to the high-definition picture signal being composed of half of luminance signal, a thinned first color difference signal multiplexed with each other on every scanning line and a recording mode signal indicating the recording mode of the high-definition picture signal, the second reproduced TCI signal pertaining to the high-definition picture signal being composed of remaining half of luminance signal and a thinned second color difference signal multiplexed with each other on every scanning line, and the thinned first and second color difference signals being composed of first and second color difference signals alternately deleted on every scanning line;

magnetic head means for reading either the reproduced TCI signal pertaining to the normal picture signal recorded on the recording medium means or the first and second reproduced TCI signals pertaining to the high-definition picture signal recorded on the recording medium means and reading either the first control signal for the second control signal recorded on the recording medium means;

normal or search reproducing mode selecting means for selecting either a normal reproducing mode or a search reproducing mode in which the reproduced TCI signal pertaining to the normal picture signal or the first and second reproduced TCI signals pertaining to the high-definition picture signal are intermittently read out from the recording medium means through the magnetic head means;

reproducing mode determining means for determining a reproducing mode corresponding to the recording mode signal included in either the reproduced TCI signal pertaining to the normal picture signal or the first reproduced TCI signal pertaining to the high-definition picture signal in cases where the normal reproducing mode is selected in the normal or search reproducing mode selecting means and determining a reproducing mode corresponding to the recording mode multiplexed in the first or second control signal recorded on the recording medium means in cases where the search reproducing mode is selected in the normal or search reproducing mode selecting means;

reproducing processing means for reproducing the luminance signal and the first and second color difference signals of the normal picture signal from the reproduced TCI signal pertaining to the normal picture signal read in the magnetic head means according to the reproducing mode determined in the reproducing mode determining means in cases where the reproduced TCI signal pertaining to the normal picture signal is read in the magnetic head means and reproducing the luminance signal and the first and second color difference signals of the high-definition picture signal from the first and second reproduced TCI signals pertaining to the high-definition picture signal read in the magnetic head means according to the reproducing mode determined in the reproducing mode determining means in cases where the first and second reproduced TCI signals pertaining to the high-definition picture signal are read in the magnetic head means; and selecting means for selecting either the luminance signal and the first and second color difference signals of the normal picture signal or the luminance signal and the first and second color difference signals of the high-definition picture signal according to the reproducing mode determined in the reproducing mode determining means.

11. A picture signal recording method for recording a normal picture signal and a high-definition picture signal in which the number of scanning lines is higher than that in the normal picture signal, comprising the steps of:

time-compressing plurality of a first color difference line signals of a first color difference signal pertaining to the normal picture signal on every scanning line, each of the first color difference line signals corresponding to a scanning line;

time-compressing a plurality of second color difference line signals of a second color difference signal pertaining to the normal picture signal, each of the second color difference line signals corresponding to a scanning line;

time-compressing a plurality of luminance line signals of a luminance signal pertaining to the normal picture signal in a first ratio in time compression degree of the first or second color difference line signals to the luminance line signals pertaining to the normal picture signal on every scanning line, each of the luminance line signals corresponding to a scanning line;

multiplexing in time division the luminance line signals time-compressed, the first color difference line signals time-compressed and the second color difference line signals time-compressed on every scanning line to produce a recorded TCI signal pertaining to the normal picture signal;

recording the recorded TCI signal pertaining to the normal picture on a recording medium;

alternately deleting a first color difference line signal of a first color difference signal pertaining to the high-definition picture signal and a second color difference line signal of the second color difference signal pertaining to the high-definition picture signal on every scanning line to produce a plurality of thinned first color difference line signals of the first color difference signal and a plurality of thinned second color difference line signals of the second color difference signal pertaining to the high-definition picture signal, the number of scanning lines in the high-definition picture signal being higher than that in the normal picture signal, the first color difference signal being composed of a plurality of first color difference line signals which each correspond to a scanning line, and the second color difference signal being composed of a plurality of second color difference line signals which each correspond to a scanning line;

time-compressing the thinned first color difference line signals and the thinned second color difference line signals on every scanning line;

time-compressing a plurality of luminance line signals of a luminance signal pertaining to the high-definition picture signal on every scanning line on condition that the first ratio is larger than a second ratio in time compression degree of the thinned first or second color difference line signals to the luminance line signals pertaining to the high-definition picture signal, each of the luminance line signals corresponding to a scanning line;

multiplexing in time division half of the luminance line signals time-compressed and the thinned first color difference line signals time-compressed on every scanning line to produce a first recorded TCI signal pertaining to the high-definition picture signal;

multiplexing in time division remaining half of the luminance line signals time-compressed and the thinned second color difference line signals time-compressed on every scanning line to produce a second recorded TCI signal pertaining to the high-definition picture signal; and recording the first recorded TCI signal and the second recorded TCI signal on the recording medium.

12. A picture signal recording method according to claim 11 in which the first ratio is 6:1 and the second ratio is 3:1.

\* \* \* \* \*